(12) United States Patent
Stojanovic

(10) Patent No.: US 7,412,016 B2
(45) Date of Patent: Aug. 12, 2008

(54) DATA-LEVEL CLOCK RECOVERY

(75) Inventor: Vladimir M. Stojanovic, Stanford, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 11/428,818

(22) Filed: Jul. 5, 2006

(65) Prior Publication Data

US 2006/0280272 A1    Dec. 14, 2006

Related U.S. Application Data

(63) Continuation of application No. 10/867,153, filed on Jun. 14, 2004, now Pat. No. 7,092,472, which is a continuation-in-part of application No. 10/851,505, filed on May 21, 2004, now Pat. No. 7,030,657, and a continuation-in-part of application No. 10/740,087, filed on Dec. 17, 2003, now Pat. No. 7,126,378, and a continuation-in-part of application No. 10/662,872, filed on Sep. 16, 2003.

(60) Provisional application No. 60/461,729, filed on Apr. 9, 2003.

(51) Int. Cl.
*H04L 7/00* (2006.01)
(52) U.S. Cl. .................. 375/355; 375/355; 375/360
(58) Field of Classification Search .................. 375/355, 375/359, 373, 376, 375, 371
See application file for complete search history.

(56) References Cited

U.S. PATENT DOCUMENTS 3,534,273 A   10/1970   Thomas
3,582,879 A    6/1971   Sullivan
3,775,688 A   11/1973   Hinoshita et al.
3,992,616 A   11/1976   Acker (Continued)

FOREIGN PATENT DOCUMENTS

EP    0365257 A2    4/1990

(Continued)

OTHER PUBLICATIONS

Aboulnasr, T. et al., "Characterization of a Symbol Rate Timing Recovery Technique for a 2B1Q Digital Receiver," IEEE Trans. on Communications, vol. 42, Nos. 2/3/4, pp. 1409-1414, Feb.-Apr. 1994.

(Continued)

*Primary Examiner*—Emmanuel Bayard
(74) *Attorney, Agent, or Firm*—Shemwell Mahamedi LLP

(57) ABSTRACT

A circuit for adjusting the phase of a clock signal. A first sampling circuit generates a sequence of data samples in response to transitions of the clock signal, each of the data samples having either a first state or a second state according to whether an incoming signal exceeds a first threshold. An second sampling circuit generates an error sample in response to one of the transitions of the clock signal, the error sample having either the first state or the second state according to whether the incoming signal exceeds a second threshold. A phase adjust circuit adjusts the phase of the clock signal if the sequence of data samples matches a predetermined pattern and based, at least in part, on whether the error sample has the first state or the second state.

26 Claims, 24 Drawing Sheets

U.S. PATENT DOCUMENTS

| | | |
|---|---|---|
| 4,584,559 A | 4/1986 | Penney |
| 4,615,038 A | 9/1986 | Lim, deceased et al. |
| 4,709,376 A | 11/1987 | Kage |
| 4,719,396 A | 1/1988 | Asano et al. |
| 4,730,343 A | 3/1988 | Kanemasa et al. |
| 4,970,609 A | 11/1990 | Cunningham et al. |
| 4,992,677 A | 2/1991 | Ishibashi et al. |
| 5,014,226 A | 5/1991 | Horstmann |
| 5,036,525 A | 7/1991 | Wong |
| 5,122,690 A | 6/1992 | Bianchi |
| 5,191,462 A | 3/1993 | Gitlin et al. |
| 5,194,462 A | 3/1993 | Gitlin et al. |
| 5,268,930 A | 12/1993 | Sendyk et al. |
| 5,402,378 A | 3/1995 | Min et al. |
| 5,402,445 A | 3/1995 | Matsuura |
| 5,425,033 A | 6/1995 | Jessop et al. |
| 5,448,200 A | 9/1995 | Fernandez et al. |
| 5,455,844 A | 10/1995 | Ishikawa et al. |
| 5,459,762 A | 10/1995 | Wang et al. |
| 5,465,093 A | 11/1995 | Kusumoto et al. |
| 5,490,169 A | 2/1996 | Blackwell et al. |
| 5,546,424 A | 8/1996 | Miyake |
| 5,596,285 A | 1/1997 | Marbot |
| 5,659,581 A | 8/1997 | Betts et al. |
| 5,668,830 A | 9/1997 | Georgiou et al. |
| 5,675,588 A | 10/1997 | Maruyama |
| 5,742,798 A | 4/1998 | Goldrian |
| 5,757,297 A | 5/1998 | Ferraiolo et al. |
| 5,757,857 A | 5/1998 | Buchwald |
| 5,778,217 A | 7/1998 | Kao |
| 5,802,105 A | 9/1998 | Tiedemann, Jr. et al. |
| 5,875,177 A | 2/1999 | Uriu et al. |
| 5,877,647 A | 3/1999 | Vajapey |
| 5,896,067 A | 4/1999 | Williams |
| 5,898,321 A | 4/1999 | Ilkbahar |
| 5,940,442 A | 8/1999 | Wong |
| 6,108,801 A | 8/2000 | Malhotra et al. |
| 6,118,824 A | 9/2000 | Smith et al. |
| 6,122,757 A | 9/2000 | Kelley |
| 6,262,591 B1 | 7/2001 | Hui |
| 6,288,563 B1 | 9/2001 | Muljono |
| 6,304,071 B1 | 10/2001 | Popplewell et al. |
| 6,380,758 B1 | 4/2002 | Hsu |
| 6,417,100 B1 | 7/2002 | Hirata et al. |
| 6,448,806 B1 | 9/2002 | Roth |
| 6,509,756 B1 | 1/2003 | Yu |
| 6,541,966 B1 | 4/2003 | Keene |
| 6,541,996 B1 | 4/2003 | Rosefield et al. |
| 6,574,758 B1 | 6/2003 | Eccles |
| 6,628,621 B1 | 9/2003 | Appleton |
| 6,707,325 B2 | 3/2004 | Taguchi |
| 6,717,985 B1 | 4/2004 | Poon |
| 6,724,329 B2 | 4/2004 | Casper |
| 6,760,389 B1 | 7/2004 | Mukherjee |
| 6,760,574 B1 * | 7/2004 | Lu et al. .................. 455/226.1 |
| 6,839,861 B2 | 1/2005 | Hoke et al. |
| 6,885,691 B1 | 4/2005 | Lyu |
| 6,897,712 B2 | 5/2005 | Ficken |
| 6,941,483 B2 | 9/2005 | Brown |
| 6,970,681 B2 | 11/2005 | Darabi et al. |
| 6,979,987 B2 | 12/2005 | Kernahan et al. |
| 7,016,445 B2 | 3/2006 | Bronfer et al. |
| 7,054,402 B2 | 5/2006 | Muellner |
| 7,092,472 B2 | 8/2006 | Stojanovic |
| 7,099,400 B2 | 8/2006 | Yang et al. |
| 2001/0043649 A1 | 11/2001 | Farjad-Rad |
| 2002/0150184 A1 | 10/2002 | Hafeez et al. |
| 2003/0002602 A1 | 1/2003 | Kwon et al. |
| 2003/0016091 A1 | 1/2003 | Casper |
| 2003/0063664 A1 | 4/2003 | Bodenschatz |
| 2003/0070126 A1 | 4/2003 | Werner |
| 2003/0084385 A1 | 5/2003 | Zerbe et al. |
| 2003/0093713 A1 | 5/2003 | Werner |
| 2003/0108096 A1 | 6/2003 | Steinbach |
| 2003/0159094 A1 | 8/2003 | Smith et al. |
| 2003/0208707 A9 | 11/2003 | Zerbe |
| 2004/0001567 A1 | 1/2004 | Wei |
| 2004/0022311 A1 | 2/2004 | Zerbe et al. |
| 2004/0071203 A1 | 4/2004 | Gorecki |
| 2004/0071204 A1 | 4/2004 | Gorecki |
| 2004/0071205 A1 | 4/2004 | Gorecki |
| 2004/0076192 A1 | 4/2004 | Zerbe |

FOREIGN PATENT DOCUMENTS

| | | |
|---|---|---|
| EP | 1331779 | 7/2003 |
| JP | 20035831 A2 | 2/2000 |
| JP | 200035831 | 2/2000 |
| WO | WO00/011830 A2 | 3/2000 |
| WO | WO03/025599 A1 | 3/2003 |
| WO | WO03/032652 A2 | 4/2003 |
| WO | WO04/008490 A2 | 1/2004 |

OTHER PUBLICATIONS

Armstrong, J. "Symbol Synchronization Using Baud-Rate Sampling and Data-Sequence-Dependent Signal Processing," IEEE Trans. on Communications, vol. 39, No. 1, pp. 127-132, Jan. 1991.

Mueller, K. et al., "Timing Recovery in Digital Synchronous Data Receivers," IEEE Trans. on Communications, vol. Com-24, No. 5, pp. 516-531, May 1976.

Hoke et al., Self-timed interface for S/390 I/O subsystem interconnection, International Business Machines Corporation, J. Res. Develop. vol. 43, No. 5/6, Sep./Nov. 1999.

Aaron Martin et al., "8Gb/s Differential Simultaneous Bidirectional Link with 4mV 9ps Waveform Capture Diagnostic Capability", ISSCC 2003/Session 4/Clock Recovery and Backplane Transceivers/Paper 4.5, 2003 IEEE International Solid State Circuits Conference.

Cgen-Chu Yeh and John R. Barry, "Adaptive Minimum Bit-Error Rate Equalization for Binary Signaling," IEEE Transactions on Communications, vol. 48, No. 7, Jul. 2000, pp. 1226-1235.

J.M. Hoke et al, self-timed Interface for S/390 I/O Subsystem Interconntion, IBM J.Res. Develop., vol. 43, No. 5/6, Sep./Nov. 1999, p. 829-846.

Jack H. Winters et al., "Adaptive Nonlinear Cancellation for High-Speed Fiber-Optic Systems", Journal of Lightwave Technology, vol. 10, No. 7, Jul. 1992, IEEE, pp. 971-977.

Keshab K. Parhi, "High-Speed Architectures for Algorithms with Quantizer Loops", IEEE, 1990, pp. 2357-2360.

Keshab K. Parhi, "Pipelining in Algorithms with Quantizer Loops", IEEE Transactions on Circuits and Systems, vol. 38, No. 7, Jul. 1991, pp. 745-754.

Sanjay Kasturia et al., "Techniques for High-Speed Implementation on Nonlinear Cancellation", IEEE Journal on Selected Areas in Communications, vol. 9, No. 5, Jun. 1991, pp. 711-717

Scott C. Douglas, "Fast Implementations of the Filtered-X LMS and LMS Algorithms for Multichannel Active Noise Control, "IEEE Transactions on Speech and Audio Proc., vol. 7, No. 4, Jul. 1999, pp. 454-465.

Vladimir Stojanovic, George Ginis and Mark A. Horowitz, "Transmit Pre-emphasis for High-Speed Time-Division-Multiplexed Serial-Link Transceiver," International Conference on Communications, New York, NY, May 2, 2002, pp. 1-6.

* cited by examiner

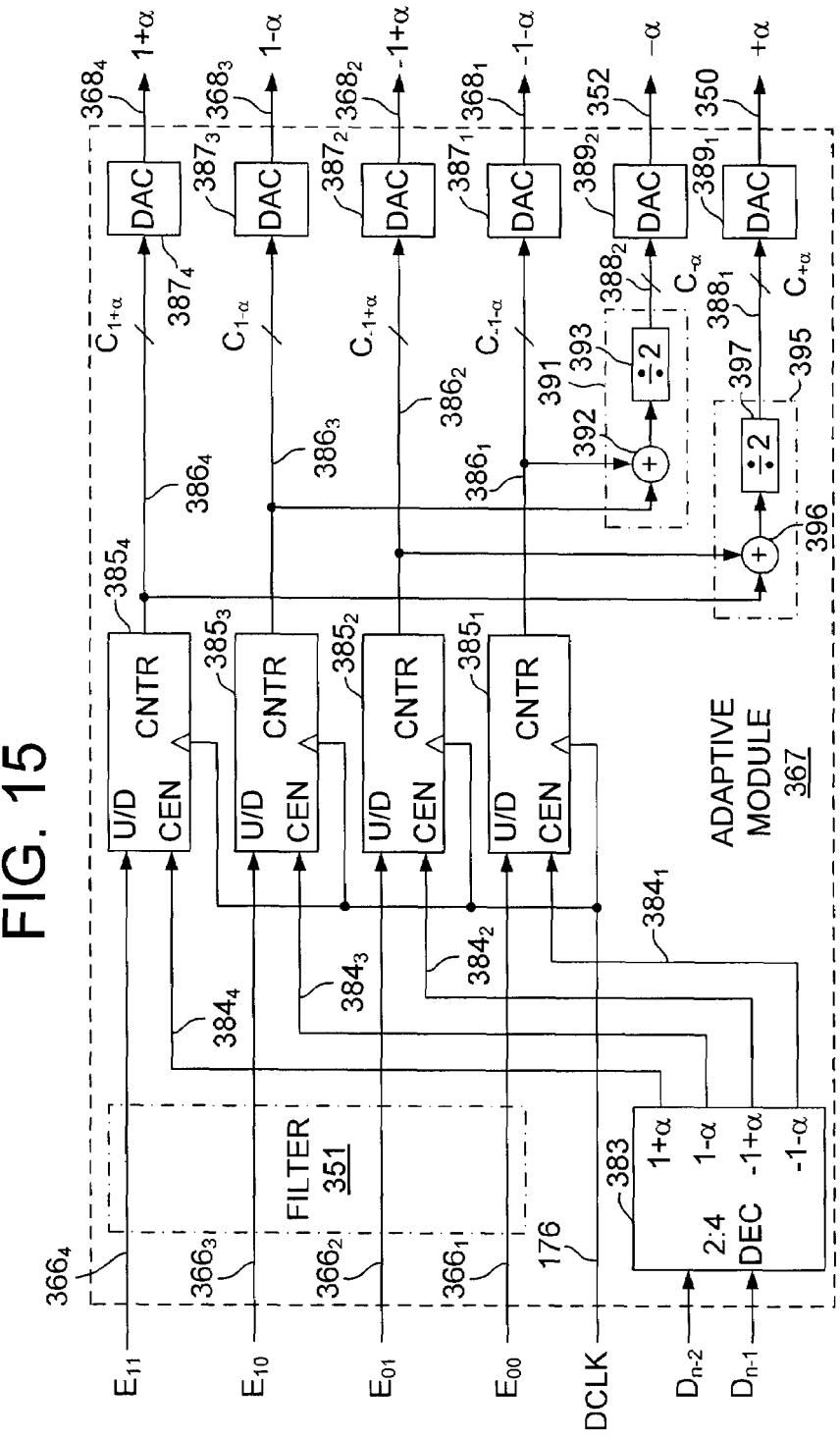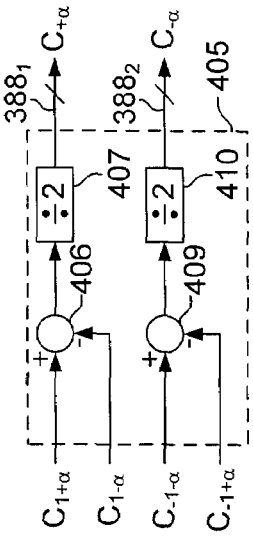
FIG. 15
FIG. 16

DATA-LEVEL CLOCK RECOVERY

CROSS-REFERENCE TO RELATED APPLICATIONS

This application is a continuation of, and hereby incorporates by reference, U.S. patent application Ser. No. 10/867,153, filed Jun. 14, 2004 now U.S. Pat. No. 7,092,472 and entitled "Data-Level Clock Recovery," which is a continuation-in-part of each of the following U.S. patent applications:

| Application No. | Filing Date | Application Title |
| --- | --- | --- |
| 10/740,087 | 17 Dec. 2003 | HIGH SPEED SIGNALING SYSTEM WITH ADAPTIVE TRANSMIT PRE-EMPHASIS now U.S. Pat. No. 7,126,378 |
| 10/662,872 | 16 Sep. 2003 | PARTIAL RESPONSE RECEIVER |
| 10/851,505 | 21 May 2004 | HIGH SPEED SIGNALING SYSTEM WITH ADAPTIVE TRANSMIT PRE-EMPHASIS AND REFLECTION CANCELLATION now U.S. Pat. No. 7,030,657 |

U.S. application Ser. No. 10/662,872 claims priority from U.S. Provisional Application No. 60/461,729, filed Apr. 9, 2003 and entitled "Partial Response Receiver." U.S. applications Ser. Nos. 10/740,087; 10/662,872; 10/851,505 and U.S. Provisional Application No. 60/461,729 are all hereby incorporated in this application by reference.

FIELD OF THE INVENTION

The present invention relates generally to high-speed signaling within and between integrated circuit devices, and more particularly to clock recovery in high-speed signaling systems.

BACKGROUND

Clock-data recovery (CDR) techniques are used to recover both clock and data signals from an incoming data signal. In one prior-art CDR technique, referred to herein as edge-based CDR and illustrated in FIG. 1, a signal receiving circuit samples an incoming data signal at both the midpoint and edges of data eyes (i.e., data valid intervals) to obtain a set of data samples ($\ldots D_{n-2}, D_{n-1}, D_n, D_{n+1}, D_{n+2}, \ldots$) and edge samples ($\ldots T_{n-2}, T_{n-1}, T_n, T_{n+1}, T_{n+2}, \ldots$), respectively. If the data samples that bound a given edge sample indicate a transition between high and low states, then the edge sample indicates whether the clock edge used to trigger the edge sampling operation occurred early or late relative to the data signal transition, and therefore may be used to adjust the clock phase. Referring to expanded view 75, for example, data samples $D_{n-1}$ and $D_n$ are logic '0' and '1' values, respectively, and therefore indicate a rising-edge transition in the incoming data signal. If the edge-sampling clock edge is early relative to the data signal transition, the edge sample will be captured before the data signal crosses decision threshold, DT (i.e., the threshold compared with the incoming signal to resolve the logic state of the edge and data samples), and therefore will have a logic-low ('0') state. If the clock edge is late relative to the data signal transition, the edge sample, $T_n$, will have a logic-high ('1') state. Conversely, in a falling-edge transition of the data signal, a logic '1' edge sample indicates an early clock edge, and a logic '0' edge sample indicates a late clock edge. Thus, each edge sample bounded by different-state data samples may be viewed as a vote for either advancing or retarding the edge-sampling clock signal (i.e., the edge clock signal), and the clock phase may be adjusted according to the majority after a number of votes have been received. By this operation, the phase of the edge clock signal is iteratively adjusted to achieve and maintain alignment between transitions of the edge clock signal and edges of the data eyes. The data clock signal (i.e., the clock signal used to trigger data sampling operations) is phase offset from the edge clock signal such that data clock transitions are evenly spaced in time between leading and trailing edge clock transitions, thereby establishing the data sampling point at the midpoint between edges of the data eyes.

While effective in many applications, edge-based CDR yields increasingly non-optimal results as signaling rates approach and exceed the signal path bandwidth. That is, as signaling rates progress deeper into the gigahertz range, data eyes become increasingly compressed and are characterized predominantly by signal path charging and discharging patterns. Referring to FIG. 2, for example, instead of the idealized waveform illustrated in dashed outline, each data eye is opened and closed as exponential charging/discharging waveforms cross the decision threshold, DT. Because the exponential rise and fall time of the signal cross the threshold earlier than the idealized linear transition, edge-based CDR yields edge and data clock alignments that are phase advanced by an amount PD relative to idealized edge and data clock alignments. As a result, while the data clock transitions at the mathematical midpoint between edge clock transitions, the resulting sample point (i.e., yielding $D_n$), does not necessarily occur at the largest eye opening, but rather occurs at a suboptimal point while the eye opening is still increasing. As the signaling rate is increased, the transition sampling points grow closer together (i.e., the data eye is compressed in time), pushing the edge-based-CDR sampling point further in the lower-magnitude direction, thereby reducing signaling margin and ultimately limiting the data rate of the signaling system.

BRIEF DESCRIPTION OF THE DRAWINGS

The present invention is illustrated by way of example, and not by way of limitation, in the figures of the accompanying drawings and in which like reference numerals refer to similar elements and in which:

FIG. 15 illustrates a embodiment of the adaptive module shown in FIG. 14;

FIG. 16 illustrates an alternative circuit arrangement that may be used in place of averaging circuits within the adaptive module of FIG. 15;

DETAILED DESCRIPTION

Figure 1:
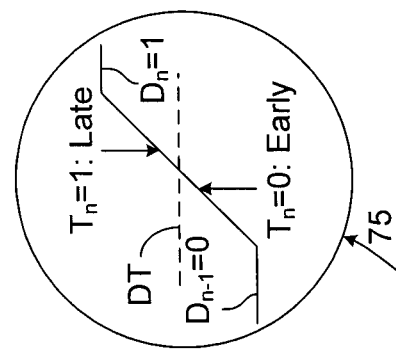
FIG. 1 illustrates data and edge samples used to recover a clocking information in a prior-art clock-data recovery system.
Figure 1:
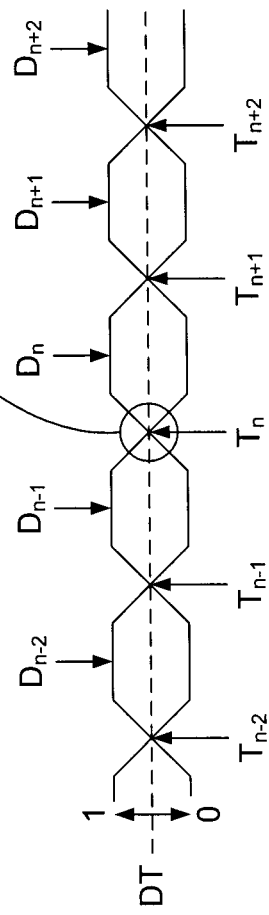
Figure 2:
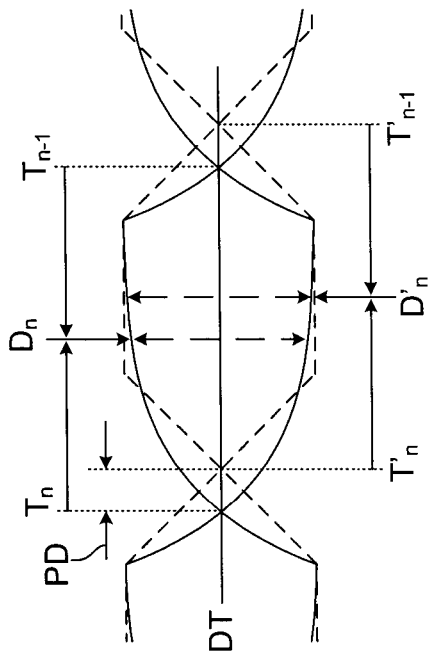
FIG. 2 illustrates the loss of signal margin that may result from the sampling point established in the prior-art clock-data recovery system of FIG. 1.

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. Also signals referred to herein as clock signals may alternatively be strobe signals or other signals that provide event timing. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "exemplary" is used to express but an example, and not a preference or requirement.

In embodiments of the invention, input signal patterns that yield sloped waveforms at selected data sampling times are identified and data-level samples captured at the selected data sampling times used to recover clocking information. In one embodiment, the data-level samples, referred to herein as error samples, are obtained by comparing the input signal with an adaptively generated data-level threshold. If a signaling pattern produces a slope through the data-level threshold at a given data sampling time, a circumstance identified through evaluation of data samples captured at the data sampling time and at the preceding and succeeding data sampling times, then the error sample captured at the data sampling time indicates whether the rising or falling signal crossed the data-level threshold (i.e., a data-level crossing) before or after the data sampling time, and therefore may be used to adjust the phase of the data clock signal. For example, if the error sample indicates that the level of a rising-slope input signal was below the data-level threshold at the data sampling time (i.e., the input signal had not yet reached the data-level threshold), the data clock transition is deemed to be early and a vote for retarding the data clock phase is generated. If the error sample indicates that the input signal level exceeded the data-level threshold at the data sampling time (i.e., the input signal crossed the data-level threshold before the data sampling time), the data clock transition is deemed to be late, and a vote for advancing the data clock phase is generated. In one embodiment, votes are tallied over a predetermined interval, with the majority vote (early or late) being applied to advance or retard the phase of the data clock signal. In another embodiment, votes are tallied until a predetermined number of votes have been received, with the majority vote being applied thereafter to adjust the data clock phase. In either case, because the clock phase is adjusted based on samples of the incoming signal captured at data sampling times instead of (or in addition to) edge sampling times, the data clock signal is not necessarily adjusted for alignment with the temporal midpoint between edges of the data eye, but rather may be offset from the midpoint depending on the temporal location of the data-level crossing. That is, instead of aligning the data sampling point at the temporal midpoint of the data eye as in the prior-art edge-based CDR technique described above, the sampling point is aligned with a data-level crossing which, in high-speed signaling applications, may occur at a more open point of the data eye than the temporal midpoint, thereby providing additional voltage margin and signal-to-noise ratio at the sampling instant. In one embodiment, timing information obtained from data-level crossings is used in conjunction with edge-based clock recovery techniques to fine-tune the data clock phase. In other embodiments or during selected times of operation, data-level clock recovery alone (or at least without edge-based CDR) is used to adjust the phase of the sampling clock signal. In such embodiments, the edge-based samplers and other hardware used for edge-based CDR may be omitted or disabled, thereby saving die area and/or reducing power consumption. The data-level clock recovery techniques described herein may be applied within a binary signal receiver, including a partial-response receiver as discussed below, or within a multi-level signal receiver that resolves each incoming symbol into two or more bits. These and other aspects and features of the invention are described below.

Signaling System Overview

Figure 3:
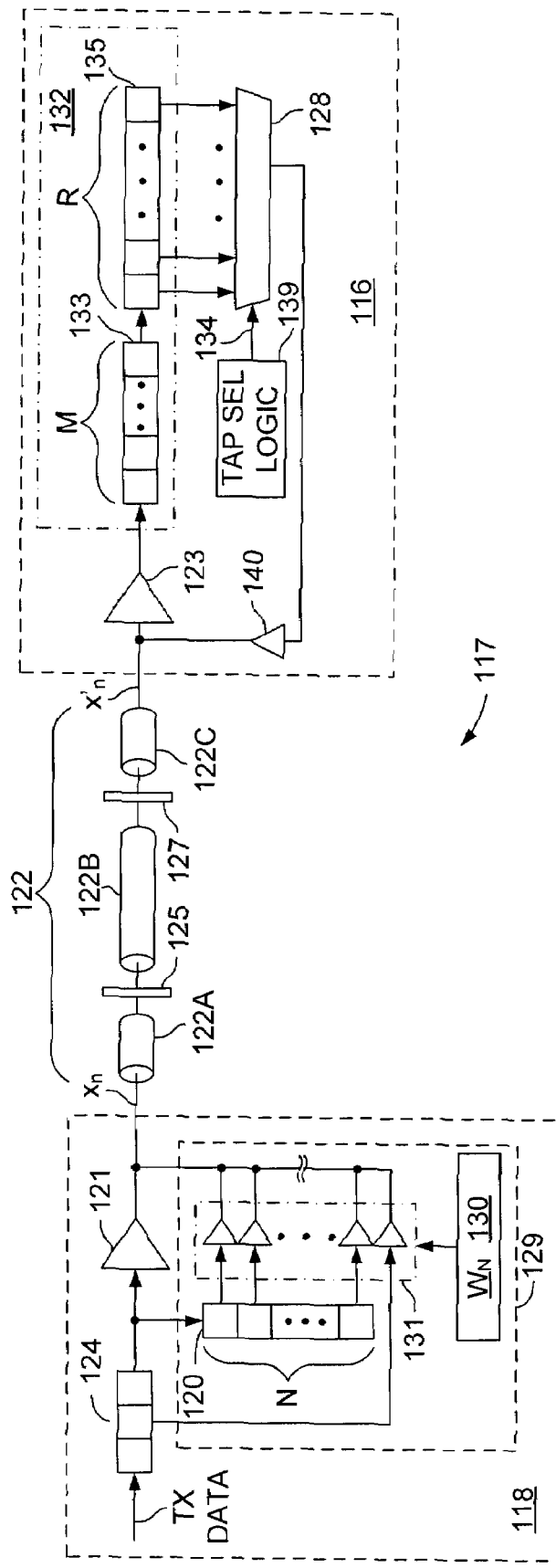
FIG. 3 illustrates a signaling system that includes clock recovery circuitry according to an embodiment of the invention.

FIG. 3 illustrates an embodiment of a signaling system 117 with data-level clock recovery. The system 117 includes an equalizing transmitter 118 and equalizing receiver 116 coupled to one another via a high-speed signal path 122. In one embodiment, the signal path 122 is formed by component signal paths 122A, 122B and 122C (e.g., transmission lines that introduce respective, nonzero propagation delays and exhibit respective impedance characteristics), each disposed on respective circuit boards that are coupled to one another via circuit board interfaces 125 and 127 (e.g., connectors). In a specific implementation, signal path 122B is formed on a backplane and signal paths 122A and 122C are formed on respective daughterboards (e.g., line cards) that are removably coupled to the backplane via circuit board interfaces 125 and 127. The transmitter 118 and receiver 116 are implemented in respective integrated circuit (IC) devices that are mounted on the daughterboards. In alternative embodiments, the IC devices containing the transmitter 118 and receiver 116 may be mounted to a common structure with the signaling path 122 coupled directly to the IC devices (e.g., both ICs mounted to a circuit board and coupled to one another via circuit board traces, or both ICs packaged within a single multi-chip module with signal path 122 formed between the ICs by bond wires or other conducting structures). Also, the transmitter 118 and receiver 116 may be included within the same IC device (e.g., system on chip) and the signaling path 122 implemented in a metal layer structure or other signal conducting structure within the IC device.

Figure 4:
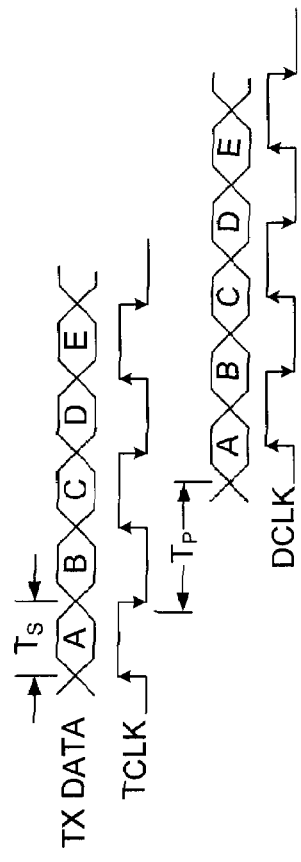
FIG. 4 illustrates a relationship between clock and data signals in one embodiment of the signaling system of FIG. 3.

Referring to FIG. 4, the transmitter 118 transmits data on the signaling path 122 during successive time intervals, referred to herein as symbol times, $T_S$. In the double-data-rate timing shown, each symbol time corresponds to a half cycle of a transmit clock signal (TCLK) such that two data values (e.g., values A and B) are transmitted on signaling path 122 per TCLK cycle. The transmitted signal arrives at the input of the receiver 116 after propagation time, $T_P$, and is sampled by the receiver 209 in response to transitions of a data clock signal (DCLK) having a clock-to-data phase alignment achieved, at least in part, using data-level clock recovery circuitry according to an embodiment described herein. In alternative embodiments, more or fewer symbols may be transmitted per cycle of the transmit clock signal. For example, the embodiment of FIG. 3 may alternatively be a single data rate system, quad data rate system, octal data rate system, decade data rate system, etc.

In the receive circuit 116, a single symbol is captured during each cycle of the sampling clock signal. That is, a rising (or falling) edge of the data clock signal is used to capture a sample of the incoming signal, $x'_n$. In a multi-data rate system, multiple symbols are captured per cycle of the data clock signal as shown in FIG. 4. In such systems, clock generation circuitry may be provided within the receive-side device (e.g., an IC device containing the receiver 116) to generate multiple instances of the data clock signal (i.e., multiple component clock signals) that are phase-distributed through a period (1/frequency) of the sampling clock signal. In the double-data-rate timing arrangement of FIG. 4, for example, two instances of the data clock signal 210 may be provided: an even-phase data clock signal, $DCLK_E$, to sample even-numbered symbols $x'_n, x'_{n+2}, x'_{n+4} \ldots$; and an odd-phase data clock signal, $DCLK_O$, to sample odd-numbered symbols $x'_{n-1}, x'_{n+1}, x'_{n+3} \ldots$ This technique may be extended to achieve virtually any data rate, including quad data rate (4 symbols per sampling clock cycle), octal data rate (8 symbols per sampling clock cycle), decade data rate (10 symbols per sampling clock cycle), and so forth.

The equalizing transmitter 118 includes a transmit shift register 124, output driver 121, tap weight register 130 and transmit equalizer 129; the transmit equalizer 129 itself including a shift register 120 and a bank of output drivers 131. At the start of each symbol time, the data value at the head (i.e., output) of the transmit shift register 124, referred to herein as the primary data value, is driven onto the signal path 122 by the output driver 121, and the transmit equalizer 129 simultaneously drives an equalizing signal onto the signal path 122 to counter the inter-symbol interference (ISI) expected to occur as the transmitted signal, $x_n$, propagates through the signaling path 122 (and disperses in time) to become the receiver input signal $x'_n$. This type of equalization is referred to herein as transmit preemphasis. In one embodiment, the signal driven onto the signal path 122 by the output driver 121 (referred to herein as the primary signal) is a multi-level signal having one of four possible states (e.g., defined by four distinct signal ranges) and therefore constitutes a symbol representative of two binary bits of information. In alternative embodiments, the primary signal may have more or fewer possible states and therefore represent more or fewer than two binary bits. Also, the primary signal may be single-ended or differential (an additional signal line is provided to carry the complement signal in the differential case), and may be a voltage or current mode signal.

Each of the output drivers 131 within the transmit equalizer 129 form either a pre-tap driver or post-tap driver according to whether the source data value has already been transmitted (post-tap data) or is yet to be transmitted (pre-tap data). In the specific embodiment of FIG. 3, the equalizer includes N post-tap drivers sourced by data values within the shift register 120 and one pre-tap driver sourced by a data value within the transmit shift register 124. Accordingly, the resultant equalizing signal driven onto the data path 122 will have a signal level according to data values having symbol latencies of −1, 1, 2, . . . , N, where the symbol latency of a given data value refers to the number of symbol times by which transmission of the data value precedes the transmission of the primary value. Different numbers of post-tap and pre-tap drivers may be provided in alternative embodiments, thereby allowing for equalization based on values having different symbol latencies.

The tap weight register is used to store a set of drive strength values, $\underline{W}_N$, referred to herein as tap weights. As described below, the tap weights are iteratively updated, with each new set of tap weights being designated by an incrementally higher subscript (i.e., N, N+1, N+2, etc.). Each tap weight of a given set, $W_N(0), W_N(1), W_N(2), \ldots$, is supplied to a respective output driver within output driver bank 131 to control the level of the output signal generated by that output driver. In one embodiment, the signal path 122 is pulled up to a predetermined voltage level (e.g., at or near supply voltage) by single-ended or double-ended termination elements, and the output drivers within output driver bank 131 generate signals on the signal path 202 by drawing a pull-down current, $I_{PD}$ (i.e., discharge current), in accordance with the corresponding tap weight and pre-tap or post-tap data value. As a specific example, in a binary signaling system, each output driver within bank 131 draws a current according to the following expression:

$$I_{PD}(i) = S(i) \cdot [W_N(i) * I_{UNIT}] \quad (1),$$

where '·' denotes a logic AND operation, '*' denotes multiplication, $I_{UNIT}$ is a reference current, $W_N(i)$ is the tap weight of the $i^{th}$ output driver, and S(i) is the sign of the output driver contribution. The individual currents drawn by the output drivers within bank 131 are wire-summed (i.e., drawn from the same node) to form a total pull-down current, $I_{TPD}$, and therefore each contribute to the total output signal level in accordance with the sign of the output driver contribution and tap weight. By this arrangement, pre- and post-tap drivers are enabled to provide additive and subtractive contributions to the output signal level, as necessary to compensate for dispersion-type ISI.

In one embodiment, each of the tap weights within tap weight register 130 is a digital value having a sign component and magnitude component. The sign component of the tap weight (e.g., sign bit) is exclusive-NORed with the corresponding transmit data value to generate the sign of the signal contribution to be generated by the corresponding output driver. The exclusive-NOR operation effectively multiplies the signs of the tap weight and transmit data value, yielding a logic '1' (i.e., interpreted as a positive sign in one embodiment) if the signs of the tap weight and transmit data value are the same, and a logic '0' (i.e., negative sign) if the signs of the tap weight and transmit data value are different. The magnitude component of the tap weight is a multi-bit value used, for example, to control a digital-to-analog converter (DAC) within the output driver. Thus, the expression (1) may be rewritten as follows:

$$I_{PD}(i) = [D(i) / \oplus \mathrm{sgn}(W_N(i))] \cdot [|W_N(i)| * I_{UNIT}] \quad (2),$$

where '/⊕' denotes an exclusive-NOR operation, D(i) is a data value received from the transmit shift register, "sgn($W_N$(i))" is the sign of the $i^{th}$ tap weight and |$W_N$(i)| is the magnitude of the $i^{th}$ tap weight. By this arrangement, the sign of the signal contribution generated by the $i^{th}$ output driver is positive (i.e., logic '1') if the sign of the corresponding tap weight and source data value match, and negative otherwise. That is, if a logic '1' is to be transmitted (i.e., positive data) and the tap weight is positive (indicated by a logic '1' sign bit), the signal contribution is positive, thereby increasing the signal level generated on signal path 122. The signal contribution is also positive if a logic '0' is to be transmitted (i.e., negative data) and the tap weight is negative, the negative tap weight effectively flipping the otherwise negative signal contribution indicated by the logic '0' data. If the tap weight sign and source data value do not match, then a negative signal contribution is generated by the output driver. In a multi-level signaling embodiment, the sign of the tap weight may similarly be used to change the sign of the transmitted symbol.

Still referring to FIG. 3, the equalizing receiver 116 includes a receive circuit 123, buffer 132 (e.g., a shift register), tap select circuit 128, tap select logic 139 and equalizer circuit 140. The input signal, $x'_n$, is periodically sampled by the receive circuit 123 to generate logic-level data samples that are stored in buffer 132 for eventual use by application logic (not shown). Because the buffered data samples are stored for at least a predetermined time and represent historical data up to a predetermined number of symbol latencies, the buffered data samples form a source of post-tap data values that may be selected by the tap select circuit 128 to source equalizer taps in the equalizer circuit 140. Also, because a subset of buffered data samples may be selected according to the precise symbol latencies of reflections and other high-latency distortions, a relatively small number of buffered data samples may be selected to form receive-side equalization taps having latencies that match the latencies of the distortions. By this arrangement, a receive-side equalizer 140 having a relatively small number of taps (and correspondingly low parasitic capacitance) may be used to compensate for high latency distortions. In one embodiment, the tap select logic 139 generates a tap select signal 134 in response to a configuration value, the tap select signal 134 being supplied to tap select circuit 128 to effect selection of the subset of buffered data samples. The configuration value may be automatically generated and/or updated by the signaling system 117 (e.g., at system startup or during run-time operation) or may be empirically determined and stored within the configuration circuit or elsewhere within system 117. In an alternative embodiment, the tap select logic 139 may include control circuitry (e.g., state machine, microsequencer, etc.) to iteratively select and determine the relative efficacy of different tap data sources (i.e., data sources within buffer 132 having different latencies) and tap weights and thereby automatically configure the receive-side equalizer circuit.

In the embodiment of FIG. 3, buffer 132 is formed by a shift register having a dead range component 133 with M storage elements and a selectable-range component 135 with R storage elements, the tap select circuit 128 being coupled to the selectable-range component 135 to select the subset of tap data sources therefrom. In alternative embodiments, the dead range component of the buffer 132 may include fewer than M storage elements or even zero storage elements, depending on the time required to generate data samples and transfer the data samples into the buffer 132. Also, the tap select circuit 128 may be coupled to one or more storage elements within the dead range component 133 to enable the size of the dead range to be programmed according to the configuration of the transmit circuit 118 (e.g., according to the number of equalizer taps in the transmit circuit 118). The buffer 132 may also include one or more parallel registers in addition to (or instead of) the shift register formed by components 133 and 135.

In the embodiment of FIG. 3, the receive-side equalizer 140 is an output driver that drives an equalizing signal onto the signal path 122 (and therefore to the input of the receive circuit 123) coincidentally with the symbol time of an incoming signal and in accordance with tap weight settings and selected-latency data samples provided by tap select circuit 128. In alternative embodiments, the receive-side equalizer may be implemented within the receive circuit 123 itself, for example, by one or more equalizing preamplifier stages within data sampling circuits of the receive circuit 123.

Referring again to FIG. 3, the tap weights stored in tap weight register 130 are ideally set to exactly cancel the ISI (and/or other systematic sources of signal distortion) resulting from transmission of the pre-tap and post-tap data values. For example, if transmission of a logic '1' value that is output at a normalized signal level of +1.0 results in reception of signals having levels of 0.7 and 0.3 in successive reception intervals, then the signal is being dispersed and attenuated by the signal path 122 (also referred to herein as a channel). Consequently, an immediately subsequent transmission of a logic '0' that starts at a normalized signal level of −1.0 results in reception of signals having levels of −0.4 (i.e., −0.7+0.3), and −0.3. That is, the residue of the initial transmission (i.e., 0.3) destructively combines (i.e., interferes) with the subsequent negative-level signal, attenuating the received signal level. In this simple example, it can be seen that the source of the ISI in any given symbol transmission is the immediately preceding symbol. Thus, by setting the first post-tap driver (i.e., the output driver coupled to the first element of shift register 120) to generate a subtractive pre-emphasis signal that exactly cancels the residue of the preceding transmission, the signal received within a given sampling interval, while not fully restored to the originally transmitted level, is free from ISI. In a practical application, the ISI will not be fully canceled, as numerous other channel effects (reflections, crosstalk, noise) mask the true level of ISI at any given time, making it difficult to ascertain the exact tap weight that should be applied to the pre- and post-tap drivers (i.e., the output drivers within output driver bank 131) to compensate for the pre- and post-tap residue. Also, the pre-emphasis signal itself will generate ISI, which in turn may be mitigated by additional pre-emphasis signals generated by one or more others of the pre- and post-tap drivers.

Receive Circuit with Clock Recovery Function

Figure 5:
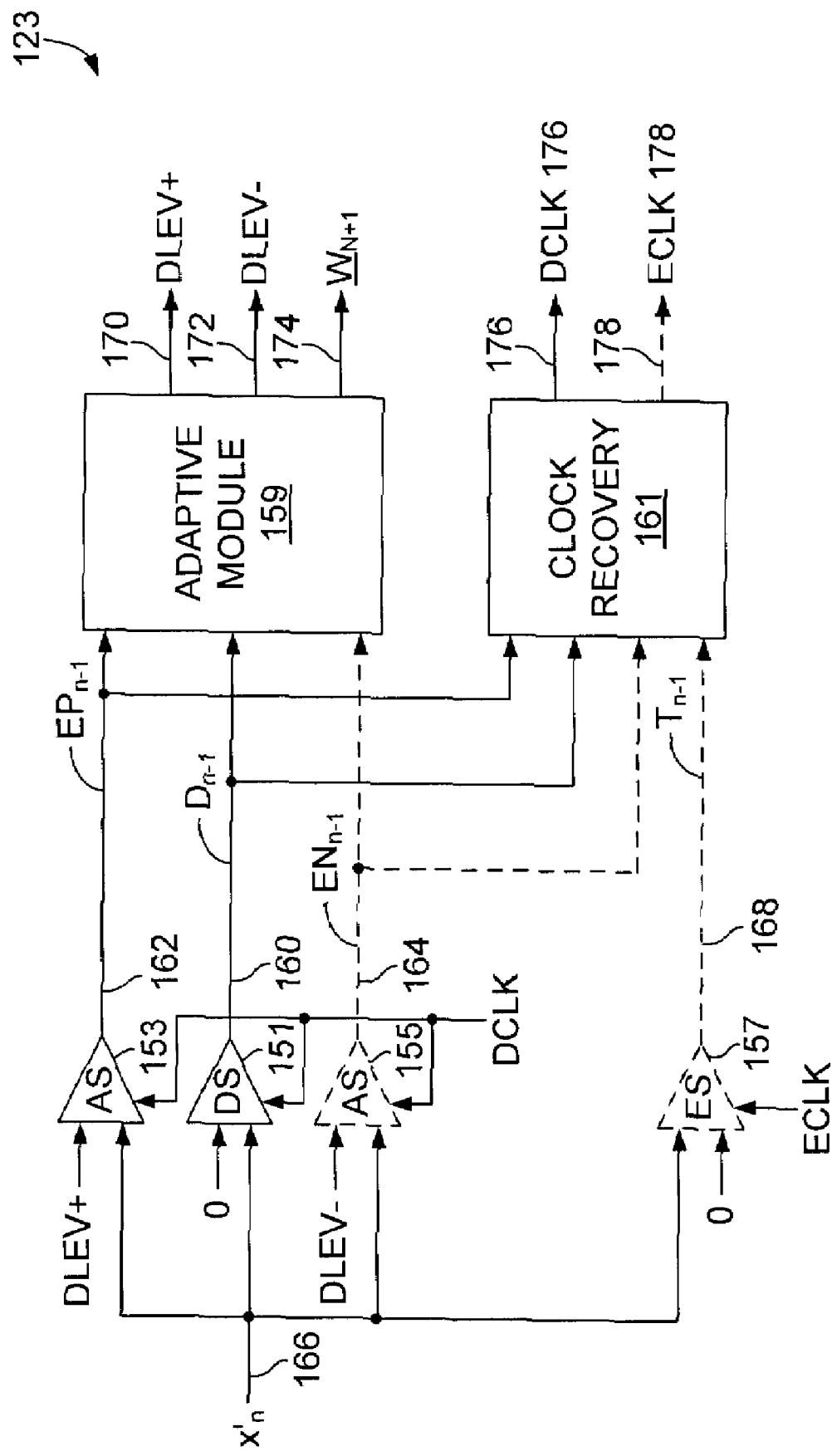
FIG. 5 illustrates an embodiment of a signal receiver with data-level clock recovery.

FIG. 5 illustrates an embodiment of receive circuit 123 that iteratively updates a set of transmit pre-emphasis tap weights (i.e., generating $\underline{W}_{N+1}$, $\underline{W}_{N+2}$, $\underline{W}_{N+3}$, ...) based upon a comparison of an incoming signal 166 ($x'_n$) with one or more adaptively determined target signal levels, referred to herein as a data-level thresholds. The receive circuit 123 includes an adaptive module 159 and a pair of sampling circuits referred to herein as a data sampler 151 (DS) and an adaptive sampler 153 (AS), and a clock recovery circuit 161. The receive circuit may additionally include a second adaptive sampler 155 and an edge sampler 157, shown in dashed out line to indicate their optional nature. The data sampler 151 samples the incoming signal 166 in response to transitions of data clock signal 176 to generate a sequence of data samples 160 ($D_{n-1}$, $D_{n-2}$, $D_{n-3}$, ...) each resolved to a logic '1' or logic '0' state according to whether the incoming signal 166 exceeds a threshold referred to herein as a zero threshold. In a single-ended signaling system, the zero threshold may be generated by a digital-to-analog converter (DAC), voltage divider or other threshold generating circuit and set to a nominal midpoint between steady-state high and low signaling levels. In a differential signaling system, the common mode of the incoming differential signal 166 may constitute the zero threshold so that if the signal level on the positive signal line of the differential signal line pair exceeds the signal level on the negative signal line of the differential signal line pair, a logic '1' is captured by the data sampler 151 and, conversely, if the signal level on the negative signal line exceeds the signal level on the positive signal line, a logic '0' is captured by the sampler 151.

The adaptive sampler 153 also samples the incoming signal 166 in response to transitions of data clock signal 176, and generates sequence of error samples 162 (i.e., $EP_{n-1}$, $EP_{n-2}$, $EP_{n-3}$, ...) each resolved to a logic '1' or logic '0' state according to whether the incoming signal 166 exceeds a data-level threshold 170 (DLEV+) generated by the adaptive module 159. In one embodiment, the data-level threshold 170 corresponds to an adaptively determined level of a logic '1' transmission, so that if a given data sample 160 is a logic '1', then the corresponding error sample 162 represents the sign of an error between the incoming signal level and the data-level threshold 170. In the specific embodiment of FIG. 5, each of the samplers 151, 153, 155, 157 generates a logic '1' output if, at the sampling instant, input signal $x'_n$ exceeds the threshold supplied to the sampler, and a logic '0' output if the threshold exceeds the input signal. While convention applies in the embodiment of FIG. 5 and various embodiments described below, opposite logic states may be generated in alternative embodiments.

The adaptive module 159 receives data samples 160 and error samples 162 from the data sampler 151 and adaptive sampler 153, respectively, and adaptively updates the data-level threshold 170 and pre-emphasis tap weights 174 in response. Referring to FIGS. 3 and 5, by updating the data-level threshold 170 and pre-emphasis tap weights 174 concurrently (i.e., at least partly overlapping in time at the same or different loop update rates), and by maintaining the updated tap weights 174 in an aggregate setting that corresponds to the peak (or average) power of the transmit circuit 118, the data-level threshold 170 tend to converge to an attenuated signal level exhibited by high frequency data patterns transmitted over the signal path 122, and the tap weights 174 converge to a setting that, in effect, pins the logic '1' level of signal $x'_n$ to the data-level threshold 170 at the data sampling times.

Still referring to FIG. 5, an additional adaptive sampler 155 may be provided to compare the incoming signal 166 with a second data-level threshold 172 (DLEV−) that corresponds to an adaptively determined level of a logic '0' transmission. By this operation, both positive error samples (EP) and negative error samples (EN) are provided to the adaptive module to enable generation of updated tap weights 174 and to adaptively generate the logic '1' and logic '0' data-level thresholds, such thresholds being referred to herein as positive and negative data-level thresholds. In an alternative embodiment, the negative data-level threshold, if needed, may be generated by complementing a DAC control signal used to generate the positive data-level threshold. Also, in a differential signaling embodiment, both the positive and negative data-level thresholds may be provided each of the adaptive samplers to effect a differential offset. Embodiments of differential samplers that apply both positive and negative data-level thresholds to effect a DC-shifted decision threshold are described below.

In one embodiment, each new set of updated tap weights 174 generated by the adaptive module 159 is communicated to the transmitter 118 via a back channel (not specifically shown in FIG. 3). The back channel may be formed, for example, by a relatively low-speed signaling path, or by out-of-band signaling over the signaling path 122 (e.g., using an otherwise unused code space within a signal encoding protocol such as 8b/10b or other protocol). In an alternative embodiment, the back channel may be omitted and the signaling path 122 may be used to communicate updated tap weights 174 (or update values that enable transmit-side generate of updated tap weights 174) to the transmit-side device.

Adaptive Module

Figure 6:
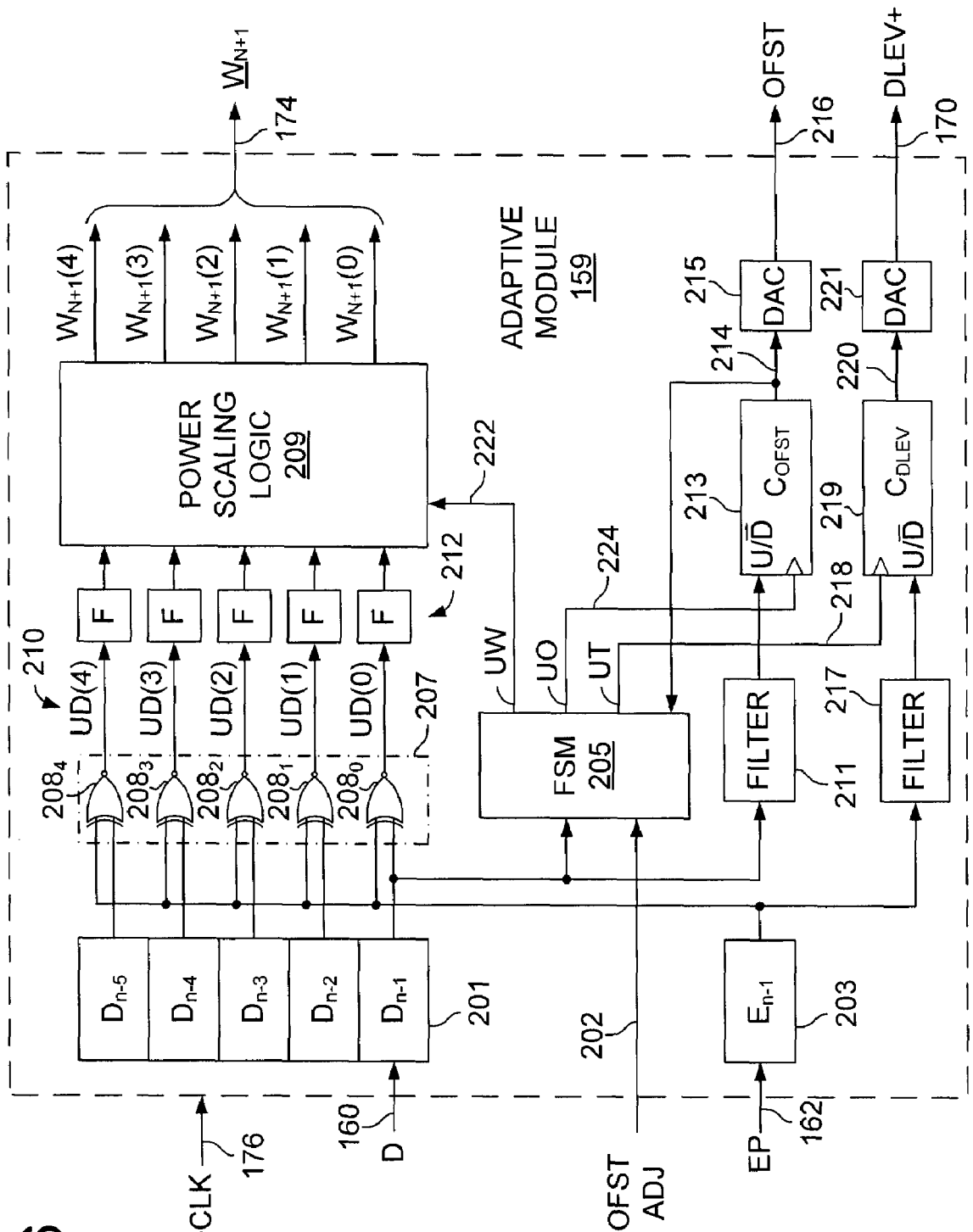
FIG. 6 illustrates an embodiment of an adaptive module.

FIG. 6 illustrates an embodiment of the adaptive module 159 of FIG. 5. The adaptive module 159 includes a data sample register 201, error sample register 203, sign multiplier 207, finite state machine 205, power scaling logic 209, filter 211, threshold counter 219 and DAC 221. The error sample 162 and data sample 160 generated during reception interval 'n' are supplied to the error sample register 203 and data sample register 201, respectively, and clocked into the registers in response to transitions of the data clock signal 176 (or a related clock signal or control signal). The data sample register 201 is a shift register used to store the most recently generated data samples. In the exemplary embodiment of FIG. 6, the data sample register is five elements deep (i.e., to store data samples, $D_{n-1}$–$D_{n-4}$); a depth that corresponds to the number of tap weights applied within the transmit circuit 118 of FIG. 3. In alternative embodiments, the data sample register 201 may have more or fewer storage elements, for example, to accommodate more or fewer tap weights and/or to store data samples used for other purposes including, without limitation, reflection cancellation, cross-talk cancellation and offset cancellation. The error sample register 203 is a one-deep register in the embodiment of FIG. 6, to store error sample $EP_{n-1}$, but may include any number of shift register elements in alternative embodiments (e.g., to enable selection of an error sample having a desired latency).

The sign multiplier 207 includes a set of exclusive-NOR gates $208_0$–$208_4$ each having a first input coupled in common to receive the stored error sample from the error sample register 203 and each having a second input coupled to receive a respective data sample from the data sample register 201. By this arrangement, each of the exclusive-NOR gates $208_0$–$208_4$ generates a respective one of update values 210, UD(0)–UD(4), in a logic '1' state if the corresponding data sample matches the error sample, and in a logic '0' state if the data sample and error sample do not match. Thus, each of the update values 210 represents a multiplication of the signs of the input signal (i.e., represented by the states of data samples $D_{n-1}$–$D_{n-4}$, respectively, '1' indicating a positive input signal and '0' indicating a negative input signal) and error sample $EP_{n-1}$ and therefore is a logic '1' if the signs are both positive or both negative, and a logic '0' if the signs are different. In one embodiment, each of the update values 210 is filtered within a respective one of filter elements 212 (F) to decrease update dither due to noise in the update estimate. In an alternative embodiment, the filter elements 212 are omitted.

In one embodiment, a tap weight is made more positive in response to a logic '1' update (i.e., a positive update) and more negative in response to a logic '0' update value (a negative update). More specifically, a positive tap weight is incremented (e.g., by a predetermined step size) and a negative tap weight decremented in a positive update. Conversely, a positive tap weight is decremented and a negative tap weight incremented in a negative update. In one embodiment, the positive and negative updates applied to the tap weights constitute a sign-sign least-mean-square (LMS) update that may be expressed as follows:

$$\underline{W}_{N+1} = \underline{W}_N + \text{stepsize} * \text{sign}(EP_n) * \text{sign}(\underline{D}) \quad (3),$$

which corresponds to the following scalar expressions:

$$W_{N+1}(0) = W_N(0) + \text{stepsize} * \text{sign}(EP_n) * \text{sign}(D_{n+1})$$

$$W_{N+1}(1) = W_N(1) + \text{stepsize} * \text{sign}(EP_n) * \text{sign}(D_n)$$

$$W_{N+1}(2) = W_N(2) + \text{stepsize} * \text{sign}(EP_n) * \text{sign}(D_{n-1})$$

$$W_{N+1}(3) = W_N(3) + \text{stepsize} * \text{sign}(EP_n) * \text{sign}(D_{n-2})$$

$$W_{N+1}(4) = W_N(4) + \text{stepsize} * \text{sign}(EP_n) * \text{sign}(D_{n-3})$$

In the expressions above, '*' denotes multiplication and the sign function, "sign( )", yields a +1 or −1 value according to whether the corresponding sample is a logic '1' or logic '0'. Thus, each tap weight update is in the direction of the estimate of the quantized negative gradient of the quadratic, least-mean-squared error cost function (i.e., a quadratic cost function). Other cost functions may be used in alternative embodiments.

In the embodiment of FIG. 6, the adaptive module 159 outputs the updated tap weight values 174 generated by the power scaling logic 209 to the transmit-side device, for example, via the back channel discussed above or via another signaling path. In an alternative embodiment, the power scaling logic 209 may be disposed within the transmit-side device rather than the receive-side device, so that only the tap weight updates 210 (or component signals used to generate the tap weight updates) need be communicated to the transmit-side device.

Still referring to FIG. 6, the most recently stored data sample and error sample, $\text{sgn}(x'_n)$ and $\text{sgn}(e_{n-1})$, are provided to the finite state machine 205 which, in turn, asserts an update-weight signal 222 (UW) to enable the power scaling logic 209 to apply the update values 210 to the existing set of tap weights ($\underline{W}_N$), and scale the resulting values to generate updated tap weights $\underline{W}_{N+1}$ 174. In the embodiment of FIG. 6, the finite state machine asserts the update-weight signal upon determining that the shift register 201 is fully loaded, or fully reloaded, with a set of data samples, and that the most recently stored data sample has a predetermined state. The predetermined state may be either positive or negative in different embodiments, according to whether the data-level threshold 170 generated by the adaptive module 159 corresponds to positive or negative incoming signals. That is, if the data-level threshold 170 is adjusted to the level of logic '1' data, then the error signal, $e_n$, has meaning with respect to $x'_n$ if the sign of $x'_n$ is positive (i.e., the data sample is a logic '1') and is ignored if the sign of $x'_n$ is negative. Conversely, if the data-level threshold 170 is adjusted to the level of logic '0' data, then the error signal, $e_n$, has meaning with respect to $x'_n$ if the sign of $x'_n$ is negative and is ignored if the sign of $x'_n$ is positive. Further, two adaptive samplers may be provided to generate positive and negative data-level thresholds when positive and negative data signals are received, respectively. As discussed below, in a multi-PAM embodiment, an adaptive sampler may be provided to generate error information for each different data level.

In the embodiment of FIG. 6, the adaptive module 159 generates a data-level threshold 170 (DLEV+) that constitutes a target data level for positive input signals (i.e., input signals that yield logic '1' data samples). When the finite state machine 205 detects storage of a positive data sample (i.e., a logic '1'), the finite state machine 205 asserts an update threshold signal 218 (UT), thereby enabling a threshold count 170 maintained by threshold counter 219 to be incremented or decremented according to the state of the corresponding error sample, $e_{n-1}$, stored in register 203. Still referring to FIG. 6, the data-level threshold is updated according to the state of the error sample, $EP_{n-1}$, which indicates whether the incoming signal level was above or below the data-level threshold at the sampling instant. In the embodiment of FIG. 6, for example, the data-level threshold that corresponds to a logic '1' input signal (DLEV+) is updated in response to a logic '1' data sample in accordance with the following expression:

$$(DLEV+)_{N+1} = (DLEV+)_N - \text{stepsize} * \text{sign}(EP_n)$$

In an embodiment that provides for separate generation of the DLEV− threshold, the DLEV− threshold may be updated in accordance with the following expression when a logic '0' data sample is received:

$$(DLEV-)_{N+1} = (DLEV-)_N - \text{stepsize} * \text{sign}(EN_n)$$

Filter 217 is provided to decrease update dither due to noise in the update estimate, and may be omitted in alternative embodiments. Also, the finite state machine 205 may also generate the update threshold signal 218, upon determining that a predetermined pattern of incoming signals has been received (e.g., a high-frequency pattern such as 10101).

In the embodiment of FIG. 6, the threshold counter 219 outputs the threshold count 220 to a DAC 221 which, in turn, generates a corresponding data-level threshold 170. Although depicted as being part of the adaptive module 159, the DAC may alternatively be a component within the adaptive samplers 153 and 155 of FIG. 5 (e.g., a DAC that operates to bias the sampler to establish the data-level threshold). In such an embodiment, a digital control value (i.e., the threshold count 220) is output from the adaptive module 159 rather than an analog threshold level (or analog biasing signal). Sampling circuit embodiments having biasing circuitry to establish a data-level threshold in response to a digital control value are described below.

Still referring to FIG. 6, the adaptive module may additionally include a filter 211, offset counter 213 and DAC 215 to enable offset cancellation within the data sampler 151 of FIG. 5. During an offset cancellation operation, an offset adjust signal 202 is asserted at an input of the finite state machine, and a null signal is generated at the data sampler input, for example, by switchably coupling differential sampler inputs together, or by transmitting null data over a differential signal path (i.e., signal levels impressed on component lines of the differential signal path have the same levels). A steady-state positive or negative output from the data sampler in response to the null data input indicates a steady-state error within the sampler. That is, if the sampler repeatably interprets nominally equal signal levels at its differential inputs as indicating a logic '1' or logic '0' value, then the sampler exhibits a steady-state offset (i.e., DC offset) which may be canceled by an appropriate bias setting. Accordingly, the data sample, after being filtered by the filter 211 (which may be omitted in alternative embodiments), is supplied to an up/down input of the offset counter 213. The finite state machine responds to assertion of the offset adjust signal by asserting an update-offset signal 224 (UO) after each new data sample is loaded into the shift register (or after a predetermined number of data samples have been loaded), thereby enabling the offset count 214 maintained within the offset counter 213 to be adjusted up or down. In the embodiment of FIG. 6, the offset count 214 is supplied to DAC 215 which, in turn, generates an analog control value 216 (OFST) that is applied within the data sampler to bias the sampler in a direction counter to the DC offset. Alternatively, the offset count 214 itself may be supplied to the sampler. In either case, a negative feedback loop is created in which the data sampler bias is adjusted to drive the DC offset to zero, a condition indicated by a dithering offset count 214. In one embodiment, the offset count 214 is supplied to the finite state machine 205 (or other control circuit) to enable the finite state machine 205 to determine when a target DC offset count has been reached (i.e., offset calibration operation complete). In alternative embodiments, the finite state machine 205 continues to assert the update-offset signal 224 (i.e., continuing the DC offset calibration operation) until the offset adjust signal 202 is deasserted. The offset adjust signal 202 may be asserted, for example and without limitation, for a predetermined time, or until a predetermined number of data samples have been generated, or until a dithering offset count is detected.

In one embodiment, the offset count 214 (or DAC output 216) is supplied to both the data sampler 151 and the adaptive samplers 153, 155 of FIG. 5, on the assumption that the DC offset of the adaptive samplers is likely to track the DC offset of the data sampler. This may be the case, for example, when a substantial contributor to DC offset is the signal path itself, or when the DC offset is process, voltage or temperature dependent. In an alternative embodiment, additional offset calibration circuitry (e.g., filter, offset counter and, if needed, DAC) is provided within the adaptive module 159 to enable DC offset calibration of the adaptive samplers 153 and 155. In another alternative embodiment, multiplexing circuitry is used to select the error sample register 203 to provide the sample value to the filter 211 instead of the data sample register 201. In such alternative embodiments, the threshold count applied to the adaptive sampler (153 or 155) is temporarily zeroed (or disabled from being applied within the adaptive sampler) to enable determination of the DC offset.

Power Scaling

Still referring to FIG. 6, after the power scaling logic 209 (or other circuitry within the adaptive module) updates the transmit pre-emphasis tap weights 174, the power scaling logic 209 scales the updated tap weights to ensure that the total power indicated by the aggregate magnitudes of the tap weights does not exceed the power constraint (peak or average) of the equalizing transmitter 118 of FIG. 3. In one embodiment, the power constraint of the transmitter 118 corresponds to the maximum DAC setting of the primary driver 121 which, in an exemplary 8-bit sign-magnitude implementation, is $2^7 - 1 = 127$ (alternatively, the maximum DAC setting, and therefore the power constraint, may be programmed into a configuration circuit within the receive-side and/or transmit-side device, or supplied to the receive-side and/or transmit-side devices during system initialization). Thus, assuming an initial condition in which the primary driver tap weight is set to max power (i.e., sign bit=1, magnitude=127), then as the magnitudes of the initially-zero pre- and post-tap weights increase, the power constraint may be exceeded. As discussed above, the sign-sign LMS update logic of FIG. 6 updates the tap weights according to the following equation:

$$\underline{W}_{N+1} = \underline{W}_N + \text{stepsize} * \text{sign}(EP_n) * \text{sign}(\underline{D}) \quad (3).$$

Thus, the tap weight updates are obtained by multiplying the stepsize, and signs of the error sample and data sample, so that expression (3) may be rewritten as follows:

$$\underline{W}_{N+1} = \underline{W}_N + \underline{\text{Update}}_N \quad (4).$$

The transmit circuit power constraint may be expressed as a sum of the magnitudes of the output driver tap weights. That is:

$\Sigma|Wn| \leq W_{MAX}$, where $W_{MAX}$ is the square root of the normalized power limitation (i.e., in the case of a peak power constraint; in the case of an average power constraint, the expression becomes the L2 norm: $\Sigma Wn^2 \leq W_{MAX}^2$). In a current mode transmitter, the tap weights, W, control the current contribution of each output driver, which in turn controls the voltage level developed on the signaling path and therefore the power output of the drivers. In a voltage mode transmitter, the tap weights control the voltage contribution of each output driver, and therefore the power output of the drivers. In the tap weight update expressions herein, the term, $W_{MAX}$, refers to the square root of the normalized peak or average power constraint.

In one embodiment, transmit pre-emphasis tap weights are re-scaled directly after each update by multiplying each tap weight magnitude by a ratio of the power constraint to the power represented by the updated tap weights. That is:

$$\underline{W}_{N+1} = (\underline{W}_N + \underline{\text{Update}}_N) * (W_{MAX}/|\underline{W}_N + \underline{\text{Update}}_N|_1) \quad (5),$$

where $|\underline{W}_n + \underline{\text{Update}}_N|_1$ is the sum of the magnitudes of the tap weights that would result if the updates were applied (i.e., $|W_N(0) + \text{Update}(0)| + |W_N(1) + \text{Update}(1)| + \ldots + |W_N(4) + \text{Update}(4)|$). Direct re-scaling may be carried out by a processing unit (e.g., digital signal processor, special purposes processor, or general purposes processor) within either the receive-side IC device or transmit-side IC device (i.e., the IC devices that include the receiver 116 and transmitter 118, respectively, of FIG. 3) or by another device. Alternatively, a state machine or dedicated logic circuit may be used to carry out the direct re-scaling operation (e.g., using integer arithmetic).

In an alternative embodiment, the power scaling logic 209 of FIG. 6 performs a power scaling operation based on a Taylor-series approximation that reduces computational complexity relative to the direct re-scaling approach. That is, rewriting expression (4), the following expression for residual power (i.e., amount of power by which the updated tap weights exceed or fall below the power constraint) is obtained:

$$W_{RES} = |\underline{W}_N + \underline{\text{Update}}_N|_1 - W_{MAX} = \Sigma[\text{sgn}(W_N(i)) * \text{Update}_N(i)] \quad (6).$$

Combining expressions (5) and (6), the direct re-scaling operation may be expressed as a ratio of the residual power and the power limit:

$$\underline{W}_{N+1} = (\underline{W}_N + \underline{\text{Update}}_N) * [1 + W_{RES}/W_{MAX}]^{-1} \quad (7).$$

Using the Taylor-series approximation, $[1+W_{RES}/W_{MAX}]^{-1} \approx [1-W_{RES}/W_{MAX}]$, expression (7) may be rewritten as follows:

$$\underline{W}_{N+1} \approx (\underline{W}_N + \underline{\text{Update}}_N) - [(\underline{W}_N + \underline{\text{Update}}_N) * W_{RES}/W_{MAX}] \quad (8).$$

Expression (8) may be implemented in a relatively small logic circuit considering that the term $(\underline{W}_n + \underline{\text{Update}}_N)$ may be obtained through integer addition, and, because $W_{RES}$ will usually be significantly smaller than $W_{MAX}$, the multiplication by $W_{RES}/W_{MAX}$ can be reduced to a right-shift, binary division operation. That is, $1/W_{MAX}$ involves a right shift by $\log_2(W_{MAX})$ bits, so long as $W_{MAX}$ is a power-of-two value (e.g., 128). Similarly, $W_{RES}$, which ranges from +5 to −5 in the five-driver embodiment of FIGS. 3 and 7, will be a power of 2 value in all cases except for +/−3 or +/−5, which may be rounded to a power of 2 number. In one embodiment, for example, +/−3 $W_{RES}$ values are alternately rounded to +/−2 and +/−4. $W_{RES}$ values of +/−5 are rounded to +/−4. Different rounding schemes may be used in alternative embodiments. For example, $W_{RES}$ values of +/−5 may be rounded by toggling between 8 and 4 (e.g., rounding to 8 once for every three roundings to 4).

Clock Recovery

Referring again to FIG. 5, the clock recovery circuit 161 generates a data clock signal 176 (DCLK) in response to the data samples 160 and error samples 162, 164 generated by the data sampler and adaptive samplers 153, 155, and optionally generates an edge clock signal in response to transition samples 168 ($T_{n-1}, T_{n-2}, T_{n-3}, \ldots$), generated by the edge sampler 157. The data clock signal 176 is provided to the data sampler 151 and adaptive samplers 153, 155 to control the sampling times for data and error sample generation and therefore defines each successive data reception interval. The edge clock signal 178 is phase aligned with transitions of the input signal 166 (i.e., at the edges of data eyes) and compares the incoming signal with the zero threshold to obtain transition samples that each indicate whether a corresponding transition of the input signal 166 crossed the zero threshold before or after the edge-clock-triggered sampling instant. While a single data clock signal 176 and a single edge clock signal 178 are shown in FIG. 5, multiple phase-distributed data clock signals 176 and/or edge clock signals 178 may be generated by the clock recovery circuit 161 to enable receipt of multi-data rate signals. For example, in a double data rate system, the clock recovery circuit 161 may generate complementary data clock signals DCLK and /DCLK to enable capture of data and error samples in both odd and even phases of the data clock signal 176. If an edge clock is needed, the clock recovery circuit 161 may similarly generate complementary edge clock signals, ECLK and /ECLK.

Figure 7:
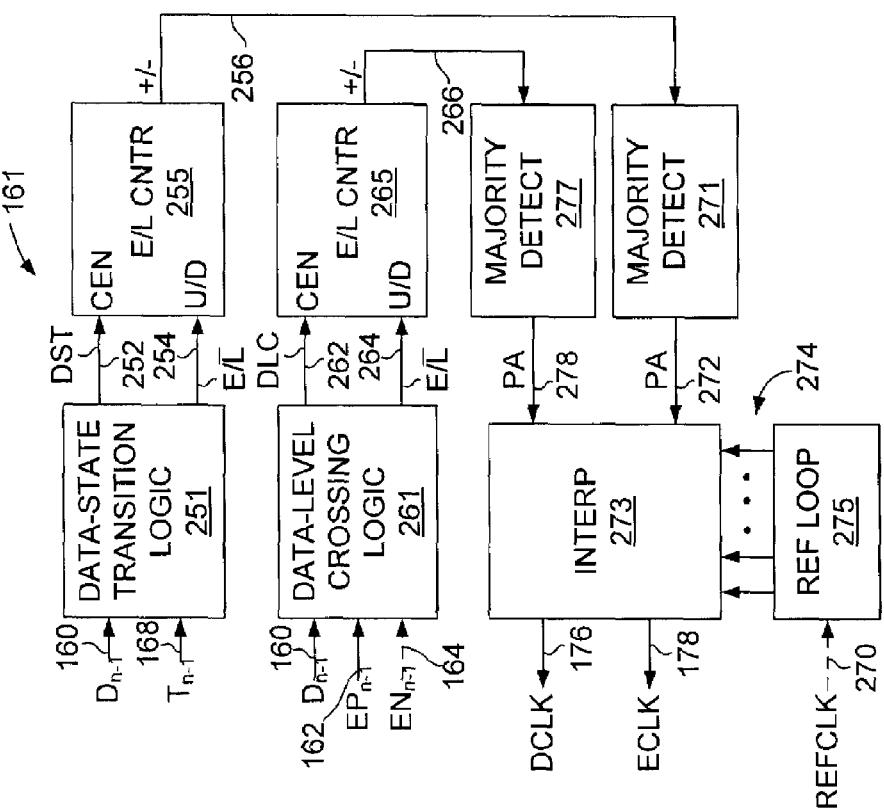
FIG. 7 illustrates an embodiment of a clock recovery circuit that may be used to implement the clock recovery circuit of FIG. 5.

FIG. 7 illustrates an embodiment of the clock recovery circuit 161 of FIG. 5. The clock recovery circuit 161 includes data-state transition logic 251, data-level crossing logic 261, early/late counters 255 and 265, majority detectors 271 and 277, interpolator 273 and reference loop 275. In the embodiment of FIG. 7, the data-state transition logic 251 asserts a data-state transition signal 252 (DST) upon determining that successive data samples, $D_{n-1}$ and $D_{n-2}$, indicate a high-to-low or low-to-high transition in the input signal (i.e., $D_{n-1}$ and $D_{n-2}$ have different states), and asserts an early/late signal 254 according to the direction of the incoming signal transition (rising or falling transition) and the state of the corresponding transition sample, $T_{n-1}$ (e.g., a logic high early/late signal to indicate an early condition, and a logic low signal to indicate a late condition). The data-state transition signal 252 is supplied to a count enable input (CEN) of the early/late counter 255 to enable an early/late count value maintained within the counter 255 to be incremented or decremented according to the state of the early/late signal 254. In one embodiment, the data-state transition logic 251 outputs a logic high early/late signal 254 if the transition sample, $T_{n-1}$, does not match the trailing data sample, $D_{n-2}$, and a logic low early/late signal 254 if the transition sample matches the trailing data sample, $D_{n-2}$. That is, if the transition sample, $T_{n-1}$, is captured after the decision threshold (e.g., zero threshold) is crossed in the transition from $D_{n-1}$ to $D_{n-2}$, the transition sample will match the $D_{n-2}$ sample and thereby indicate that the edge clock signal transition is late relative to the incoming signal transition. Conversely, if the transition sample is captured before the transition from $D_{n-1}$ to $D_{n-2}$, the transition sample will not match the $D_{n-2}$ sample, thereby indicating that the edge clock signal transition is early relative to the incoming signal transition.

In one embodiment, the early/late counter 255 is initialized to zero, then incremented in response to an early indication (i.e., a logic high early/late signal 254) and decremented in response to a late indication (i.e., a logic low early/late signal 254). By this operation, the sign bit (e.g., the MSB) of the early/late count maintained within the early/late counter 255 indicates whether more early than late indications, or more late than early indications have been received from the data-state transition logic 251 (i.e., the count value will underflow to a negative value if more late indications than early indications are detected).

Figure 8:
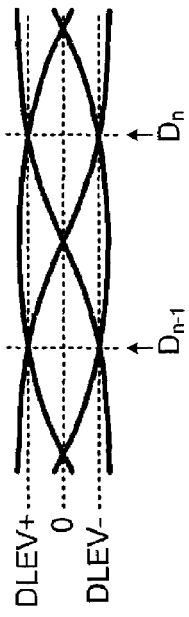
FIG. 8 illustrates a data waveform that results from the pinching effect of transmit pre-emphasis.
Figure 9:
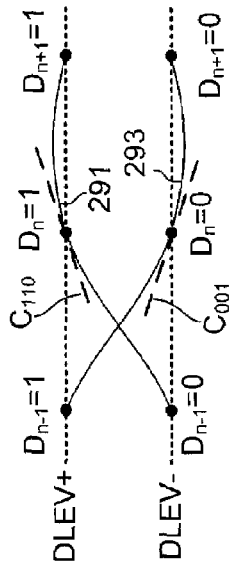
FIG. 9 illustrates a pair of signaling patterns that yield sloped data-level crossings that coincide with a data sampling time.

The data-level crossing logic evaluates incoming data samples to identify patterns that correspond to a sloped input-signal-crossing of a data-level threshold, then using the error sample captured at the nominal threshold crossing time to determine if the data clock signal is early or late relative to the data-level crossing. Referring to FIG. 8, for example, because of the pinching effect of transmit pre-emphasis, certain signaling patterns yields a sloped data-level crossing that coincides with a data sampling time. More specifically, as shown in FIG. 9, if the input signal conveys a logic '0' value at the $D_{n-1}$ sampling time, and a logic '1' value at the $D_n$ and $D_{n+1}$ sampling times, then the pinching effect of transmit pre-emphasis will force (i.e., pin) the signal level at the positive data-level threshold (DLEV+) at the $D_n$ sampling time followed by a data-level overshoot 291 before the signal level returns to the positive data-level threshold in time for the $D_{n+1}$ sample. Thus, a 0-to-1-to-1 signaling pattern (i.e., D[n+1:n−1]=110) yields a rising-slope crossing of the positive data-level threshold at the $D_n$ sampling time (i.e., the middle of the three data sampling times) as shown by tangent line, $C_{110}$. Similarly, a 1-to-0-to-0 signaling pattern (i.e., D[n+1:n−1]=001) yields a signal that it is forced to the negative data-level threshold (DLEV−) at the $D_n$ sampling time followed by a data-level undershoot 293, and therefore constitutes a falling-slope crossing of the negative data-level threshold (DLEV−) at the $D_n$ sampling time, as shown by tangent line, $C_{001}$. Because the error samples, $EP_{n-1}$ and $EN_{n-1}$, indicate, in such sloped data-level crossings, whether the crossing occurred before or after the data sampling time, the error samples may be used to recover clocking information that is independent of the data-state transition times detected by the data-state transition logic 251. In the particular embodiment of FIG. 7, for example, when the data-level crossing logic detects a sequence of data samples that indicate a sloped crossing through a data-level threshold, the data-level crossing logic 261 asserts a data-level crossing signal 262 and generates an early/late signal 264 according to whether the error sample was captured before or after the data-level crossing. The data-level crossing signal 262 is supplied to a count enable input (CEN) of the early/late counter 265 to enable an early/late count value maintained within the counter 265 to be incremented or decremented according to the state of the early/late signal 264. In one embodiment, if the data sample pattern indicates a rising-slope crossing of the positive data-level threshold (DLEV+), then the data-level crossing logic 261 outputs a logic high early/late signal 264 (i.e., indicating an early clock transition) in response to a logic '0' error sample $EP_n$ (i.e., an error sample indicating that the input signal level was below the positive data-level threshold at the sampling instant) and a logic low early/late signal 264 in response to a logic '1' error sample, $EP_n$. If the data sample pattern indicates a falling-slope crossing of the negative data-level threshold (DLEV−) and if an adaptive sampler is provided to generate negative error samples, $EN_n$, then the data-level crossing logic 261 outputs a logic high early/late signal in response to a logic '1' error sample $EN_n$ (i.e., an error sample indicating that the input signal was above the negative data-level threshold at the sampling instant) and a logic low early/late signal 264 in response to logic '0' error sample, $EN_n$.

In one embodiment, the early/late counter 265 is initialized to zero along with early/late counter 255, then either incremented or decremented according to early/late signal 265 when data-level crossing signal 262 is asserted. By this operation, the sign bit of the early/late count maintained within the early/late counter 265 indicates whether more early than late indications, or more late than early indications have been received from the data-level crossing logic 261.

Majority detector 271 receives a vote result 256 (e.g., the early/late count or sign of the early/late count) from early/late counter 255 and outputs a multi-bit phase adjust signal 272 (PA) in one of three states to either advance, retard or hold (i.e., maintain) the phase of the edge and data clock signals 178 and 176. Majority detector 277 receives a vote result 266 (e.g., the early/late count value or sign thereof) from the early/late counter 265 and outputs a multi-bit phase adjust signal 278 to either advance, retard or hold the phase of the data clock signal 176. In the embodiment of FIG. 7, the interpolator 273 maintains a data-phase control word and edge-phase control word that are used to control the phases of the data clock signal 176 and edge clock signal 178, respectively. The most significant bits of each phase control word are used to select a respective pair of phase vectors from a set of phase vectors 274 generated by the reference loop 275, and the least significant bits of the phase control word are used to interpolate between the selected pair of phase vectors, the resulting interpolated signal corresponding one of the data and edge clock signals 176, 178. As a given phase control word is incremented (e.g., in response to a high up/down signal), the interpolation is incrementally shifted from the leading one of the selected phase vectors to the trailing one of the selected phase vectors, thereby incrementally delaying (i.e., retarding) the phase of the resultant clock signal. Conversely, as the control word is decremented, the interpolation is incrementally shifted toward the leading one of the selected phase vectors, thereby incrementally advancing the phase of the clock signal.

In one embodiment, the data-phase control word is initialized (e.g., at system startup) to a value that corresponds to nominal data-to-edge phase offset (e.g., a 90 degree phase offset in an embodiment in which data and edge clocks are quadrature aligned). Thereafter, both the data-phase control word and edge-phase control word are incremented and decremented in response to the phase-adjust signal 272, and the data-phase control word is additionally incremented and decremented in response to the phase-adjust signal 278. By this operation, as the edge-phase control word is adjusted to align the edge clock signal with edges of data eyes, the data clock signal is adjusted to maintain the nominal data-to-edge phase offset. Also, as the data-phase control word is adjusted in response to phase-adjust signal 278, the otherwise fixed phase offset between data and edge clock signals is fine-tuned according to the timing information recovered by the data-level crossing logic 261, thereby enabling the data sampling point to be offset from the temporal midpoint between edge clock transitions. The update rate of the data-phase and edge-phase control words need not be equal. For example, in one embodiment, both the phase-adjust signals 272 and 278 are periodically updated at different frequencies. In other embodiments, the early/late counters 255 and 265 may provide update signals to majority detectors 271 and 277, respectively, to indicate when a predetermined number of count enable events have occurred (i.e., counter 255 asserting an update signal after a predetermined number of assertions of data-state transition signal 252, and counter 265 asserting an update signal after a predetermined number of assertions of data-level crossing signal 262). Because data-state transitions are statistically more probable than sloped data-level crossings, setting the predetermined number of count enable events to the same value for both the early/late counters 255 and 265 will yield a more frequent update of phase adjust signal 272 than phase adjust signal 278. Also, the predetermined number of count enable events for updating phase-adjust signal 272 may be higher or lower than the predetermined number of count enable events for updating phase-adjust signal 278 as necessary to establish a desired update ratio. Further, either or both numbers of count enable events may be programmable (e.g., in a configuration register) to establish a nominal update frequency for the phase adjust signals 272 and 278.

In one embodiment, the reference loop 275 is formed by a delay locked loop (DLL) that receives a reference clock signal 270 and, in response, generates a plurality of phase vectors 274 that are phase distributed within a cycle time of the reference clock signal 270. Alternatively, the reference loop 275 may be a phase locked loop (PLL) that multiplies the reference clock frequency to generate a plurality of phase vectors 274 having a higher frequency than the reference clock frequency. In another alternative embodiment, the reference loop 275 may include an internal timing reference generator (e.g., a ring oscillator or other clock generating circuit) so that no reference clock signal 270 is required. Also, as discussed above, the interpolator 273 may generate any number of data clock and edge clock signals. For example, in a double data rate system, the interpolator 273 generates an edge clock signal and complement edge clock signal, and a data clock signal and complement data clock signal, the data clock signal being offset from the edge clock signal by a nominal quarter cycle (90 degrees) of the edge clock signal, the offset being fine-tuned according to the phase-adjust signal 278 generated in response to timing information from the data-level crossing logic 261. Similarly, in a quad data rate system, the edge and data clock cycle may be nominally offset by an eighth clock cycle (45 degrees), with fine-tuning according to the data-level crossing information. This approach may be extended to support virtually any data rate.

Figure 10:
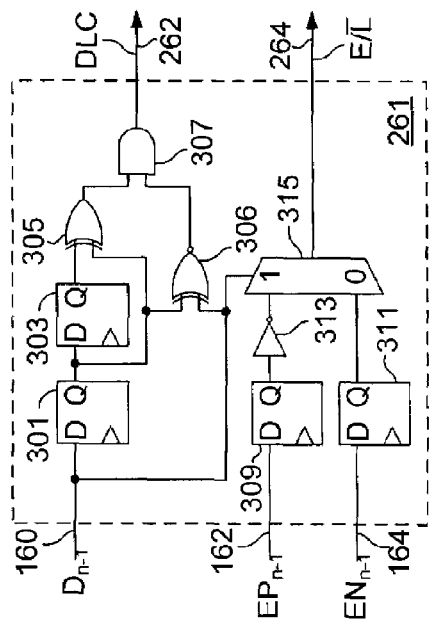
FIG. 10 illustrates an embodiment of the data-level crossing logic of FIG. 7 that asserts a data-level crossing signal and corresponding early/late signal in response to detecting the sloped data-level crossings shown in FIG. 9.

FIG. 10 illustrates an embodiment of the data-level crossing logic 261 of FIG. 7 that asserts a data-level crossing signal 262 and corresponding early/late signal 265 in response to detecting the sloped data-level crossings shown in FIG. 9. The data-level crossing logic includes storage elements 301, 303, 309 and 311 (e.g., flip-flops, latches or other storage elements), exclusive-OR gate 305, exclusive-NOR gate 306, AND gate 307 inverter 313 and multiplexer 315. In one embodiment, each of the storage elements 301, 303, 309 and 311 is clocked by the data clock signal (or derivative thereof) and are used to provide historical (i.e., previously received) data and error samples. Thus, storage elements 301 and 303 are coupled in a shift register arrangement (i.e., output of element 301 coupled to input of element 303) to receive data sample $D_{n-1}$, and therefore output previously received data samples $D_{n-2}$ and $D_{n-3}$, respectively. Reflecting on FIG. 9, it can be seen that the data sample patterns that correspond to monotonically sloped crossings of the positive and negative data-level threshold crossings include a data-state transition followed by a non-transition (i.e., 0→1→1 or 1→0→0). Thus, when the two most least recently received data samples, Dn–2 and Dn–3, are in a different state, the output of exclusive-OR gate 305 goes high to indicate the data-state transition. When the two most recently received data samples, $D_{n-1}$ and $D_{n-2}$, are in the same state, the output of exclusive-NOR gate 306 goes high to indicate the non-transition. If the outputs of gates 305 and 306 are both high, then AND gate 307 raises the data-level crossing signal 262 to indicate that a data sample pattern that corresponds to a monotonically sloped data-level crossing has been detected.

Storage elements 309 and 311 receive error samples $EP_{n-1}$ and $EN_{n-1}$ at their inputs, and output previously received error samples $EP_{n-2}$ and $EN_{n-2}$. If a 0→1→1 data sample pattern has been detected, then the most recently received data sample, Dn–1 will be a logic '1' value, and error sample EPn–2 will be high if the data sampling instant was late relative to the data-level crossing (i.e., the sample being captured after the input signal has crossed DLEV+) and low if the data sampling instant was early. Conversely, if 1→0→0 data sample pattern has been detected, then Dn–1 will be a logic '0', and error sample ENn–2 will be high if the data sampling instant was early relative the DLEV– crossing and low if the data sampling instant was late. Thus, data sample DN–1 is provided to a control input of multiplexer 315 to select either the complement of error sample EPn–2 (the complement being generated by inverter 313 to establish a high=early, low=late correlation) or the error sample ENn–2 to be output as the early/late indication 264.

It should be noted that numerous other logic circuit arrangements may be used to detect monotonically sloped data-level crossings and to signal the early/late status of the corresponding data sampling point. Also, in an alternative embodiment, error samples $EN_{n-1}$ are not generated (e.g., adaptive sampler 155 of FIG. 5 is omitted) so that the data-level crossing signal 262 is raised only upon detecting sloped crossings of the positive data-level threshold. In such an embodiment, exclusive-NOR 306 may be replaced with an AND gate so that data-level crossing signal 262 is raised only in response to a 0→1→1 data sample pattern.

Multi-Modal Signal Distribution—Partial Response

Figure 11:
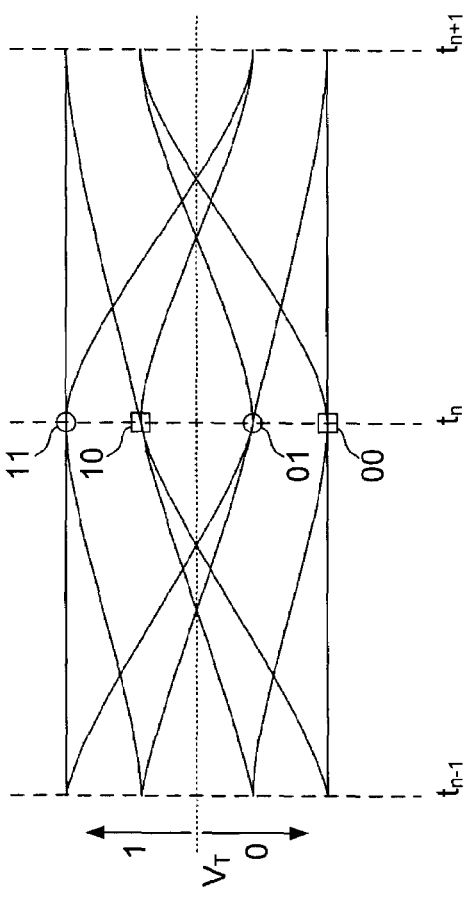
FIG. 11 illustrates the bimodal distribution of a binary signal observed at a signal receiver when the primary source of dispersion-type ISI is the signal transmitted in the immediately preceding symbol time.

FIG. 11 illustrates the bimodal distribution of a binary signal observed at a signal receiver when the primary source of ISI is the signal transmitted in the immediately preceding symbol time. That is, the symbol sampled at time $t_{n-1}$ is the primary source of ISI in the symbol sampled at time $t_0$; the symbol sampled at time $t_n$ is the primary source of dispersion-type ISI in the symbol sampled at time $t_{n+1}$; and so forth. Referring to the signal levels at time $t_n$, it can be seen that if the if the preceding symbol was a logic '1', the partial response to the preceding symbol will raise the signal level at time $t_n$ to one of the circled levels '11' or '01' (the second bit of the '11' and '01' bit sequences corresponding to the state of the signal at time $t_{n-1}$). If the preceding symbol was a logic '0', the partial response to the preceding symbol will lower the signal level at time $t_n$ to one of the square-designated levels '10' or '00'. In a single-ended signaling system, the incoming signal is sampled and compared with a reference voltage level at the midpoint between the steady state extremes (i.e., midway between the '11.1' and '00.0' signal levels). Accordingly, the worst case voltage margins (i.e., smallest voltage differences between the signal and reference voltage) occur when the signal transitions from a '1' to a '0' or vice-versa; the '10' and '01' signaling levels becoming indistinguishable when the partial response level (i.e., residual signal level from the preceding symbol transmission) is large. In a differential signaling system, the incoming signal and its complement are sampled, for example, by a differential sampling circuit which generates a data sample having a logic state according to the difference between the complementary signal levels. As in the single-ended case, the worst case voltage margins occur when the differential signal transitions from a '1' to a '0' or vice-versa; the '10' and '01' signaling levels becoming indistinguishable when the partial response pushes the '10' and '01' levels to the common mode (i.e., the average of a differential signal pair).

Figure 12:
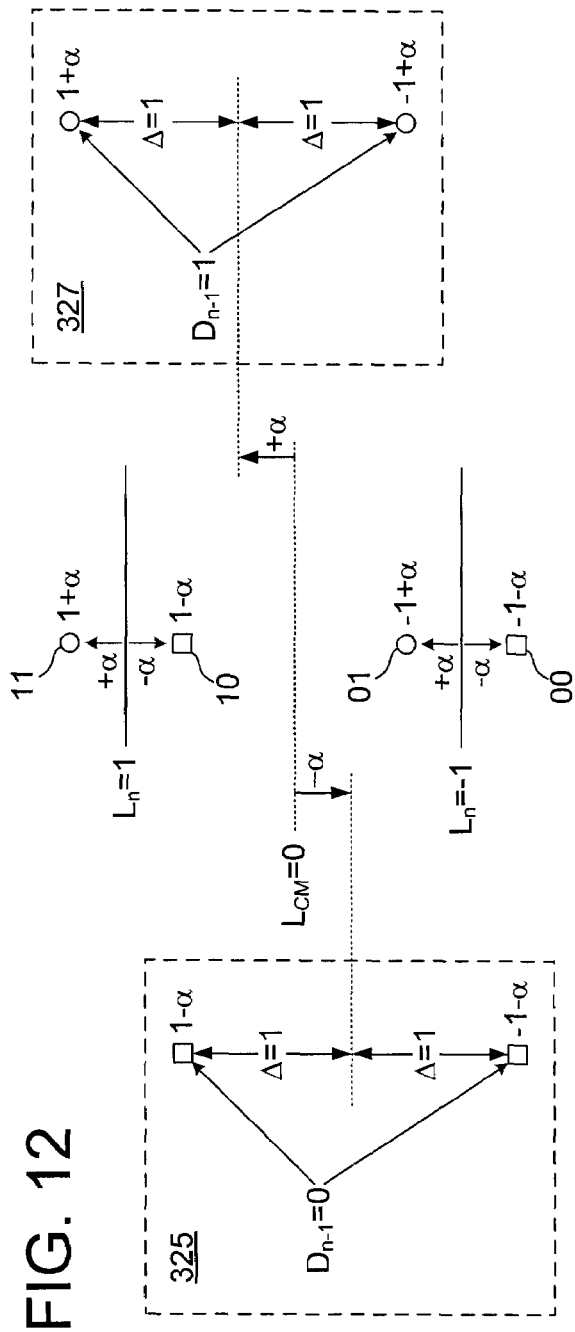
FIG. 12 illustrates the four partial response signal levels depicted in FIG. 5 relative to a common mode level, $L_{CM}$.

FIG. 12 illustrates the four partial response signal levels depicted in FIG. 11 relative to a common mode level, $L_{CM}$. In the case of a differential signaling system, the partial response to the preceding symbol may be viewed as increasing or decreasing the differential amplitude (i.e., the amplitude difference between the signals that form the differential signal pair) relative to a nominal differential amplitude. Normalizing the positive and negative signal levels for the nominal differential amplitude to 1 and −1, respectively, the common mode level, $L_{CM}$, becomes zero, and the four possible signal levels become $1+\alpha$, $1-\alpha$, $-1+\alpha$ and $-1-\alpha$, where $\alpha$ represents the magnitude of the partial response to the preceding symbol. Assuming binary signaling (multi-level signaling may alternatively be used) Thus, when the data sample captured at sampling time $t_{n-1}$ (i.e., $D_{n-1}$) is a '0', the signal level at sampling time $t_n$, is either $1-\alpha$ or $-1-\alpha$, depending on whether a logic '1' or logic '0' is being conveyed (i.e., depending on whether $D_n$ is a '1' or '0'). Similarly, when $D_{n-1}=0$, the signal level at sampling time $t_n$ is either $1+\alpha$ or $-1+\alpha$ according to the state of $D_n$. In the former case (i.e., when $D_{n-1}=0$), the two complementary signal levels, $-1-\alpha$ and $1-\alpha$, have a common mode of $-\alpha$, as shown in box 325. In the latter case (i.e., when $D_{n-1}=1$), the two complementary signal levels, $1+\alpha$ and $-1+\alpha$, have a common mode of $+\alpha$, as shown in box 327.

Partial Response Receiver

Figure 13:
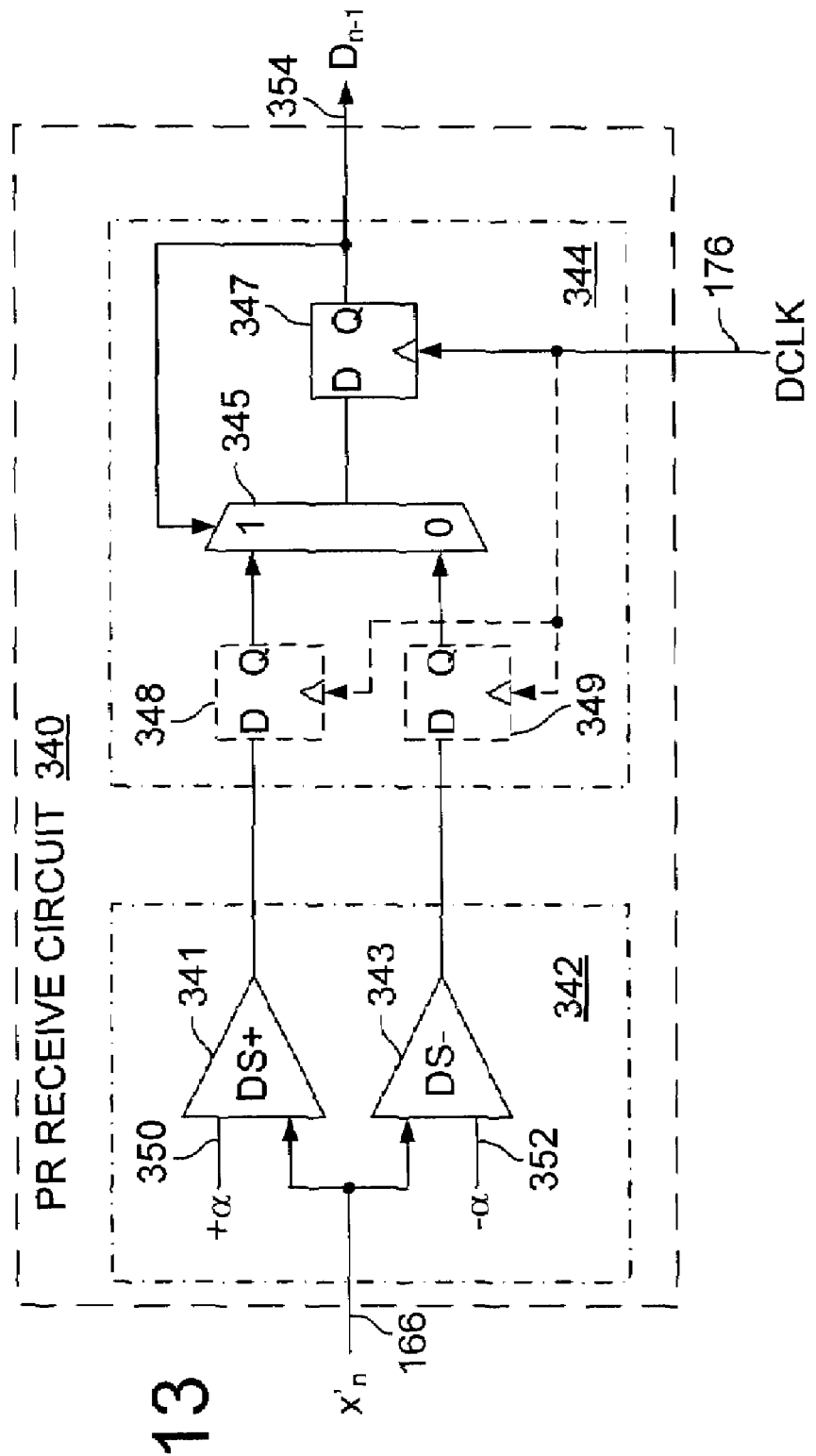
FIG. 13 illustrates a partial response receive circuit according to an embodiment of the invention.

FIG. 13 illustrates a partial response receive circuit 340 according to an embodiment of the invention that exploits the bi-modal characteristic of the signal levels depicted in FIGS. 11 and 12. The partial response circuitry includes a partial-response sampler 342 to sample the input signal 166 ($x'_n$), and a decision circuit 344 to generate an output data value (i.e., received data sample) based on data samples generated by the partial-response sampler 342. Rather than a single sampler that distinguishes between binary signaling levels based on whether the sampled signal is above or below a common mode threshold, the partial-response sampler 342 includes two sampling circuits 341 and 343 having threshold levels that are offset from the common mode threshold by the two possible partial responses to the preceding symbol. That is, the threshold level of the sampling circuit 341 is set the $+\alpha$ level (350), and the threshold level of the sampling circuit 343 is set to the $-\alpha$ level (352). By this arrangement, if the previously generated data sample is a '1' (i.e., $D_{n-1}=1$), sampling circuit 341 will resolve the incoming signal as being a '1' or '0' by determining whether the signal level is above or below the partial response level, $+\alpha$. Conversely, if $D_{n-1}=0$, sampling circuit 343 will resolve the incoming signal as being a '1' or '0' by determining whether the signal is above or below the partial response level, $-\alpha$. Because sample values are generated by both sampling circuits 341 and 343 at each data sampling instant, the selection of which sampler output (341 or 343) represents the proper sample of the input signal may be delayed until the state of the preceding data sample is resolved. In the partial response receive circuit 340, for example, the sample values output by the sampling circuits 341 and 343 are output to the decision circuit 344 where they are optionally stored in storage elements 348 and 349 (e.g., flip-flops or other types of storage circuits) and provided to respective input ports of a select circuit 345 (e.g., a multiplexer). The sample value selected by the select circuit 345 is stored in a storage element 347 in response to a data clock signal 176 (or other timing control signal) at which point the sample value becomes the received sample value, $D_{n-1}$. The $D_{n-1}$ sample value stored within storage element 347 is fed back to the select input of the select circuit 345 to select one of the two sample values generated by the sampling circuits 341 and 343. That is, the $D_{n-1}$ sample value is used to select, via select circuit 345, which of the sampling circuits 341 and 343 will source the $D_n$ sample. In an embodiment that includes the storage elements 348 and 349, the output of storage circuit 347 becomes the $D_{n-2}$ sample value and is used to select one of the $D_{n-1}$ sample values output from the storage elements 348 and 349.

Reflecting on the operation of the partial response receive circuit 340 of FIG. 13 in reference to the signal distribution shown in FIG. 12, it can be seen that the signaling margin (i.e., difference between signal levels representative of '1' and '0' states) within either of the sampling circuits 341, 343 exceeds the signaling margin between the worst-case partial response states. That is, the signaling margin between the worst-case partial response states (10-to-01) is $(1-\alpha)-(-1+\alpha)=2-2\alpha$, while the signaling margin in either pair of the separated signal constellation is $(1-\alpha)-(-1-1\alpha)=2$. Thus, as partial-response level ($\alpha$) grows, the signaling margin in a single-sampler receiver decreases, going to zero as $\alpha$ approaches 1. By contrast, the signaling margin in the partial response receive circuit 340 of FIG. 13 remains substantially constant at 2, even as $\alpha$ grows. In effect, by offsetting the threshold of the sampling circuits 341 and 343 by the partial response levels $+\alpha$ and $-\alpha$, respectively, the partial response to the preceding symbol transmission is canceled, increasing the margin available to resolve the state of the incoming signal.

Still referring to FIG. 13, a threshold generator 211 is used to generate the $\pm\alpha$ thresholds supplied to the sampling circuits 341 and 343. In the case of a single-ended signaling system, the threshold values $\pm\alpha$ may be voltage levels applied to reference inputs of the sampling circuits 341 and 343, respectively, to enable pseudo-differential signal detection (i.e., comparison of the incoming signal level with the threshold voltage level to resolve the digital state of the sample value). In the case of a differential signaling system, the threshold values $\pm\alpha$ may be voltages or currents applied to offset the common modes of the samplers to the $\pm\alpha$ voltage levels depicted in FIG. 12. The threshold values $\pm\alpha$ may also be digital values for controlling digital-to-analog converters (DACs) within the sampling circuits 341 and 343. In one embodiment, a threshold generator circuit (not shown in FIG. 13) performs a one-time or periodic determination of the $\pm\alpha$ threshold levels, for example, through one or more calibration operations. In other embodiments, the $\pm\alpha$ threshold levels are adaptively generated based on incoming signal levels produced by selected data patterns. Threshold generation is discussed in further detail below.

The partial response receive circuit 340 of FIG. 13 outputs a single received data sample per cycle of the data clock signal 176. That is, a rising (or falling) edge of the data clock signal 176 is used to capture (i.e., trigger generation of) samples of the incoming data signal. In a multi-data rate system, multiple data samples are output from the partial-response receive circuit per cycle of the data clock signal 176. In such systems, clock generation circuitry may be provided to generate multiple instances of the data clock signal 176 that are phase-distributed through a period (1/frequency) of the data clock signal. As discussed below, the clock generation circuitry may include clock recovery circuitry for adjusting the phase of the data clock signal 176 based on data-level crossing times and, optionally, based on data-state transition times.

Partial-Response Threshold Generation

Figure 14:
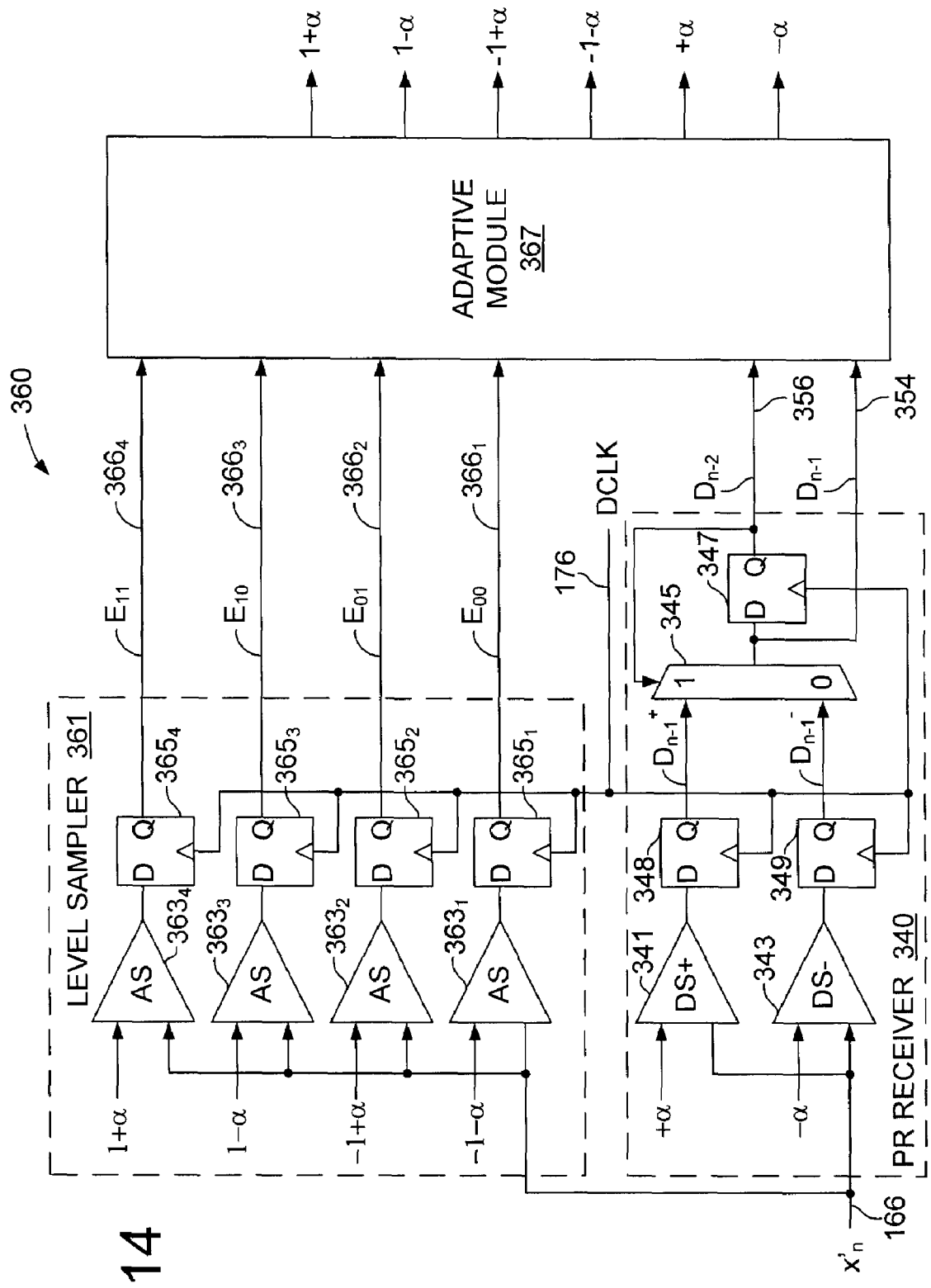
FIG. 14 illustrates an embodiment of a partial response receiver that adaptively generates partial response threshold levels.

FIG. 14 illustrates a partial response receiver 360 that includes circuitry for adaptively generating the partial response threshold levels $\pm\alpha$. The partial response receiver 360 includes a partial response receive circuit 340, a level sampler 361, and an adaptive module 367. The partial response receive circuit 340 operates generally as described above in reference to FIG. 7 to generate a pair of sample values based on comparisons (in sampling circuits 341 and 343) of the incoming signal 166 ($x'_n$) with offset thresholds $\pm\alpha$. The resulting samples are stored in storage elements 348 and 349 as data samples $D_{n-1}^+$ and $D_{n-1}^-$, the '+' and '−' superscripts designating the samples as corresponding to relatively positive and negative partial responses, respectively. A select circuit 345 selects one of the $D_{n-1}^+$ and $D_{n-1}^-$ samples to be the selected $D_{n-1}$ data sample 354 based on the state of the $D_{n-2}$ data sample 356 stored in storage element 347. In a multi-data rate system, the data sample 356 may be supplied by a counterpart partial response receive circuit clocked by a phase shifted version of the data clock signal 176. In either case, single- or multi-data rate, two or more time-adjacent sample values are supplied to (or buffered within) the adaptive module 367. In the embodiment of FIG. 14, sample values $D_{n-2}$ and $D_{n-1}$ are supplied to the adaptive module 367, though higher or lower latency samples may be provided in alternative embodiments.

The level sampler 361 includes four sampling circuits $363_1$–$363_4$ for comparing the signal level of the incoming signal 366 with each of the four thresholds levels that correspond to the bimodal signal distribution shown in FIGS. 11 and 12. That is, sampling circuit $363_4$ compares the incoming signal with a threshold level at $1+\alpha$ and generates a corresponding error sample $366_4$ ($E_{11}$) according to whether the level of the incoming signal is above or below the $1+\alpha$ threshold. Similarly, sampling circuits $363_3$, $363_2$ and $363_1$ compare the $D_n$ signal level with threshold levels at $1-\alpha$, $-1+\alpha$ and $-1-\alpha$, respectively, and generate corresponding error samples $366_3$, $366_2$, and $366_1$ ($E_{10}$, $E_{01}$ and $E_{00}$). Each of the error samples is buffered in a respective storage circuit $365_1$–$365_4$ before being provided to the adaptive module 367. By this arrangement, the error samples arrive at the adaptive module 367 with the same latency as the data sample 354 ($D_{n-1}$) generated by the partial response receive circuit 340.

The adaptive module 367 responds to the data samples from the partial response receive circuit 340 and the error samples from the level sampler 361 by selectively updating the threshold values supplied to the sampling circuits 341 and 343 within the partial response receive circuit 340 and comparators $363_1$–$363_4$ within the level sampler 361. For example, when data samples 354 and 356 indicate a 11 state (i.e., D[n−1:n−2]=11), the adaptive module 367 increases or decreases the $1+\alpha$ threshold level according to whether the incoming signal level is indicated by error sample $E_{11}$ ($366_4$) to be above or below the $1+\alpha$ threshold level. The adaptive module similarly updates the $1-\alpha$, $-1+\alpha$, and $-1-\alpha$ thresholds based on error samples $E_{10}$, $E_{01}$ and $E_{00}$ ($366_3$, $366_2$, $366_1$) when data samples 354 and 356 indicate the 10, 01 and 00 states, respectively. As discussed below, the $\pm\alpha$ levels may be derived from the $1+\alpha$, $1-\alpha$, $-1+\alpha$ and $-1-\alpha$ threshold levels, or a subset thereof.

FIG. 15 illustrates an embodiment of the adaptive module 367 of FIG. 14. The adaptive module 367 includes a 2:4 decoder 383, up/down counters $385_1$–$385_4$, averaging circuits 361 and 365, digital-to-analog converters (DACs) $387_1$–$387_4$, $389_1$ and $389_2$, and a filter circuit 351. The 2:4 decoder 383 activates one of four enable signal lines $384_1$–$384_4$ (i.e., asserts an enable signal on the signal line) according to the state of the input data samples $D_{n-1}$ and $D_{n-2}$ (also expressed herein as D[n−1:n−2]). Each of the counters $385_1$–$385_4$ has an up/down input (U/D) coupled to receive a respective one of the four error samples $366_1$–$366_4$ (i.e., $E_{00}$, $E_{01}$, $E_{10}$ and $E_{11}$), a count enable input (CEN) coupled to a respective one of the enable signal lines $384_1$–$384_4$, and a strobe input coupled to receive the data clock signal 176. By this arrangement, during each cycle of the data clock signal 176, the counter 385 coupled to the activated enable signal line 384 is incremented or decremented according to the state of the corresponding error sample. Thus, when D[n−2:n−1]=11, counter $385_4$ is incremented if error sample $366_4$ ($E_{11}$) indicates that the incoming signal level is above the $1+\alpha$ threshold level, and decremented if $E_{11}$ indicates that the incoming signal level is below the $1+\alpha$ threshold level. The count values maintained within counters $385_3$, $385_2$ and $385_1$ are similarly incremented and decremented according to error samples $366_3$–$366_1$ ($E_{10}$, $E_{01}$ and $E_{00}$), when enabled by respective enable signal lines $384_3$–$384_1$, respectively. In one embodiment, the filter circuit 351 is used to filter the incoming error samples, for example, by requiring a predetermined number of same-state error samples to be received within a given time before the corresponding control value is adjusted. Other types of error sample filtering may be applied in alternative embodiments. Also, the filter 351 may be omitted.

The count values maintained within the counters $385_1$–$385_4$ are output as control values $386_1$–$386_4$ (i.e., $C_{-1-\alpha}$, $C_{-1+\alpha}$, $C_{1-\alpha}$, $C_{1+\alpha}$) to respective DACs $387_1$–$387_4$ to generate the $-1-\alpha$, $-1+\alpha$, $1-\alpha$ and $1+\alpha$ threshold levels (designated $368_1$–$368_4$, respectively, in FIG. 15). Thus, the adaptive module 367 operates to selectively update the $-1-\alpha$, $-1+\alpha$, $1-\alpha$ and $1+\alpha$ threshold levels according to the state of the received data values D[n−1:n−2]. The averaging circuits 391 and 395 generate the $\pm\alpha$ threshold levels 350, 352 by averaging the control values $385_1$–$385_4$. Averaging circuit 395, for example, includes a summing circuit 396 to sum the $C_{1+\alpha}$ and $C_{-1+\alpha}$ control values ($386_4$, $386_2$) from counters $385_4$ and $385_2$, respectively, and a divide-by-2 element 397 (which may be achieved without active circuitry by dropping the least significant bit of the sum) to generate a control value $388_1$ ($C_\alpha$) that corresponds to the desired $+\alpha$ threshold level 350 (i.e., $(C_{1+\alpha}+C_{-1+\alpha})/2=C_\alpha$). Averaging circuit 391 similarly includes a summing circuit 392 to sum the control values $C_{1-\alpha}$ and $C_{-1-\alpha}$ ($386_3$, $386_1$) from counters $385_3$ and $385_1$, and a divide-by-2 element 393 to generate a control value $388_2$ ($C_{-\alpha}$) that corresponds to the desired $-\alpha$ threshold level 352. In one embodiment, the control values $386_1$–$386_4$ are supplied to DACS $387_1$–$387_4$, respectively, which generate the $-1-\alpha$, $-1+\alpha$, $1-\alpha$ and $1+\alpha$ threshold levels used within the level sampler 361 of FIG. 14, and control values 388$_1$ and 388$_2$ are supplied to DACs 389$_1$ and 389$_2$, respectively, to generate the +α and −α threshold levels used within partial response receive circuit 340 of FIG. 14. In an alternative embodiment, each of the comparators within the partial response receive circuit 340 and level sampler 361 include internal DACs and receive respective threshold values in the form of the control values 386$_1$–386$_4$, 388$_1$ and 388$_2$ themselves. Also, in a differential embodiment (and in single-ended embodiments, if desired), control values 388$_1$ and 388$_2$ (i.e., C$_{+\alpha}$ and C$_{-\alpha}$) may be complements of one another so that one of the averaging circuits 391 or 395 may be replaced by a multi-bit inverter that generates the complement control value based on the output of the remaining averaging circuit. Further, control values 3864 and 3861 (i.e., C$_{1+\alpha}$ and C$_{-1-\alpha}$) may be complements and/or control values 3863 and 3862 (i.e., C$_{1-\alpha}$ and C$_{-1+\alpha}$) may be complements such that two of the sampling circuits 363 within the level sampler 327 of FIG. 14 and two of the counters 385 within the adaptive module 367 (and two of the DACs 387, if used) may be omitted.

FIG. 16 illustrates an alternative circuit arrangement 405 that may be used in place of the averaging circuits 391 and 395 of FIG. 15. Instead of averaging the C$_{1+\alpha}$ and C$_{-1+\alpha}$ control values to generate the C$_{+\alpha}$ value, C$_{+\alpha}$ is generated by halving the difference between the C$_{1+\alpha}$ and the C$_{1-\alpha}$ control values (i.e., C$_\alpha$=((C$_{1+\alpha}$)−(C$_{1-\alpha}$))/2). Similarly, the C$_{-\alpha}$ value is generated by halving the difference between the C$_{-1-\alpha}$ and the C$_{-1+\alpha}$ control values. Thus, the circuit of FIG. 16 includes a difference circuit 406 to generate 2α by subtracting the C$_{1-\alpha}$ control value from the C$_{1+\alpha}$ control value, and a divide-by-2 element 407 (which may be a implemented by dropping the least significant bit of the difference) to generate C$_\alpha$ by halving the 2α value. Difference circuit 409 and divide-by-2 element 410 are used in a similar manner to generate C$_{-\alpha}$ from count values C$_{-1+\alpha}$ and C$_{-1-\alpha}$ in a corresponding manner.

Threshold Level Generator with Single Level-Adapting Comparator

Figure 17:
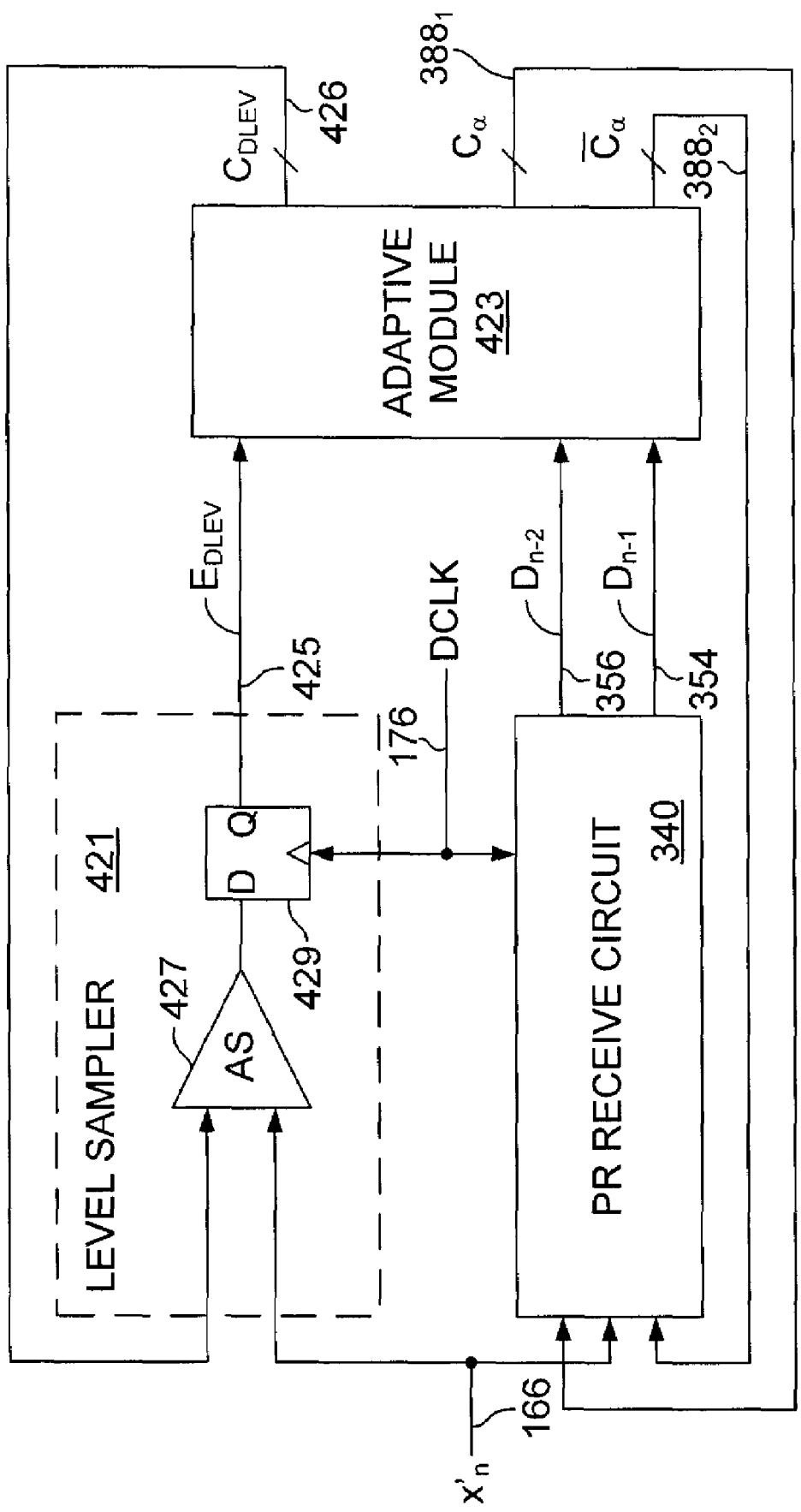
FIG. 17 illustrates a partial response receiver according to another alternative embodiment.

FIG. 17 illustrates a partial response receiver 420 according to another alternative embodiment. The partial response receiver 420 includes a partial response receive circuit 340 that operates generally as described in reference to FIGS. 13 and 14, a level sampler 421, and an adaptive module 423. Instead of the multiple sampling circuits included in the level sampler 361 of FIG. 14, the level sampler 421 includes a single sampling circuit 427 (i.e., an adaptive sampler) that generates an error sample 425 (E$_{DLEV}$) according to whether the incoming signal exceeds or is below a data-level threshold generated by the adaptive module 423. In the embodiment of FIG. 17, the data-level threshold is established by a multi-bit control value 426 (C$_{DLEV}$) generated by the adaptive module 423. In alternative embodiments, the data-level threshold may be established by an analog voltage or current generated by the adaptive module 423. The error sample 425 may be buffered in one or more storage circuits 429 before being forwarded to the adaptive module 423, thereby aligning the latency of the error sample 425 with data samples 354 or 356 generated by the partial response receive circuit 340.

The adaptive module 423 receives the error sample 425 from the level sampler 421 and data samples 354 and 356 (i.e., D$_{n-1}$ and D$_{n-2}$ in the example shown) from the partial response receive circuit 340 and, in response, generates control values, C$_\alpha$ and /C$_\alpha$ (388$_1$ and 388$_2$), to establish the ±α threshold levels within the partial response receive circuit 340, and the control value, C$_{DLEV}$ (426), to establish the data-level threshold within the level sampler 421. In one embodiment, the adaptive module 423 initially updates the C$_{DLEV}$ value upon detecting reception of the 1+α data pattern (i.e., D[n−1:n−2]=11) until the error samples 425 generated by sampling circuit 427 indicate that the data-level threshold has converged to the 1+α data level. Thereafter, the adaptive module 423 updates the C$_{DLEV}$ value in response to the 1−α data pattern (10) until the error samples 425 indicate that the data-level threshold has converged to the 1−α data level. The control value, C$_\alpha$, may be generated, for example, by halving the difference between the two C$_{DLEV}$ values (i.e., C$_{1+\alpha}$ and C$_{1-\alpha}$), and the /C$_\alpha$ control value may be generated by complementing the C$_\alpha$ value.

Figure 18:
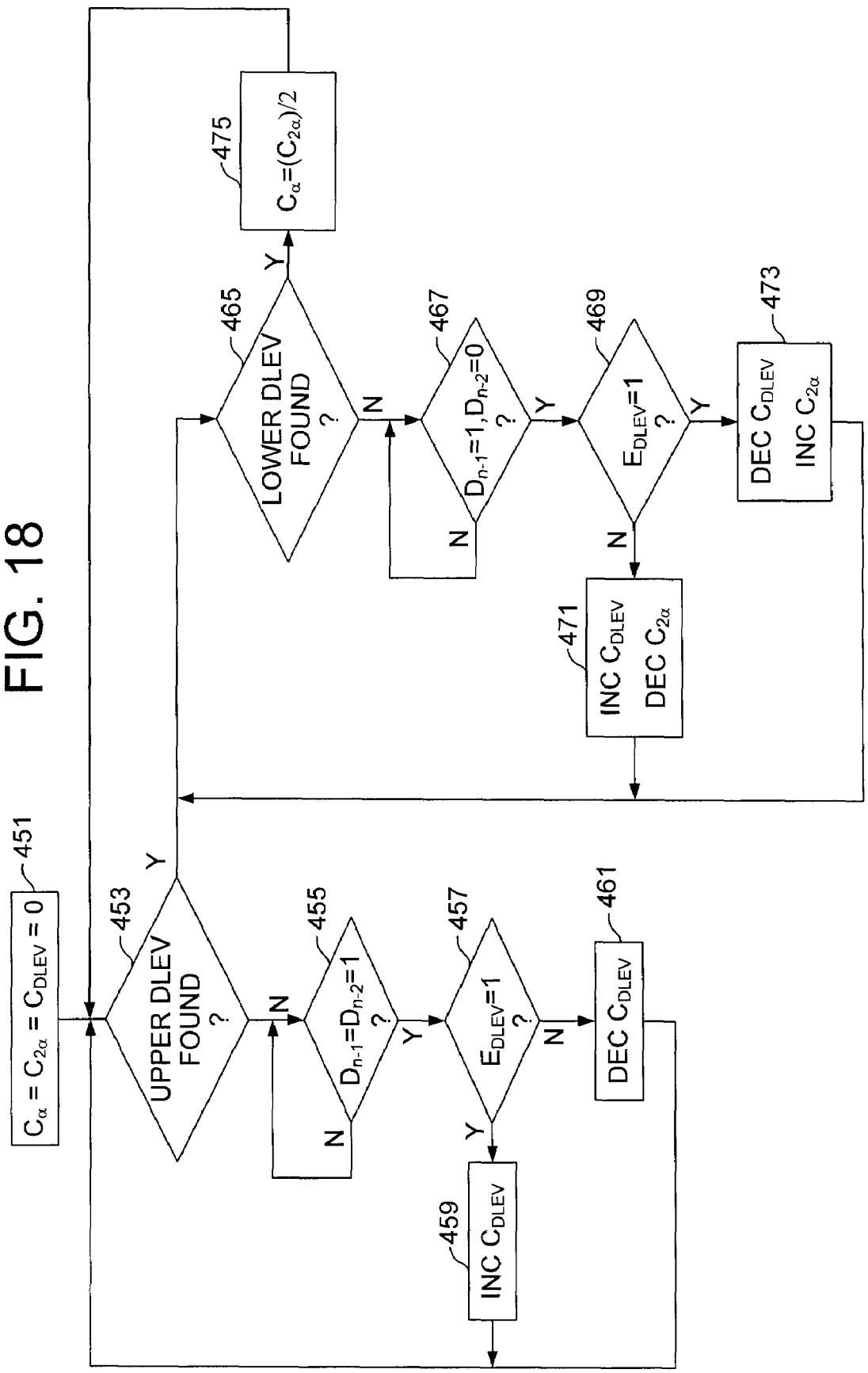
FIG. 18 illustrates an exemplary operation of the adaptive module of FIG. 17.

FIG. 18 illustrates the operation of the adaptive module 423 of FIG. 17 according one embodiment. Initially, at block 451, the control values, C$_\alpha$ and C$_{DLEV}$, and an internally maintained control value, C$_{2\alpha}$, are each set to a nominal zero value. In one embodiment, the nominal zero value corresponds to a DAC midpoint value. For example, in an 8-bit DAC, a midpoint value of 1000 0000b (the 'b' indicating binary notation) or 128 decimal may be used as the nominal zero value. The C$_{-\alpha}$ value may be generated by subtracting the C$_\alpha$ value from the full-scale DAC value. Thus, in the eight-bit example, when C$_{+\alpha}$=128, C$_{-\alpha}$=(2$^8$−1)−128=127. This result may also be obtained by complementing C$_\alpha$ (i.e., /C$_\alpha$=C$_{-\alpha}$).

At decision block 453, a history of increment and decrement operations applied to C$_{DLEV}$ value is evaluated to determine whether the threshold level that corresponds to the 1+α signal level has been reached (i.e., UPPER DLEV FOUND). In one embodiment, if, over the last N updates to the C$_{DLEV}$ value, the difference between the number of increment operations and the number of decrement operations is less than a predetermined value, the data-level threshold is deemed to be dithering about the 1+α signal level and the upper data-level threshold is therefore considered found. If the upper data-level threshold has not been found, then the data samples 354 and 356 generated by the partial response receive circuit 340 of FIG. 17 are evaluated in decision block 455 to determine whether a signal level at the 1+α level has been received (i.e., D[n−1:n−2]=11). If so, the error sample 425 generated by the level sampler 421 of FIG. 17, (i.e., E$_{DLEV}$), is evaluated in decision block 457 to determine whether the incoming signal level is greater than or less than the threshold level established by the present value of C$_{DLEV}$. If the error sample is a '1', the incoming signal level is greater than the threshold level, and the C$_{DLEV}$ value is incremented at 459 to increase the data-level threshold. If the error sample is a '0', the signal level is less than the data-level threshold and the C$_{DLEV}$ value is decremented at 461 to decrease the data-level threshold. As discussed above in reference to FIG. 15, some level of error sample filtering may be applied before incrementing or decrementing the C$_{DLEV}$ value. After the C$_{DLEV}$ value has been incremented or decremented (i.e., in block 459 or 461), the C$_{DLEV}$ increment/decrement history is evaluated again at decision block 453 to determine whether the upper data-level threshold has been found.

Returning to decision block 455, if D[n−1:n−2] is not equal to '11', the error sample, E$_{DLEV}$, is not evaluated and the operation at 455 is repeated for a subsequent set of data samples. Thus, in the level-adapting loop formed by blocks 453–461, the adaptive module selectively updates the C$_{DLEV}$ value, and therefore the data-level threshold according to the state of the data samples generated by the partial response receive circuit (i.e., updates the C$_{DLEV}$ value in response to detection of the 1+α sample pattern).

If, at decision block 453, the upper data level is deemed to be found, the history of increment and decrement operations is cleared and a second level adapting loop is begun at decision block 465. At decision block 465, the history of increment and decrement operations is evaluated to determine whether a data-level threshold corresponding to the 1−α data level has been found (i.e., LOWER DLEV FOUND). In one embodiment, if, over the last N updates to the $C_{DLEV}$ value, the difference between the number of increment operations and the number of decrement operations is less than a predetermined value, the data-level threshold is deemed to be dithering about the 1−α signal level and the lower data-level threshold is therefore considered found. If the lower data-level threshold has not been found, then the data samples 354 and 356 generated by the partial response receive circuit, are evaluated in decision block 467 to determine whether a signal level at the 1−α level has been received (i.e., D[n−1:n−2] =10). If not, decision block 467 is repeatedly entered for subsequent data sample pairs until a signal level at the 1−α level has been received. When data samples that correspond to the 1−α level are detected, the corresponding error sample, $E_{DLEV}$ (i.e., error sample 425), is evaluated at decision block 469 to determine whether the incoming signal level is above or below the data-level threshold established by the present value of $C_{DLEV}$. If the error sample is a '0', as it will be initially, the signal level is below the data-level threshold, and the $C_{DLEV}$ value is decremented at 473 to decrease the DLEV threshold level, and the $C_{2\alpha}$ control value is incremented to track the difference between the upper and lower data-level thresholds. If the error sample is determined to be a '1' at decision block 467, then $C_{DLEV}$ is incremented and $C_{2\alpha}$ decremented at block 471. By this arrangement, when the data-level threshold reaches the 1−α data level, the control value, $C_{2\alpha}$, will be representative of twice the +α threshold level. Accordingly, at block 475, control value $C_\alpha$ is generated by dividing $C_{2\alpha}$ by 2 (e.g., by right shifting or otherwise dropping the least significant bit of $C_{2\alpha}$). The $C_{-\alpha}$ value may be generated by complementing the $C_\alpha$ value as discussed above. Thereafter, adaptation of the data-level thresholds (and therefore control values $C_\alpha$ and $C_{-\alpha}$) is repeated starting at decision block 453. Alternatively, an updated $C_{2\alpha}$ value may be generated by counting the return increments from the lower data-level threshold to the upper data-level threshold, and another updated value of $C_{2\alpha}$ generated on a subsequent return to the lower data-level threshold, and so forth. The $C_\alpha$ value may be updated after each regeneration of the $C_{2\alpha}$ value. Also, rather than finding the 1+α and 1−α data levels, the 1+α and −1+α data levels may be determined, and the corresponding data level control values averaged to generate the $C_\alpha$ value.

Clock Recovery in a Partial Response Receiver

Figure 19:
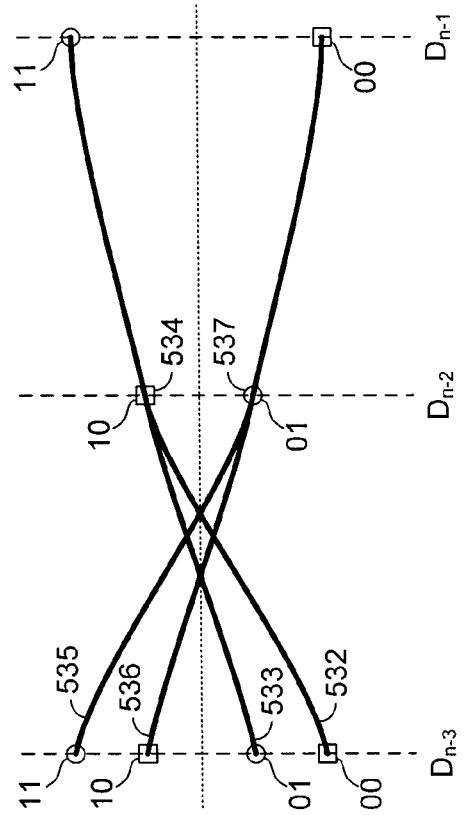
FIG. 19 illustrates an embodiment of a partial response receiver having a clock recovery function.

FIG. 19 illustrates an embodiment of a partial response receiver 500 that performs a clock recovery (CDR) function. That is, the partial response receiver 500 recovers both data and clocking information from the incoming data signal 166, $x'_n$. The partial response receiver 500 includes a data sampler/ level sampler 501, adaptive module 503, clock recovery circuit 505, edge sampler 507, and one or more storage elements 509. The data sampler/level sampler 501 operates as described above in reference to FIGS. 14 and 17 (i.e., performing the functions of a partial response receiver and level sampler) to generate one or more error samples, $E_{n-1}$, and data samples D[n−1:n−2]. The adaptive module 503 generates one or more threshold control values that are supplied to the data sampler/level sampler 501, including one or more data level control values, $C_{DLEV}$, and partial response control values, $C_{+\alpha}$ and $C_{-\alpha}$. The control values are used to establish threshold values in the partial response sampling circuits (i.e., the ±α data sampling circuits) and one or more level adapting sampling circuits as discussed above.

In the embodiment of FIG. 19, the clock recovery circuit 505 generates a data clock signal 176 (SCLK) and edge clock signal 178 (ECLK) in response to a transition sample, $T_{n-1}$, generated by the edge sampling circuit 507 and the data and error samples generated by the data sampler/level sampler 501 (i.e., $E_{n-1}$ and D[n−1:n−2]). Transitions of the data clock signal 176 constitute data sampling points and are used to trigger sampling operations and storage operations in the sampling circuits and storage elements within the data sampler/level sampler 501. While only a single data clock signal 176 is shown in FIG. 19, multiple data clock signals may be generated by the clock recovery circuit 505 to enable receipt of multi-data rate signals. For example, in a double data rate system, the clock recovery circuit may generate DCLK and /DCLK to enable generation of data and error samples in both odd and even phases of the data clock signal 176.

The clock recovery circuit 505 adjusts the phase of the edge clock signal 178 to maintain phase alignment between the edge clock signal 178 and data-state transitions (i.e., edges) in the incoming signal 166 (i.e., the edge clock signal 178 is phase aligned with edges of data valid intervals in the incoming data signal 166). The edge clock signal 178 is supplied to the edge sampling circuit 507 where it is used to trigger sampling of data-state transitions in the incoming data signal, and is also supplied to one or more storage circuits 509 provided to latency-align the transition sample, $T_{n-1}$, with the data sample, $D_{n-1}$. In the case of a low-to-high data signal transition, a logic '1' transition sample (i.e., $T_{n-1}$=1) indicates that the edge clock transition occurred after the transition in the data signal and therefore that the edge clock signal 178 lags the data signal transition. Conversely, a logic '0' transition sample indicates that the edge clock transition occurred prior to the low-to-high data signal transition and therefore that the edge clock signal 178 leads the data signal transition. The transition samples from edge sampling circuit 507 and data samples from the data sampler/level sampler 501 are used within the clock recovery circuit 505 to adjust the phase of the edge clock signal 178 as necessary to maintain alignment between the edge clock signal 178 and data-state transitions in the incoming data signal. In one embodiment, the data clock signal 176 is initially set to a nominal phase offset from the edge clock signal 178 that corresponds to a temporal midpoint between successive edge clock transitions. Clock recovery based on monotonically sloped crossings of data-level thresholds are then used to adjust the phase of the data clock signal 176 to establish a desired sampling point that may be offset from the temporal midpoint between edge clock transitions.

Figure 20:
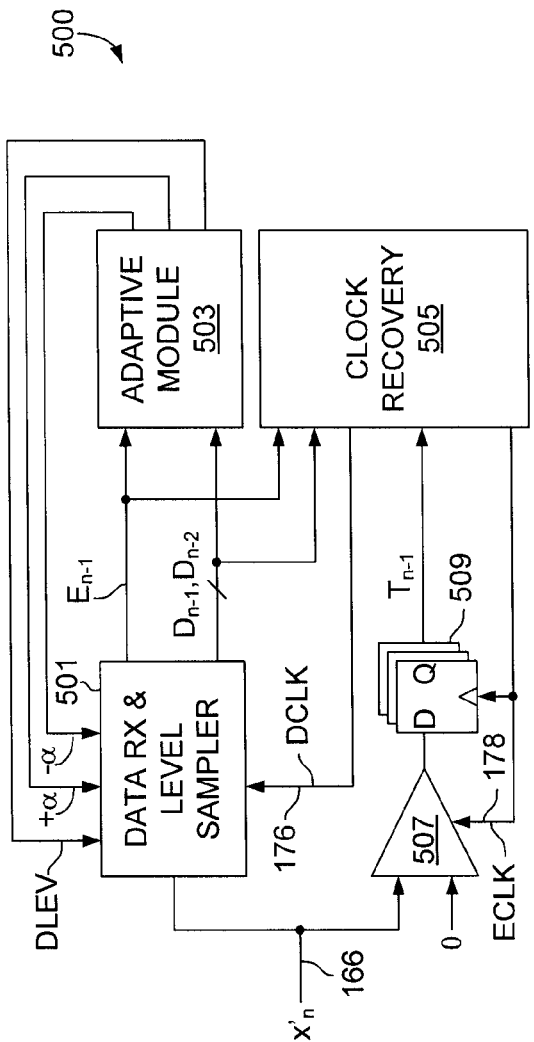
FIG. 20 illustrates a number of possible data signal transitions when the incoming data signal has the bimodal distribution shown in FIG. 11.

FIG. 20 illustrates a number of data-state transitions that may occur when the incoming data signal has the bimodal distribution shown in FIG. 11. That is, if the incoming data signal has one of the four bimodal signal levels corresponding to the partial response states 11, 10, 01, 00, then the signal may transition from either the 11 or 10 level to the 01 level (i.e., D[n−1:n−2]=11 or 10 and D[n:n−1]=01), and the signal may transition from either the 00 or 01 level to the 10 level. Note that signal transitions from the 10 level to the 11 level (illustrated by dashed line 523) and from the 01 level to the 00 level (illustrated by dashed line 524) are also possible.

Considering the transitions 10-to-01 and 01-to-10 (i.e., waveforms 526 and 527), it can be seen that each of these transitions crosses the zero threshold at a time, T1, midway between the centers of the data eyes 520 and 522. That is, if the edge clock signal 178 is phase aligned to the transitions in the incoming data signal, the 10-to-01 and 01-to-10 data-state transitions cross the zero threshold coincidentally (i.e., in phase alignment) with the edge clock transition. Accordingly, the 10-to-01 and 01-to-10 transitions may be compared with the zero threshold level (designated '0' in FIG. 20) to generate transition samples for adjusting the phase of the edge clock signal 178. Note that, because the signal swings in the transitions 11-to-01 and 00-to-10 are not symmetric with respect to the zero threshold level, the 11-to-01 and 00-to-10 transitions do not cross the zero threshold level at the same time as the 10-to-01 and 01-to-10 transitions, but rather cross the zero threshold level at some time later (indicated by circle 525). Consequently, use of the 11-to-01 and 00-to-10 transitions to determine zero-crossing times (i.e., times at which the zero threshold level is crossed) may introduce phase error and/or bi-modal jitter in the recovered edge and data clock signals 178 and 176. Accordingly, in one embodiment of the invention, transitions in the incoming data signal are selected according to their zero-crossing characteristics, with the selected transitions being used to adjust the phase of the edge and data clock signals 178 and 176.

Figure 21:
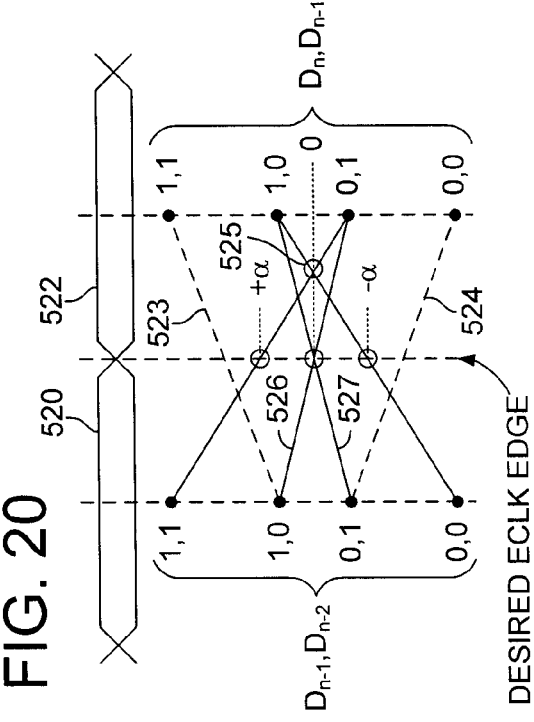
FIG. 21 illustrates partial-response waveforms that yield sloped data-level crossings at data sampling times.

FIG. 21 illustrates another source of clock recovery information that may be used within the clock recovery circuit 505 of FIG. 19. As shown, the bi-modal distribution of FIG. 11 includes selected waveforms that exhibit a monotonically increasing or decreasing slope at selected data sampling times. More specifically, a transition from a logic '1' state at time $D_{n-3}$, to a logic 0 state at time $D_{n-2}$, followed by a repetition of the logic '0' state at time $D_{n-1}$ yields one of the two input signal waveforms 532, 533, depending on whether the sample at time Dn−4 was a logic '1' or logic '0'. As shown at 534, waveforms 532, 533 each exhibit a decreasing slope at the $D_{n-2}$ sampling time as they cross the −1+α data level. Similarly, as shown at 537, waveforms 535 and 536 (which correspond to 0→1→1 data-state transitions) each exhibit an increasing slope at the $D_{n-2}$ sampling time as they cross the 1−α data level. Accordingly, error samples obtained by comparing the input signal with data-level thresholds 1−α and −1+α at time $D_{n-2}$ may be used to determine whether the data clock signal (i.e., the clock signal that triggered error sample generation) occurred early or late relative to the data-level crossing, and therefore to adjust the phase of the data clock signal. In one embodiment, such data-level crossing information is used to fine-tune the phase of the data clock signal, establishing a data sampling point that is offset from the phase alignment that otherwise would result if the clock is recovered using only data-state transition information. In another embodiment, the data-level crossing information alone may be used to adjust the phase of the data clock signal. In such an embodiment, the edge clock signal need not be generated at all so that circuitry for generating and latency-aligning edge samples (e.g., elements 507 and 509 of FIG. 19) and for detecting and acting on data-state transitions may be omitted.

Figure 22:
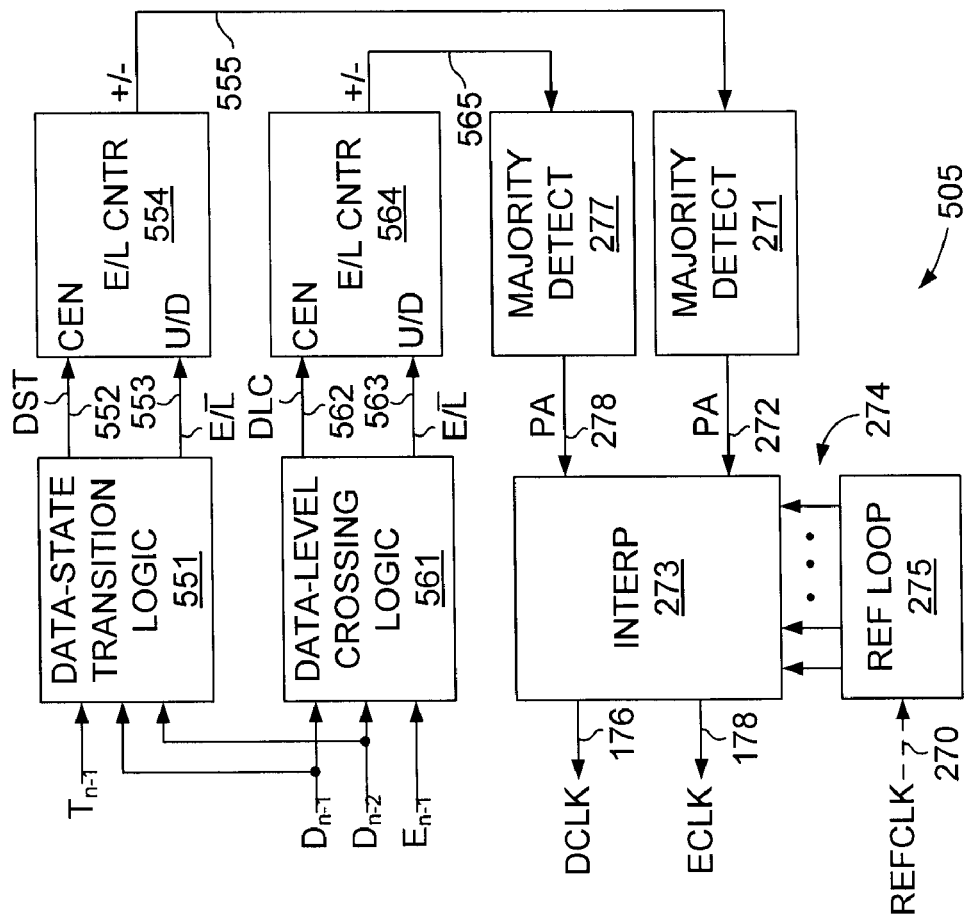
FIG. 22 illustrates an embodiment of a clock recovery circuit that adjusts the phase of edge clock signal and sampling clock signal based on selected transitions and data-level crossings detected in the incoming data signal.

FIG. 22 illustrates an embodiment of the clock recovery circuit 505 of FIG. 19. The clock recovery circuit 505 includes data-state transition logic 551, data-level crossing logic 561, early/late counters 554 and 564, majority detectors 271 and 277, interpolator 273 and reference loop 275. The data-state transition logic 551 asserts a data-state transition signal 552 (DST) upon detecting a sequence of data samples, $D_{n-1}$, $D_{n-2}$, and $D_{n-3}$ that indicate a zero-crossing data-state transition (e.g., a 0→1→0 sequence or a 1→0→1 sequence as shown by waveforms 526 and 527 of FIG. 20), and asserts an early/late signal 553 according to the direction of the incoming signal transition and the state of the corresponding transition sample, $T_{n-1}$ (e.g., a logic high early/late signal to indicate an early condition, and a logic low signal to indicate a late condition). The data-state transition signal 552 and early/late signal 553 are supplied to early/late counter 554 which operates in generally the same manner as the early/late counter 255 of FIG. 7 to count the individual early/late indications from the data-state transition logic and deliver a vote result 555 (e.g., an early/late count value or sign thereof) to the majority detector 271, the vote result indicating whether the majority of the early/late indications from the data-state transition logic 551 indicate an early or late edge clock transition.

Figure 23:
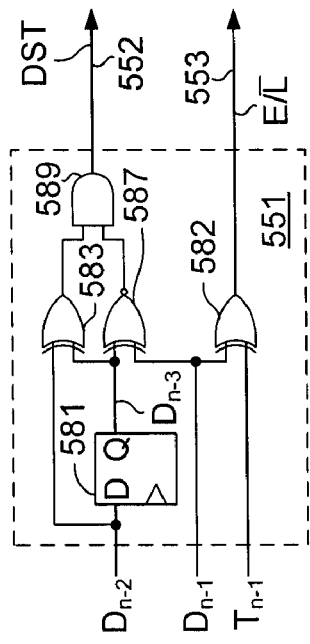
FIG. 23 illustrates an embodiment of the data-state transition logic included within the clock recovery circuit of FIG. 22.

FIG. 23 illustrates an embodiment of the data-state transition logic 551 included in the clock recovery circuit 505 of FIG. 22. The data-state transition logic includes a storage element 581 coupled to store data sample $D_{n-2}$ in response to transitions of the data clock signal 176, and which therefore outputs data sample $D_{n-3}$. Exclusive-OR gate 583, exclusive-NOR gate 587 and logic AND gate 589 are provided to raise the data-state transition signal 552 upon detecting that zero-crossing data-state transitions 010 or 101 have been received (i.e., $D_{n-1}$32 $D_{n-3}$ and $D_{n-3} \neq D_{n-2}$). If a zero-crossing data-state transition is detected, then the state of data sample $D_{n-1}$ indicates whether a low-to-high or a high-to-low transition occurred and therefore is used to select either transition sample $T_{n-1}$ or the complement of transition sample $T_{n-1}$ to be output as the early/late signal 553. That is, if a high-to-low transition occurred, then a logic 1 transition sample indicates an early transition of the edge clock signal (and a logic 0 transition sample indicates a late edge clock transition) and, by virtue of the logic low value of Dn−1, is passed to the output of the exclusive-OR gate 582 as the early/late signal 553. If a low-to-high transition occurred, then the logical sense of the transition sample is inverted (i.e., a logic '0' transition sample indicates an early edge clock transition and a logic '1' transition sample indicates a late edge clock transition) and the exclusive-OR gate 582 responds to the logic '1' state of Dn−1 to complement the transition sample, thereby yielding the same logic-level to early/late indication as in the high-to-low transition (i.e., '1': early; '0': late). The early/late signal 553 may have a complement significance in alternative embodiments (i.e., '0': early; '1': late).

Returning to FIG. 22, the data-level crossing logic 561 asserts a data-level crossing signal 562 (DLC) upon detecting a sequence of data samples, $D_{n-1}$, $D_{n-2}$, and $D_{n-3}$ that indicate a monotonically sloped crossing of a data-level threshold. In the particular embodiment of FIG. 22, the error sample, $E_{n-1}$, indicates whether the incoming signal is greater or less than data-level threshold, 1−α, so that the data-level crossing signal 562 is asserted when D[n−1:n−3]=110, which corresponds to the waveforms 533 and 534 of FIG. 21 (i.e., in partial-response notation, a 0X→10→11 transition). In an embodiment in which an error sample is also (or alternatively) generated based on a comparison of the input signal with data-level threshold −1+α, the data-level crossing signal may additionally (or alternatively) be asserted when D[n−1: n−3]=001, a sample pattern that corresponds to waveforms 535 and 536 of FIG. 26 (i.e., a 1X→01→00 transition). The error sample En−1 indicates whether the corresponding data clock transition occurred before or after the data-level crossing and therefore is used to generate the early/late signal 563. The data-level crossing signal 562 and corresponding early/late signal 563 are supplied to early/late counter 564 which operates in generally the same manner as the early/late counter 265 of FIG. 7 to count the individual early/late indications from the data-level crossing logic 561 and deliver a vote result 565 (e.g., an early/late count value or sign thereof) to the majority detector 277, the vote result indicating whether the majority of the early/late indications from the data-level crossing logic 561 indicate an early or late edge clock transition.

Figure 24:
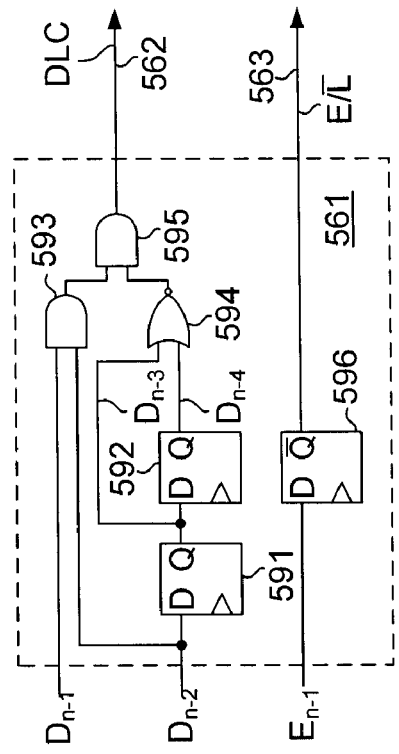
FIG. 24 illustrates an embodiment of the data-level crossing logic included within the clock recovery circuit of FIG. 22.

In one embodiment, illustrated in FIG. 24, the data-level crossing logic 561 detects the data sample pattern 00→10→11, which corresponds to the data-level crossing waveform 532 of FIG. 21. More specifically, AND gate 593 goes high when Dn−1 and Dn−2 are both high, and NOR gate 594 goes high when Dn−3 and Dn−4 (generated by storage elements 591 and 592, respectively) are both low. Logic AND gate 595 raises the data-level crossing signal 562 when the outputs of AND gate 593 and NOR gate 594 are both high to indicate that desired the data-level crossing has been detected. Storage element 596 is provided to align the latency of the early/late signal and the data-level crossing signal 562 as the desired error sample occurs at the $D_{n-2}$ sampling time (e.g., as shown at 534 in FIG. 21). Also, because the data-level crossing that occurs in waveform 532 of FIG. 21 is a rising-slope crossing, a logic '0' error sample indicates an early data clock transition and a logic '1' error sample indicates a late data clock transition. Thus, to generate an active-high early signal and active-low late signal, the complement output of the storage element 596 is used to drive the early/late signal 563.

In an alternative embodiment, the data-level crossing logic 561 of FIG. 24 may be modified to detect both rising edge waveforms 32 and 533 of FIG. 21, for example, by omitting storage element 592 and replacing NOR gate 594 with an inverter. Also, as discussed above, if error samples are generated based on comparison of the input signal with the −1+α data-level threshold, the data-level crossing logic 561 may include additional (or alternative) circuitry to detect the data patterns that correspond to waveforms 535 and 536 of FIG. 21 and to generate corresponding early/late signals.

Returning to FIG. 22, the majority detectors 271 and 277, interpolator 273 and reference loop 275 operate generally as described in reference to FIG. 7 to generate the data clock signal 176 and edge clock signal 178. As described above, the update signals generated by majority detectors 271 and 277 need not be updated at the same rate or at the same time. Also, the data-state transition logic 551, early/late counter and majority logic 271 may be omitted altogether in an alternative embodiment, and the timing information generated by the data-level crossing logic alone used to update the phase of the data clock signal. The edge clock signal need not be generated in such an embodiment, and edge sampling circuitry may be omitted from the partial response receive circuit.

Dual Mode Receiver

Figure 25:
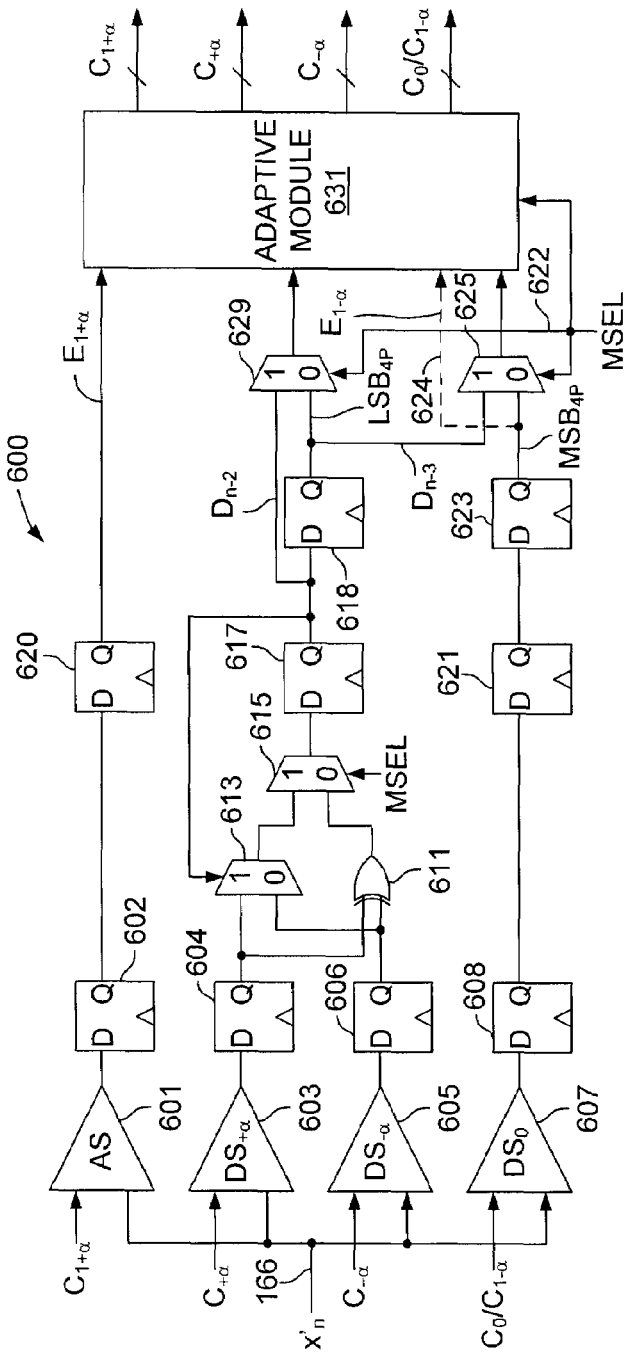
FIG. 25 illustrates an embodiment of a dual mode receiver that may be operated in either a multi-level signaling mode or a partial response mode.

FIG. 25 illustrates an embodiment of a dual mode receiver 600 that may be operated in either a multi-level signaling mode or a partial response mode. When a mode select signal 622 (MSEL) is in a first state (e.g., a logic low state), a two-bit per symbol, multi-level signaling mode is selected. In one embodiment, illustrated in FIG. 26, the signal level of each incoming symbol falls into one of four voltage ranges distinguished by three threshold levels. The four voltage ranges are designated 10, 11, 01 and 00 in FIG. 26 according to the pair of data bits represented at each level. Because each symbol constitutes a pulse having one of four possible amplitudes, the incoming multi-level signal is referred to herein as a 4-PAM (Pulse Amplitude Modulation) signal. Although multi-PAM is described herein primarily in terms of 4-PAM, the embodiments described may readily be adapted for use at different PAM levels (e.g., 8-PAM, 10-PAM, etc.) in alternative embodiments.

Figure 26:
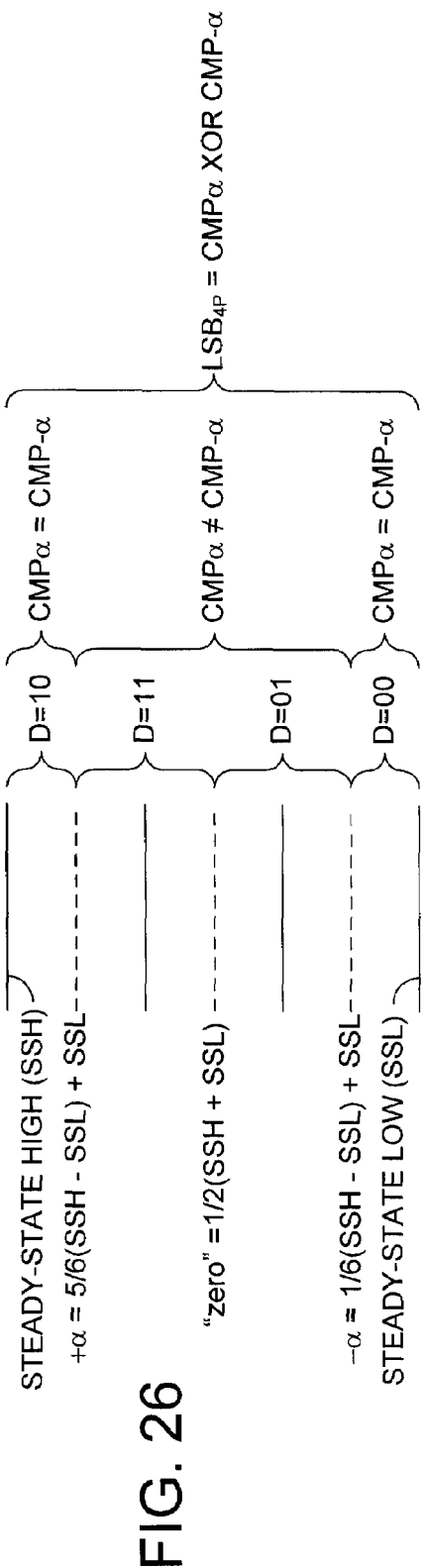
FIG. 26 illustrates an exemplary multi-level signaling protocol that may be used within dual mode receiver of FIG. 25.

In the multi-level signaling mode, sampling circuit 607 compares an incoming signal 166 ($x'_n$) with a mid-level threshold (referred to herein as the zero threshold) to determine the state of the most significant bit (MSB) of the symbol. In the embodiment of FIGS. 25 and 26, the MSB is resolved to be a '1' if the signal level exceeds the zero threshold, and a '0' if the signal level does not exceed the zero threshold. Sampling circuits 603 and 605 compare the incoming signal with threshold levels +α and −α, respectively. For example, in a 4-PAM signal mode, the +α threshold level is set to the steady-state low level plus ⅚ of the difference between the steady-state high and low levels, and the −α threshold is set to the steady-state low level plus ⅙ of the difference between the steady-state high and low levels. Referring to FIG. 26, if the incoming signal level exceeds the +α threshold level, both sampling circuits 603 and 605 generate a logic high sample value, and if the signal level is below the −α threshold level, both sampling circuits 603 and 605 generate a logic low sample value. By contrast, if the incoming signal level is between the +α and −α threshold levels, the sampling circuits 603 and 605 generate outputs having different states. Thus, by assigning the least significant bit (LSB) of the incoming symbol to be a logic '0' in the case of a signal level above the +α threshold level or below the −α threshold level, and a logic '1' in the case of a signal level between the +α and −α thresholds, the LSB may be generated by exclusive-ORing the sample values generated by the sampling circuits 603 and 605. Accordingly, exclusive-OR gate 611 is coupled to receive the sample values generated by the sampling circuits 603 and 605 (i.e., after the sample values are buffered in storage circuits 604 and 606), and outputs the LSB to a first port of select circuit 615. When the mode select signal 622 selects the 4-PAM mode of the dual-mode receiver, the LSB is selected to be passed to next stage storage circuits 617 and 618, and ultimately is selected by select circuit 629 to be provided to the adaptive module 631. Thus, in 4-PAM mode, the adaptive module 631 receives an LSB and MSB data samples (the MSB bit being stored in succession in storage circuits 608, 621 and 623 for latency alignment with the LSB) for each set of sample values generated by the sampling circuits 603, 605, and 607.

The threshold levels and data signal levels described in reference to FIG. 26 may be used in both differential and single-ended signaling systems. In the case of single-ended signaling systems, the voltage levels of the thresholds and data signals are expressed as an offset from a common, substantially fixed reference voltage, such as a ground reference. In differential signaling systems, the data signals and thresholds are each represented by differential signal pair, with the voltage level of the data signal or threshold being the voltage difference between the two differential signals (e.g., subtracting the voltage level of one signal from the other).

Still referring to the 4-PAM mode of the dual mode receiver 600, the sampling circuit 601 generates an error sample, $E_{1+\alpha}$, that is buffered within storage circuits 602 and 620, then provided to the adaptive module 631. In one embodiment, the adaptive module 631 generates the 4-PAM mode threshold level control values $C_0$, $C_{+\alpha}$ and $C_{-\alpha}$ (i.e., the control values supplied to sampling circuits 607, 603, 605, respectively) by determining the signal level at MSB:LSB=10, and then the signal level at MSB:LSB=00. For example, the $C_{+\alpha}$ value is offset from the 00 signal level by five-sixths (⅚) of the difference between the 10 and 00 signal levels, $C_0$ is set to the midpoint between the 10 and 00 signal levels, and $C_{-\alpha}$ is offset from the 00 signal level by one-sixth (⅙) of the difference between the 10 and 00 signal levels. As with the adaptive module described in reference to FIG. 15, the error sample generated by the sampling circuit 601 may be filtered within the adaptive module 631 to obtain the steady state 11 signal level and the steady state 00 signal level. In an alternative embodiment, the adaptive module 631 may generate the $+\alpha$ threshold by multiplying the $C_{1+\alpha}$ control value (i.e., the control value that corresponds to the 10 signal level) by $\frac{2}{3}$, as the $+\alpha$ threshold is $\frac{2}{3}$ of the difference between the 10 signal level and the zero signal level (i.e., $\frac{1}{2}$ (SSH+SSL). The $-\alpha$ threshold by be generated by complementing the $C_{1+\alpha}$ control value. In another alternative embodiment, the sampling circuit 601 may be used to generate the $C_{1-\alpha}$ control value, then doubling $C_{1-\alpha}$ to obtain $-\alpha$ (i.e., as $C_{1-\alpha}$ corresponds to a threshold that is $\frac{1}{3}$ the difference between the zero level and the '10' signal level, and $+\alpha$ is $\frac{2}{3}$ the difference between the zero level and '10' signal level). More generally, any signal level or combination of signal levels may be determined and used to generate $\pm/-\alpha$ thresholds.

Still referring to FIG. 25, when the mode select signal 622 is high, the dual mode receiver 600 is switched to the partial response mode. In the partial response mode, the sampling circuits 603 and 605 are used to compare the incoming data signal against the partial response threshold levels $+\alpha$ and $-\alpha$, respectively. The samples values generated by the sampling circuits 603 and 605 are buffered in storage circuits 604 and 606, respectively, then provided to select circuit 613 which selects one of the samples according to the state of the previously received sample. That is, one of the $D_{n-1}$ samples stored in storage circuits 604 and 606 is selected to be stored in storage circuit 617 according to the $D_{n-2}$ sample previously stored in the storage circuit 617. The $D_{n-2}$ sample is stored in the storage circuit 618 to generate the $D_{n-3}$ sample value. During a given symbol time, both the $D_{n-2}$ and $D_{n-3}$ samples are provided to the adaptive module 631 via select circuits 629 and 625, respectively. Thus, in 4-PAM mode, the adaptive module 631 receives the MLSB:LSB pair for each incoming 4-PAM symbol, and in partial response mode, the adaptive module 631 receives the D[n−2:n−3] sample values that represent one of the four states of the bimodal signal illustrated in FIG. 4.

Still referring to FIG. 25, in partial response mode, the sampling circuit 601 and adaptive module 631 operate to generate the $+\alpha$ and $-\alpha$ levels in the manner described in reference to FIGS. 17 and 18. Alternatively, because the MSB sampling circuit 607 is not otherwise used in the partial response mode, the sampling circuit 607 may be used as an adaptive sampling circuit to determine the level of the $1-\alpha$ partial response state, thereby enabling both the $1+\alpha$ and $1-\alpha$ signal levels to be determined simultaneously. The $\pm\alpha$ levels may then be generated based on the $1+\alpha$ and the $1-\alpha$ signal levels (i.e., $C_\alpha = ((C_{1+\alpha})-(C_{1-\alpha}))/2$, and $C_{-\alpha}=/C\alpha$). In another alternative embodiment, the MSB sampling circuit 607 may be used to determine the $-1\alpha$ signal level, thereby enabling $\pm\alpha$ to be determined by averaging the $1+\alpha$ and $-1+\alpha$ signal levels. The error signal generated by the MSB sampling circuit, $E_{10}$ (or $E_{01}$) is illustrated by dashed line 624 to indicate its optional nature.

Reflecting on the dual mode receiver 600 of FIG. 25, it can be seen that much of the circuitry provided for 4-PAM operation (e.g., the four sampling circuits (601, 603, 605 and 607), storage circuits (602, 604, 606, 608, 617, 620, 621, 618 and 623) and adaptive module 631) is re-used in the 2-PAM partial response mode, thereby providing partial response operation with relatively little additional hardware overhead. The mode select signal 622 may be provided from an external source or from a configuration control circuit within the integrated device that includes the dual mode receiver 600. In one embodiment the configuration control circuit is a configuration register that may be programmed by one or more other integrated circuits within a system (e.g., a host processor or similar control device) to establish the mode of the dual mode receiver 600. The configuration control circuit may also be a non-volatile control circuit such as a non-volatile memory, fusible circuit or similar circuit that may be programmed with a mode select value. In yet other embodiments, the configuration control circuit may dynamically change the state of the mode select signal in response to detecting selected system conditions (e.g., detection of threshold error rate when in one operating mode or the other).

Clock Recovery in a Dual Mode Receiver

Figure 27:
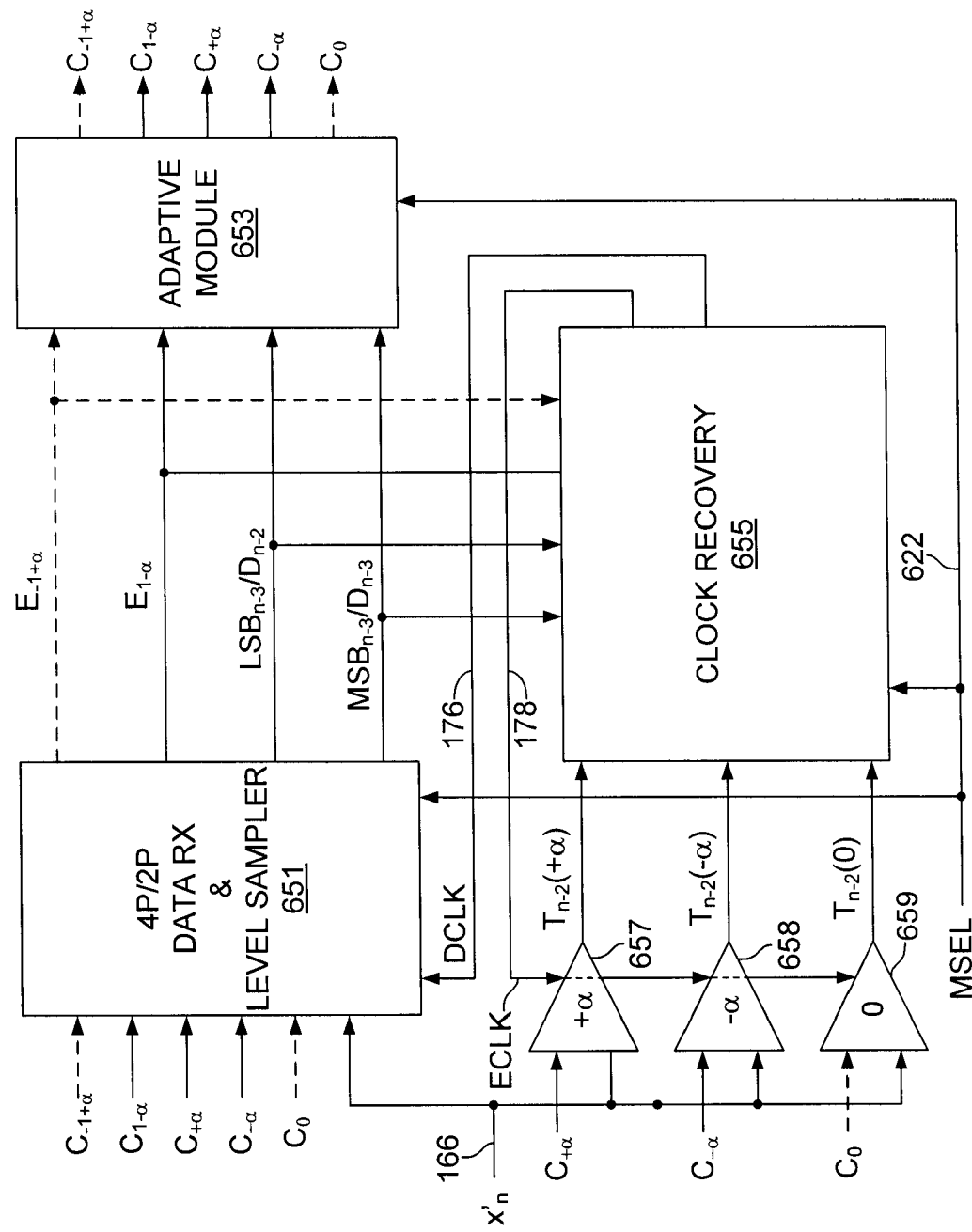
FIG. 27 illustrates an embodiment of a dual-mode receiver with clock recovery circuitry.

FIG. 27 illustrates an embodiment of a dual-mode, partial response/multi-level receiver 650 that recovers data and clock from an incoming signal 166. The dual mode receiver 650 includes a dual-mode data receive/level sampling circuit 651, adaptive module 653, edge sampling circuits 657, 658, 659, and clock recovery circuit 655. The dual-mode data receive/level sampling circuit 651 and the adaptive module 653 operate similarly to the dual-mode partial response receiver of FIG. 25. That is, when mode select signal 622 selects a 4-PAM mode of operation, the data receive/level sampling circuit 651 samples incoming 4-PAM signals to generate an MSB and LSB per captured sample, and generates one or more error samples (e.g., a pair of error samples, $E_{1-\alpha}$ and $E_{-1+\alpha}$ in this example) that enable the adaptive module 653 to generate the threshold control values $C_{1-\alpha}$, $C_{-1+\alpha}$, $C_{+\alpha}$ and $C_{-\alpha}$ supplied to the data receive/level sampling circuit 651 (e.g., $C_{+\alpha}=2C_{1-\alpha}$, and $C_{-\alpha}=2C_{-1+\alpha}$). When the mode select signal 622 selects a 2-PAM mode of operation, the data receive/level sampling circuit 651 generates data samples $D_{n-2}$ and $D_{n-3}$ by selecting between outputs of partial-response sampling circuits (i.e., constituent sampling circuits of data receive/level sampling circuit 651 that receive the $\pm\alpha$ threshold levels) based on a prior-received data sample, and supplies the $D_{n-2}$ and $D_{n-3}$ data samples to the adaptive module. The adaptive module 653 then adjusts the control values $C_{1-\alpha}$, $C_{-1+\alpha}$, $C_{+\alpha}$, and $C_{-\alpha}$ (i.e., whichever control value corresponds to the level of data values $D_{n-2}$, $D_{n-3}$) up or down according to the error sample for that data level. The adaptive module 653 may also generate a control value, $C_0$, that corresponds to the zero threshold, for example to cancel a DC offset in the zero-threshold sampling circuit.

The edge sampling circuits 657, 658 and 659 capture transition samples $T_{n-2}(+\alpha)$, $T_{n-2}(-\alpha)$ and $T_{n-2}(0)$, respectively, of the incoming data signal in response to transitions of an edge clock signal 178 (ECLK), and provide the transition samples to the clock recovery circuit 655. The 4-PAM/partial response data samples ($MLB_{n-3}$:$LSB_{n-3}$ or D[n−2:n−3]) and error samples ($E_{1-\alpha}$, $E_{-1+\alpha}$) captured by the data receive/level sampling circuit 651 are also provided to the clock recovery circuit 655. The clock recovery circuit 655 selectively adjusts the phases of the edge clock signal 178 and data clock signal 176 based on the transition samples, data samples and error samples.

Figure 28:
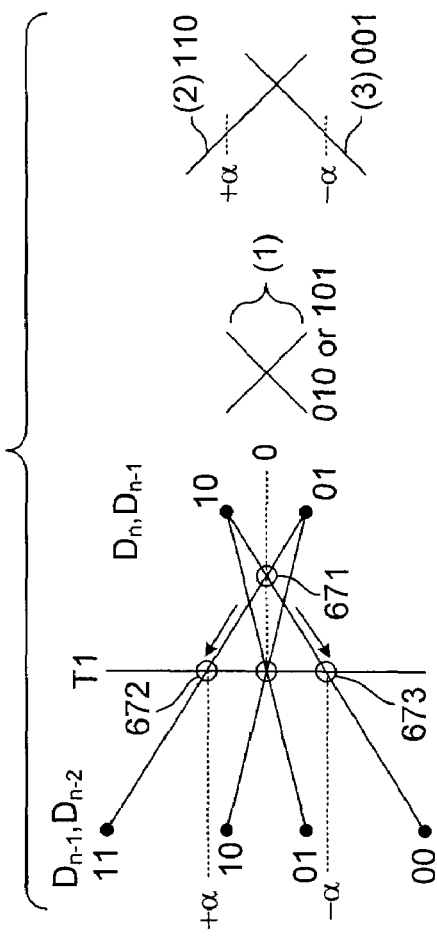
FIG. 28 illustrates signal transitions between successive 4-PAM (Pulse Amplitude Modulation) symbols that may be used for clock recovery when the dual mode receiver of FIG. 27 is operated in a multi-level signaling mode.

FIG. 28 illustrates the possible signal transitions between successive 4-PAM symbols. As shown, from each of four possible signal levels, the incoming data signal may transition to any of three other signal levels. For example, a signal level above $+\alpha$ (corresponding to data state 10) may transition to a signal level between $+\alpha$ and 0 (data state 11); a signal level between 0 and $-\alpha$ (data state 01); and a signal level below $-\alpha$ (data state 00). Examining the different possible transitions, it can be seen that any transitions that cross all three threshold levels will cross the zero threshold level at the timing center, T1, between the desired data sampling instants. Similarly, transitions that cross a single threshold level will cross either the zero threshold level, the +α threshold level or the −α threshold level at T1. By contrast, any transitions that cross two threshold levels, but not three, do not cross the zero, +α or −α threshold levels at T1. Enumerating the different transitions that cross the zero, +α and −α threshold levels at T1 as transition types (1), (2) and (3), respectively, it can be seen that type (1) transitions are those in which the LSB remains unchanged at either '1' or '0', while the MSB changes state (i.e., (MSB$_n$ xor MSB$_{n-1}$) & (LSB$_n$ xnor LSB$_{n-1}$)); type (2) transitions are those in which the MSB remains high while the LSB changes state (i.e., MSB$_n$ & MSB$_{n-1}$ & (LSB$_n$ xor LSB$_{n-1}$)); and type (3) transitions are those in which the MSB remains low, while the LSB changes state (i.e., /MSB$_n$ & /MSB$_{n-1}$ & (LSB$_n$ xor LSB$_{n-1}$)). Thus, in one embodiment, when the mode select signal 622 selects a 4-PAM mode of operation within the dual mode receiver 650 of FIG. 27, the clock recovery circuit 655 adjusts the phase of the edge clock signal and data clock signal in response to the data samples generated by the data receive/level sampling circuit 651 and the transition samples generated by edge sampling circuits 657, 658, 659 in accordance with the following table:

TABLE 1

| D$_{n-1}$(4P) | D$_n$(4P) | Center Time Crossing At: | T$_n$ (+α) | T$_n$(−α) | T$_n$(0) | Early/Late Count Adj. |
|---|---|---|---|---|---|---|
| 00 | 01 | −α | X | 0/1* | X | +1/−1 |
| 00 | 11 | — | X | X | X | — |
| 00 | 10 | 0 | X | X | 0/1 | +1/−1 |
| 01 | 00 | −α | X | 0/1 | X | −1/+1 |
| 01 | 11 | 0 | X | X | 0/1 | +1/−1 |
| 01 | 10 | — | X | X | X | — |
| 11 | 00 | — | X | X | X | — |
| 11 | 01 | 0 | X | X | 0/1 | −1/+1 |
| 11 | 10 | +α | 0/1 | X | X | +1/−1 |
| 10 | 00 | 0 | X | X | 0/1 | −1/+1 |
| 10 | 01 | — | X | X | X | — |
| 10 | 11 | +α | 0/1 | X | X | −1/+1 |

(*'0/1' means '0' or '1' and corresponds to the +1 or −1 adjustment to the early/late count)

Figure 29:
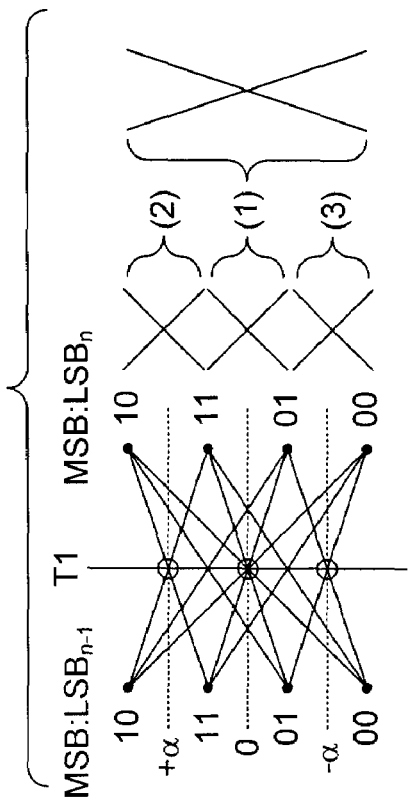
FIG. 29 illustrates data signal transitions that may be used for clock recovery when the dual mode receiver of FIG. 27 is operated in a partial response mode.

Still referring to FIG. 27, when the dual mode receiver 650 is operated in the partial response mode, the data-state transitions of interest are as shown in FIG. 29. That is, a partial-response state transition from 10 to 01 or 10 to 01 crosses the zero threshold level at the desired edge clock transition time, T1; a state transition from 11 to 01 crosses the +α threshold level at T1; and a state transition from 00 to 10 crosses the −α threshold level at T1. Enumerating the partial response mode data-state transitions that cross the zero, +α and −α threshold levels at T1 as transition types (1), (2) and (3), respectively, it can be seen that type (1) data-state transitions are those in which the current data sample, D$_n$, does not match the immediately preceding data sample, D$_{n-1}$, which, in turn, does not match the twice-removed data sample, D$_{n-2}$ (i.e., (D$_n$ xor D$_{n-1}$) & (D$_{n-1}$ xor D$_{n-2}$)); type (2) transitions are those in which the current data sample, D$_n$, is low, and the two immediately preceding data samples, D$_{n-1}$ and D$_{n-2}$, are high (i.e., / D$_n$ & D$_{n-1}$ & D$_{n-2}$); and type three (3) transitions are those in which the current data sample, D$_n$, is high, and the two immediately preceding data samples, D$_{n-1}$ and D$_{n-2}$, are low (i.e., D$_n$ & /D$_{n-1}$ & /D$_{n-2}$). Thus, in one embodiment, when the mode select signal 622 selects a partial response mode of operation within the dual mode receiver 650, the clock recovery circuit 655 adjusts the phase of the edge clock and data clock signals 178, 176 in response to the data and transition samples generated by data receive/level sampling circuit 651 and edge sampling circuits 657, 658, 659 in accordance with the following table:

TABLE 2

| D[n − 1:n − 2] | D[n:n − 1] | Center Time Crossing At: | T$_n$(+α) | T$_n$(−α) | T$_n$(0) | Early/Late Count Adj. |
|---|---|---|---|---|---|---|
| 00 | 10 | −α | X | 0/1 | X | +1/−1 |
| 01 | 00 | — | X | X | X | — |
| 01 | 10 | 0 | X | X | 0/1 | +1/−1 |
| 10 | 01 | 0 | X | X | 0/1 | −1/+1 |
| 10 | 11 | — | X | X | X | — |
| 11 | 01 | +α | 0/1 | X | X | −1/+1 |

Still referring to FIG. 29, if the +α and −α threshold levels are initially set to zero as indicated by reference numeral 671, it can be seen that the edge clock alignment will initially converge to a point that is phase delayed relative to the desired edge sampling point, T1. As the levels of ±α progress toward their ultimate setpoints at 672 and 673, however, the edge clock phase alignment will converge to the desired sampling point, T1.

Figure 30:
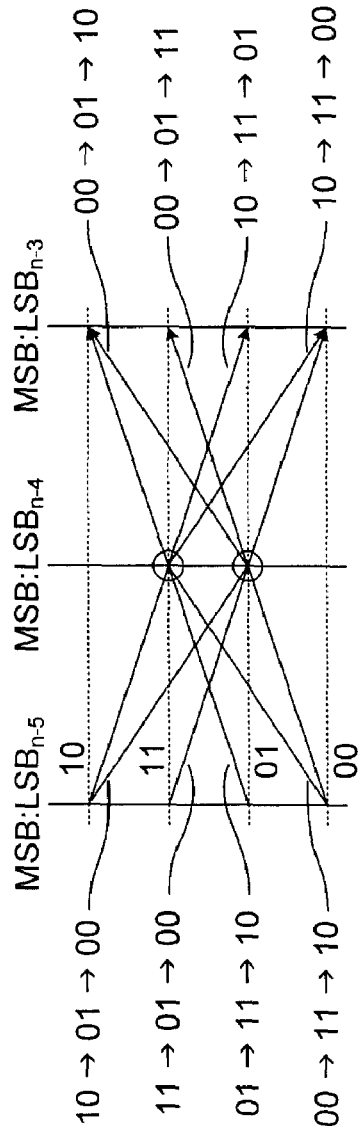
FIG. 30 illustrates 4-PAM signaling waveforms that yield sloped data-level crossings at data sampling times.

FIG. 30 illustrates another source of clock recovery information that may be used within the clock recovery circuit 655 of FIG. 27 when the dual mode receiver 650 is in 4-PAM mode. As shown, selected 4-PAM signaling patterns yield monotonically increasing or decreasing slope at selected data sampling times. More specifically, a transition from a '10' data state at data sampling time n−5 to data state '01 at data sampling time n−4 to data state '00' at data sampling time n−3 produces a negative-slope crossing of the '01' data level (i.e., the −1+α data level) at sampling time n−4. Thus, the error sample E$_{-1+α}$ captured at data sampling time n−4 may be used to determine whether the data clock signal (i.e., the clock signal that triggered error sample generation) occurred early or late relative to the data-level crossing, and therefore to adjust the phase of the data clock signal. The following table illustrates 4-PAM data patterns that indicate monotonically sloped crossings of the −1+α and 1−α data levels, and the data clock phase adjustments indicated by the corresponding E$_{-1'α}$ and E$_{1-α}$ error samples:

TABLE 3

| MSB:LSB (n − 5) | MSB:LSB (n − 4) | MSB:LSB (n − 3) | Data level crossed at data sampling time n − 4: | E$_{1-α}$ | E$_{-1+α}$ | Early/Late Count Adj. |
|---|---|---|---|---|---|---|
| 10 | 11 | 01 | 1 − α | 0/1 | X | −1/+1 |
| 10 | 11 | 00 | 1 − α | 0/1 | X | −1/+1 |
| 11 | 01 | 00 | −1 + α | X | 0/1 | −1/+1 |

TABLE 3-continued

| MSB:LSB (n − 5) | MSB:LSB (n − 4) | MSB:LSB (n − 3) | Data level crossed at data sampling time n − 4: | $E_{1-\alpha}$ | $E_{-1+\alpha}$ | Early/Late Count Adj. |
|---|---|---|---|---|---|---|
| 10 | 01 | 00 | $-1 + \alpha$ | X | 0/1 | $-1/+1$ |
| 00 | 11 | 10 | $1 - \alpha$ | 0/1 | X | $+1/-1$ |
| 01 | 11 | 10 | $1 - \alpha$ | 0/1 | X | $+1/-1$ |
| 00 | 01 | 11 | $-1 + \alpha$ | X | 0/1 | $+1/-1$ |
| 00 | 01 | 10 | $-1 + \alpha$ | X | 0/1 | $+1/-1$ |

When the dual mode receiver of FIG. 27 is operated in partial-response mode, the data patterns described in reference to FIG. 21 may be detected by the clock recovery circuit 655 instead of the 4-PAM data patterns shown in table 3, and the $E_{-1+\alpha}$ and $E_{1-\alpha}$ error samples used as early/late indications to enable data level clock recovery.

Figure 31:
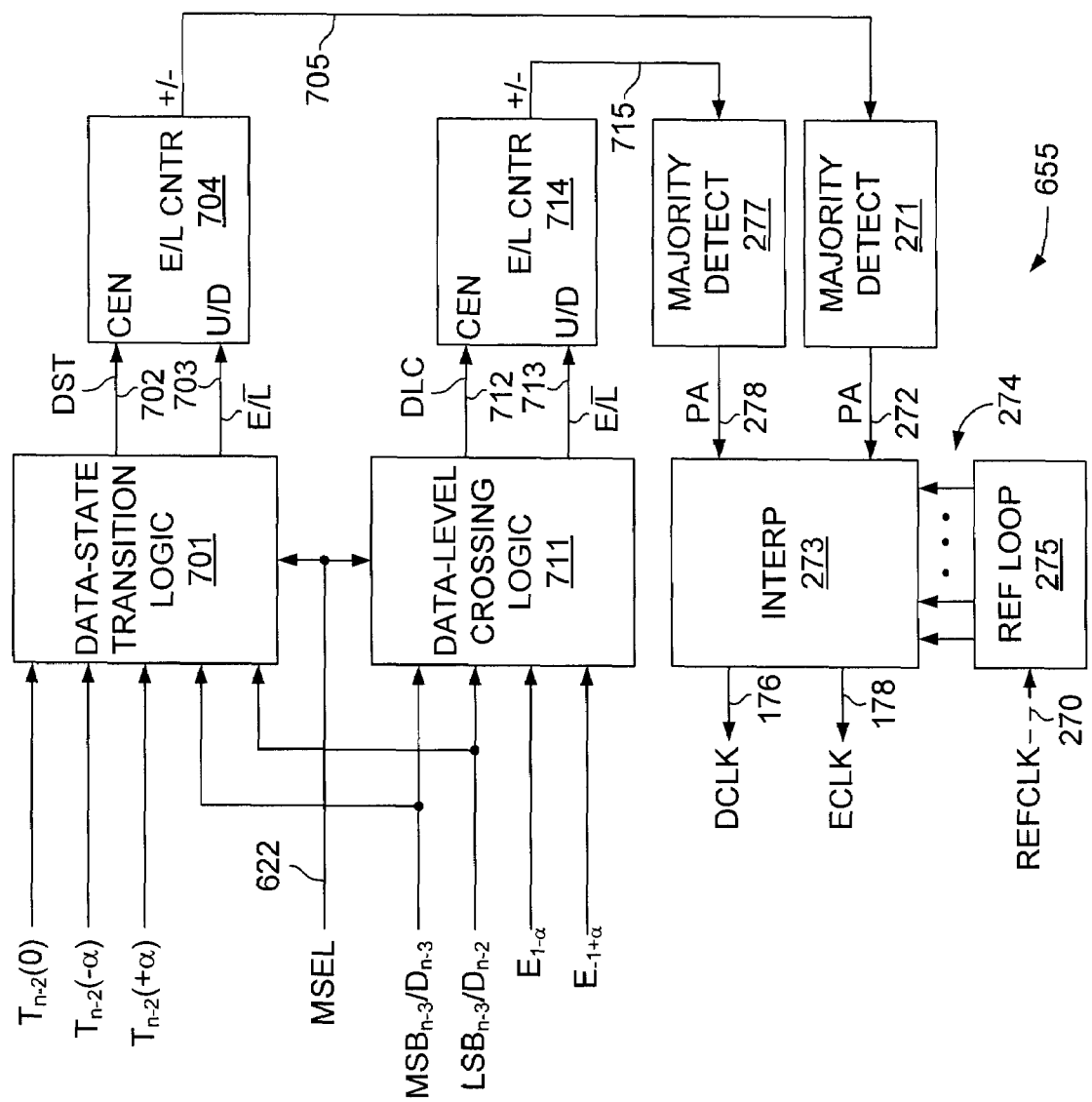
FIG. 31 illustrates an embodiment of the clock recovery circuit used within the dual mode receiver of FIG. 27.

FIG. 31 illustrates an embodiment of the clock recovery circuit 655 used within the dual mode receiver of FIG. 27. The clock recovery circuit 655 includes data-state transition logic 701, data-level crossing logic 711, early/late counters 704 and 714, majority detectors 271 and 277, interpolator 273 and reference loop 275. The mode select signal 622 is supplied to both the data-state transition logic 701 and the data-level crossing logic 711 to control the identification of data-state transitions and data level crossings that are used to recover timing information. Referring first to the data-state transition logic 701, when the mode select signal 622 selects a partial-response mode of operation, the data-state transition logic 701 asserts a data-state transition signal 702 (DST) upon detecting a sequence of data samples, $D_{n-2}$, $D_{n-3}$, and $D_{n-4}$ that indicate a zero-crossing data-state transition (i.e., the type (1) transition, 0→1→0 or 1→0→1, as shown in FIG. 20), and outputs an early/late signal 703 in either a high or low state according to the direction of the data-state transition and the corresponding transition sample, $T_{n-2}(0)$ as shown in Table 2 above. The data-state transition logic 701 may also assert the data-state transition signal 702 upon detecting a type (2) or type (3) data-state transition, and drive the early/late signal 703 high or low in accordance with the $T_{n-2}(+\alpha)$ or $T_{n-2}(+\alpha)$ transition samples, respectively, as shown in Table 2. The data-state transition signal 702 and early/late signal 703 are supplied to early/late counter 704 which operates in generally the same manner as the early/late counter 270 of FIG. 7 to count the individual early/late indications from the data-state transition logic 701 and deliver a vote result 705 (e.g., an early/late count value or sign thereof) to the majority detector 271, the vote result indicating whether the majority of the early/late indications from the data-state transition logic 701 indicate an early or late edge clock transition.

Figure 32:
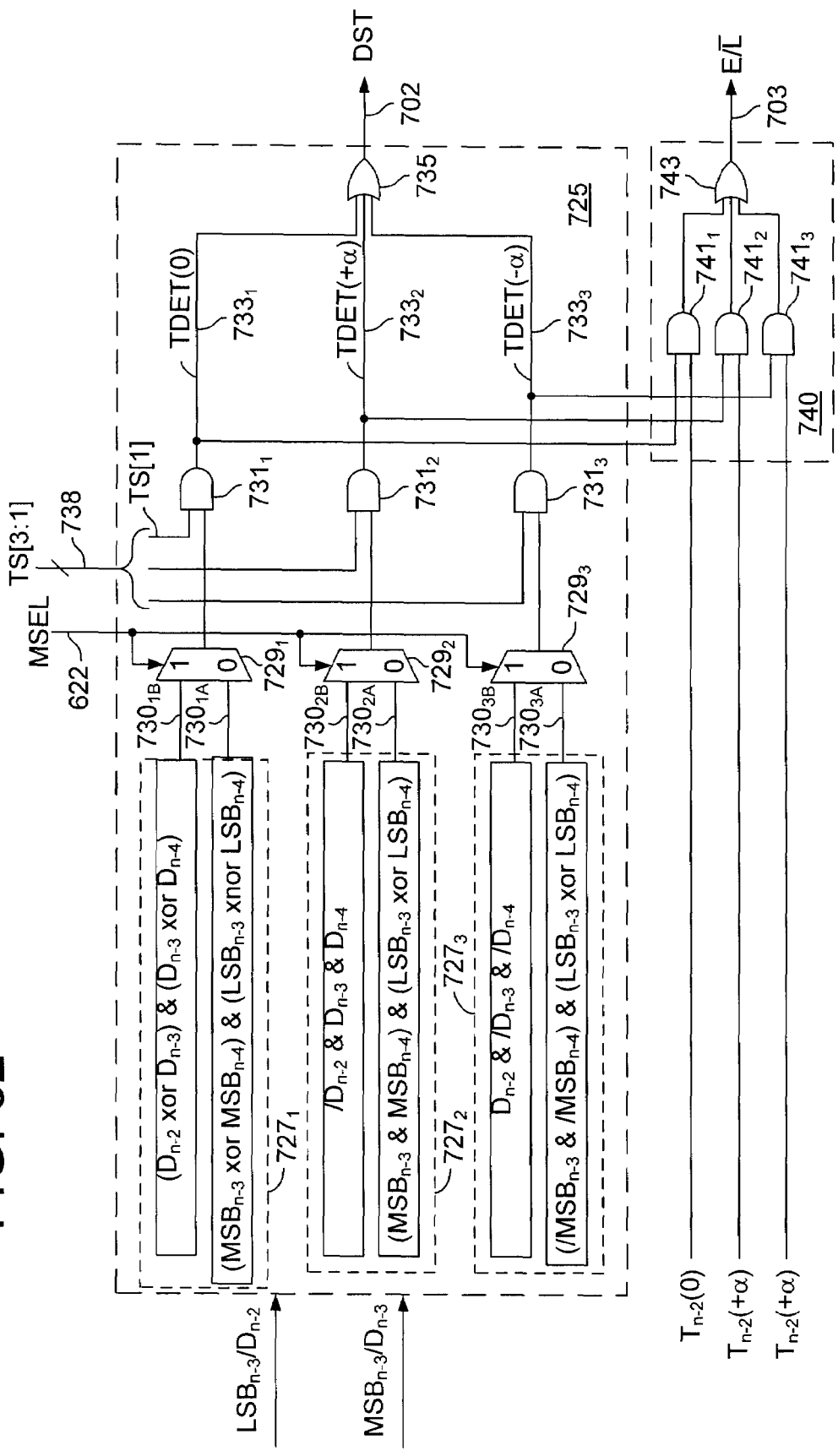
FIG. 32 illustrates an embodiment of the data-state transition logic used within the clock recovery circuit of FIG. 31.

FIG. 32 illustrates an embodiment of the data-state transition logic 701 of FIG. 31 that includes a transition detect circuit 725 and a transition select circuit 740. The transition detect circuit 725 receives the data sample pair generated by the data receive/level sampling circuit (i.e., element 651 of FIG. 27) and generates a data-state transition signal 702 (DST) in accordance with the states of successive data sample pairs, the mode select signal 622 (MSEL) and a transition select signal 738 (TS[3:1]). The transition detect circuit 725 additionally generates component data-state transition signals 733$_1$, 733$_2$ and 733$_3$ (i.e., TDET(0), TDET(+α) and TDET(-α), respectively) which are output to the transition select circuit 740. The transition select circuit 740 includes AND gates 741$_1$, 741$_2$, and 741$_3$ to gate the transition samples $T_n(0)$, $T_n(+\alpha)$ and $T_n(-\alpha)$ according to the state of the corresponding transition select signals 733$_1$–733$_3$. The outputs of the AND gates 741 are input to OR gate 743 to generate an early signal 703. The data-state transition signal 702 is itself generated by a logic OR combination of the component data-state transition signals 733 in OR gate 735. By this arrangement, if any of the component data-state transition signals 733 is asserted (e.g., to a logic high state), the data-state transition signal 702 is asserted, and the state of the corresponding transition sample $T_n$ is output as the early/late signal 703.

The transition detect circuit 725 includes a set of combinatorial logic circuits 727$_1$, 727$_2$ and 727$_3$ that generate type (1), type (2) and type (3) data-state transition signals 730 for both 4-PAM and partial response data states in accordance with the type (1), type (2) and type (3) transition types described in reference to FIGS. 28 and 29. In the embodiment of FIG. 32, combinatorial logic circuit 727$_1$ generates a 4-PAM type (1) data-state transition signal 730$_{1A}$ and a 2-PAM, partial response type (1) data-state transition signal 730$_{1B}$ as follows:

Signal 730$_{1A}$=(MSB$_{n-3}$ xor MSB$_{n-4}$)&(LSB$_{n-3}$ xnor LSB$_{n-4}$); and Signal 730$_{1B}$=(D$_{n-2}$ xor D$_{n-3}$)&(D$_{n-3}$ xor D$_{n-4}$).

Similarly, combinatorial logic circuits 727$_2$ and 727$_3$ generate 4-PAM type (2) and type (3) data-state transition signals 730$_{2A}$ and 730$_{3A}$, and 2-PAM, partial response type (2) and type (3) data-state transition signals, 730$_{2B}$ and 730$_{3B}$, as follows:

Signal 730$_{2A}$=(MSB$_{n-3}$&MSB$_{n-4}$)&(LSB$_{n-3}$ xor LSB$_{n-4}$);

Signal 730$_{3A}$=(/MSB$_{n-3}$&/MSB$_{n-4}$)&(LSB$_{n-3}$ xor LSB$_{n-4}$);

Signal 730$_{2B}$=/D$_{n-2}$&D$_{n-3}$&D$_{n-4}$; and

Signal 730$_{3B}$=D$_{n-2}$&/D$_{n-3}$&/D$_{n-4}$.

It should be noted that, in both partial-response mode and 4-PAM mode, two successive pairs of data samples are used within the transition detect circuit 725 (e.g., MLSB:LSB$_{n-3}$ and MLSB:LSB$_{n-4}$ in 4-PAM mode; D$_{n-2}$/D$_{n-3}$ and D$_{n-3}$/D$_{n-4}$ in partial response mode) to generate the data-state transition signals 730. One or more of the data sample pairs may be buffered within a storage circuit within transition detect circuit 725 or elsewhere within the dual mode receiver and made available to the various combinatorial logic circuits 727. Also, the data samples may have different latencies in alternative embodiments according to the latency of the data samples generated by the data receive/level sampling circuit 651 of FIG. 27.

Select circuits 729$_1$, 729$_2$ and 729$_3$ each have a first input port coupled to receive a respective one of the 4-PAM type (1), type (2) and type (3) transitions detect signals 730$_{1A}$, 730$_{2A}$ and 730$_{3A}$, respectively, and a second input port coupled to receive a respective one of the 2-PAM, partial response type (1), type (2) and type (3) data-state transition signals 730$_{1B}$, 730$_{2B}$ and 730$_{3B}$, respectively. The mode select signal 622 is coupled to a select input of each of the select circuits 729 so that, when the mode select signal 622 is low to select a 4-PAM mode of operation, the 4-PAM data-state transition signals 730$_{1A}$, 730$_{2A}$ and 730$_{3A}$ are supplied to inputs of respective AND gates 731$_1$, 731$_2$ and 731$_3$, respectively. By contrast, when the mode select signal 622 is high, the 2-PAM, partial response data-state transition signals $730_{1B}$, $730_{2B}$ and $730_{3B}$ are supplied to respective inputs of the AND gates 731. In the embodiment of FIG. 32, the transition select signal 738 includes three component signals, TS[1], TS[2] and TS[3], that are input to AND gates $731_1$, $731_2$ and $731_3$, respectively, to gate the generation of the component data-state transition signals $733_1$, $733_2$, and $733_3$. Thus, the transition select signal 738 may be used to selectively enable the different types of data signal transitions to be used for clock recovery purposes. For example, if TS[3:1]=001, then detection of type (1) transitions (i.e., crossing the zero-threshold at the desired time) is enabled, but detection of type (2) and type (3) transitions (i.e., crossing the ±α thresholds at the desired time) is disabled. When TS[3:1]=111, then detection of all three types of transitions depicted in FIGS. 28 and 29 is enabled. Other settings of the transition select signal may be used to enable detection of the different transition types in other combinations. In one embodiment, the transition select signal 738 is generated according to a transition select value stored in a configuration circuit that may be run-time programmed (e.g., by a host processor or other system control component). The transition select value may alternatively be programmed into a non-volatile storage circuit (e.g., at production time) or similar hardware configurable circuit (e.g., fuse-blowing to establish desired configuration).

Numerous changes may be made to the transition detect circuit 725 and transition select circuit 740 without departing from the spirit and scope of the present invention. For example, if the data state transitions to be used for clock recovery is a subset of the three transition types shown in FIGS. 28 and 29, one or more component signals of the transition select signal 738 (and corresponding components of the combinatorial logic 727, select circuitry 729 and gating circuitry 731, 741) may be omitted. Moreover, if the transition types are fixed for a given application (e.g., all three types of data state transitions depicted in FIGS. 28 and 29, or any subset or single one thereof), the transition select signal 738 may be omitted altogether along with the combinatorial logic and gating circuitry for any unused types of data state transitions.

Returning to FIG. 31, the data-level crossing logic 711 asserts a data-level crossing signal 712 (DLC) upon detecting a sequence of data samples that indicate a monotonically sloped data level crossing. More specifically, when the mode select signal 622 indicates a 2-PAM, partial response operating mode, the data-level crossing logic 711 operates in generally the same manner as the data-level crossing logic 561 of FIG. 22 to assert a data-level crossing signal 712 (DLC) upon detecting data patterns that indicate a monotonically sloped crossing of data-level thresholds 1−α and/or −1+α (i.e., the data-level thresholds crossed by waveforms 532, 533, 535 and 536 of FIG. 21 or any subset thereof) and to generate early/late signal 713 in either a high or low state according to the state of error samples $E_{1-\alpha}$ and/or $E_{-1+\alpha}$. When the mode select signal indicates a 4-PAM operating mode, the data-level crossing logic 711 asserts the data-level crossing signal 712 upon detecting sequences of MSB:LSB samples that correspond to the waveforms illustrated in FIG. 30 (or a subset thereof) and outputs the early/late signal 713 in either a high or low state according to the state of error samples $E_{1-\alpha}$ and/or $E_{-1+\alpha}$ (e.g., as shown in Table 3 above). The data-level crossing signal 712 and corresponding early/late signal 713 are supplied to early/late counter 714 which operates in generally the same manner as the early/late counter 265 of FIG. 7 to count the individual early/late indications from the data-level crossing logic 711 and deliver a vote result 715 (e.g., an early/late count value or sign thereof) to the majority detector 277, the vote result indicating whether the majority of the early/late indications from the data-level crossing logic 711 indicate an early or late edge clock transition.

Figure 33:
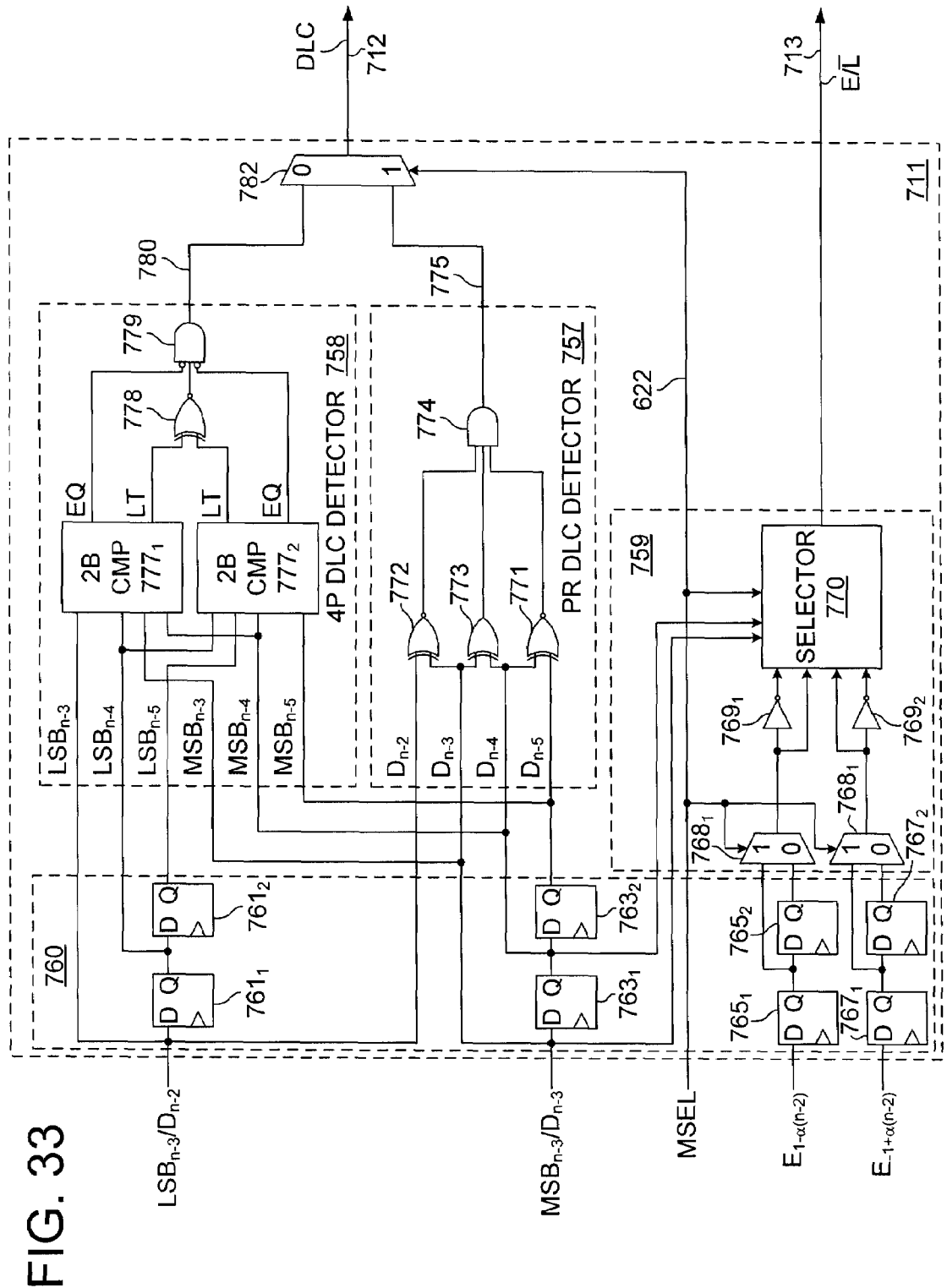
FIG. 33 illustrates an embodiment of the data-level crossing logic used within the clock recovery circuit of FIG. 31.

FIG. 33 illustrates an embodiment of the data-level crossing logic 711 of FIG. 32. The data-level crossing logic 711 includes a 4-PAM data-level crossing detector 758, partial-response data-level crossing detector 757, early/late signal selector 759 and sample buffer 760. The sample buffer 760 includes storage element pairs $761_1$–$761_2$, $763_1$–$763_2$, $765_1$–$765_2$ and $767_1$–$767_2$ each coupled in a shift register configuration (i.e., output of one storage element of a given pair coupled to the input of the next storage element in the pair) and each having clock inputs coupled to receive the data clock signal (not shown) or derivative thereof. The shift register formed by storage elements 761 is coupled to receive data sample LSBn−3/Dn−2 and outputs LSBn−4 and LSBn−1 to the 4-PAM data-level crossing detector 758. The shift register formed by storage elements 763 is coupled to receive data sample MSBn−3/Dn−3 and outputs MSBn−4 and MSBn−5 to the 4-PAM data-level crossing detector 758, and outputs partial-response data samples Dn−5 and Dn−4 to the partial-response data-level crossing detector 757. The 4-PAM data-level crossing detector 758 additionally receives input data samples LSBn−3 and MSBn−3, and the partial-response data-level crossing detector 757 additionally receives input data samples Dn−2 and Dn−3. The shift register formed by storage elements 765 is coupled to receive error sample $E_{1-\alpha(n-2)}$ and outputs latency-aligned error samples $E_{1-\alpha(n-3)}$ and $E_{1-\alpha(n-4)}$ to the early/late signal selector 759. Similarly, the shift register formed by storage elements 767 is coupled to receive error sample $E_{-1+\alpha(n-2)}$ and outputs latency-aligned error samples and $E_{-1+\alpha(n-3)}$ and $E_{-1+\alpha(n-4)}$ to the early/late signal selector 759.

In one embodiment 4-PAM partial-response detector 758 includes two-bit comparators $777_1$ and $777_2$ each of which performs a two-bit comparison between a pair of incoming MSB:LSB values. More specifically, two-bit comparator $777_1$ receives MSB:LSB$_{n-3}$ and MSB:LSB$_{n-4}$ and outputs a logic-high inequality signal (LT: less-than) if MSB:LSB$_{n-3}$ is less than MSB:LSB$_{n-4}$ and a logic-low inequality signal if MSB:LSB$_{n-4}$ is less than MSB:LSB$_{n-3}$. If the input MSB:LSB values are equal, then the two-bit comparator raises equality signal (EQ) and the state of the inequality signal is ignored (i.e., may be either high or low). Thus, the operation of the two-bit comparator $777_1$ is as shown in the following table and may be implemented by any combinatorial (or sequential) logic circuit that yields the indicated LT and EQ signals ('X' indicates a don't care state):

TABLE 4

| MSB:LSB$_{n-3}$ | MSB:LSB$_{n-4}$ | LT | EQ |
|---|---|---|---|
| 00 | 00 | X | 1 |
| 00 | 01 | 1 | 0 |
| 00 | 11 | 1 | 0 |
| 00 | 10 | 1 | 0 |
| 01 | 00 | 0 | 0 |
| 01 | 01 | X | 1 |
| 01 | 11 | 1 | 0 |
| 01 | 10 | 1 | 0 |
| 11 | 00 | 0 | 0 |
| 11 | 01 | 0 | 0 |
| 11 | 11 | X | 1 |
| 11 | 10 | 0 | 0 |
| 10 | 00 | 0 | 0 |
| 10 | 01 | 0 | 0 |

TABLE 4-continued

| MSB:LSB$_{n-3}$ | MSB:LSB$_{n-4}$ | LT | EQ |
|---|---|---|---|
| 10 | 11 | 0 | 0 |
| 10 | 10 | X | 1 |

The two-bit comparator $777_2$ receives data samples MSB: LSB$_{n-4}$ and MSB:LSB$_{n-5}$ as inputs and generates inequality and equality signals (LT and EQ) in the same manner as two-bit comparator $777_1$. By this arrangement, if data samples that correspond to any of the four monotonically decreasing waveforms illustrated in FIG. 30 are detected (i.e., 10→11→01, 10→11→00, 10→01→00, or 11→01→00), then both two-bit comparators $777_1$ and $777_2$ will raise the inequality signals (LT) and lower the equality signals (EQ) as MSB:LSB$_{n-3}$ will be less than MSB:LSB$_{n-4}$, and MSB:LSB$_{n-4}$ will be less than MSB:LSB$_{n-5}$. Similarly, if data samples that correspond to any of the four monotonically increasing waveforms illustrated in FIG. 30 are detected (i.e., 00→11→10, 00→01→10, 00→01→11, or 01→11→10), then both two-bit comparators $777_1$ and $777_2$ will lower the inequality signals (LT) and the equality signals (EQ) as MSB:LSB$_{n-3}$ will be greater than MSB:LSB$_{n-4}$, and MSB:LSB$_{n-4}$ will be greater than MSB:LSB$_{n-5}$. Thus, if the incoming and buffered data samples correspond to any of the eight monotonically sloped waveforms illustrated in FIG. 30, the two-bit comparators will output same-state inequality signals (LT) and will lower equality signals (EQ). The inequality signals (LT) are input to respective inputs of an exclusive-NOR gate 778 which outputs a logic high signal to a non-inverting input of logic AND gate 779 in response to same-state inequality signals, and the equality signals (LT) are input to respective inverting inputs of logic AND gate 779. By this arrangement, logic AND gate 779 raises a 4-PAM data-level crossing signal 780 when the incoming and buffered data samples correspond to any of the eight monotonically sloped waveforms illustrated in FIG. 30.

The partial-response data-level crossing detector is coupled to receive input data samples Dn−2 and Dn−3 from a data sampler and is also coupled to receive buffered data samples Dn−4 and Dn−5 from storage elements $763_1$ and $763_2$. In the embodiment of FIG. 33, the partial-response data-level crossing detector includes exclusive-NOR gates 771 and 772, exclusive-OR gate 773 and AND gate 774 which operate to assert a partial-response data-level crossing signal 775 in response to detecting data sample patterns that correspond to either of waveforms 532 or 535 of FIG. 21. More specifically, data samples Dn−4 and Dn−5 are provided to inputs of exclusive-NOR gate 771 which therefore generates a logic high output when Dn−4 and Dn−5 are in the same state (i.e., 1→1 or 0→0 transitions). Data samples $D_{n-2}$ and $D_{n-3}$ are provided to inputs of exclusive-NOR gate 772 which therefore outputs a logic high signal when $D_{n-2}$ and $D_{n-3}$ are in the same state. Data samples Dn−3 and Dn−4 are provided to inputs of exclusive-OR gate 773 which therefore outputs a logic high signal when Dn−3 and Dn−4 are in different states. The outputs of all three gates 771, 772 and 773 are provided to inputs of AND gate 774 so that the output of AND gate 774 goes high when $D_{n-5}=D_{n-4}$, $D_{n-4}\neq D_{n-3}$ and $D_{n-3}=D_{n-2}$ (i.e., when data samples $D_{n-5}$-$D_{n-2}$ correspond to either of the transition sequences 1→1→0→0 or 0→0→1→1). In an alternative embodiment, exclusive-NOR gate 771 and storage buffer 7632 may be omitted (and logic AND gate 774 implemented as a two-input gate instead of a three-input gate) so that the partial-response data-level crossing detector asserts the data-level crossing signal 775 in response to detecting data sample sequences that correspond to any of the waveforms 532, 533, 535 or 536 shown in FIG. 21.

Still referring to FIG. 33, the partial-response data-level crossing signal 775 and 4-PAM data-level crossing signal 780 are provided to respective inputs of multiplexer 782. The mode select signal is supplied to a control input of the multiplexer 782 so that when a partial-response operating mode is selected, the partial-response data-level crossing signal 775 is selected to be output as data-level crossing signal 712, and when a 4-PAM operating mode is selected, the 4-PAM data-level crossing signal 780 is selected to be output as data-level crossing signal 712.

The early/late select circuit 759 includes multiplexers $768_1$ and $768_2$, inverters $769_1$ and $769_2$, and selector logic 770. Multiplexer $768_1$ is used to select an error sample $E_{1-\alpha}$ having a latency that corresponds to the desired data-level crossing time. That is, if the mode select signal 622 indicates a partial-response mode of operation, then the desired data-level crossing time corresponds to the $D_{n-3}$ sampling instant, so that error sample $E_{1-\alpha(n-3)}$ is selected (i.e., from storage element $765_1$) and passed to inverter $769_1$ and to the selector logic 770. If the mode select signal 622 indicates a 4-PAM operating mode, then the desired data-level crossing time corresponds to the MSB:LSB$_{n-4}$ sampling instant, so that error sample $E_{1-\alpha(n-4)}$ is selected (i.e., from storage element $765_1$) and passed to inverter $769_1$ and to selector logic 770. The multiplexer $768_2$ operates similarly to multiplexer $768_1$ to select either error sample $E_{-1+\alpha(n-3)}$ or $E_{-1+\alpha(n-4)}$ to be passed to inverter $769_2$ and selector logic 770 according to the state of the mode select signal 622.

The selector logic 770 receives the selected error samples, $E_{1-\alpha}$ and $E_{-1+\alpha}$, and inverted versions thereof generated by inverters $769_1$ and $769_2$, and selects one of the error samples or inverted error samples to be output as early/late signal 713 according to the state of the mode select signal 622 and one or more of data samples MSB$_{n-3}$/$D_{n-3}$ and MSB$_{n-4}$. More specifically, when the mode select signal 622 indicates a partial-response mode of operation, then the state of data sample $D_{n-3}$ indicates whether a rising-slope crossing of the 1−α data level has occurred ($D_{n-3}$=1) or a falling-slope crossing of the −1+α data level has occurred ($D_{n-3}$=0). In a falling-slope crossing of the −1+α data level ($D_{n-3}$=0), a logic '1' error sample, $E_{-1+\alpha}$, indicates an early data clock signal, and a logic '0' error sample indicates a late data clock signal so that the non-inverted error sample $E_{-1+\alpha}$ is selected by the selector logic 770 to be output as early/late signal 713. By contrast in a rising-slope crossing of the 1−α data level ($D_{n-3}$=1), a logic '1' error sample, $E_{1-\alpha}$, indicates a late data clock signal, and a logic '0' error sample indicates an early data clock signal so that complemented error sample (/$E_{1-\alpha}$) generated by inverter $769_1$ is selected by the selector logic 770 to be output as early/late signal 713.

When the mode select signal 622 indicates a 4-PAM mode of operation, then the selector logic 770 determines which of the 1−α and −1+α data levels has been crossed and the rising/falling direction of the data level crossing based on data samples MSB$_{n-3}$ and MSB$_{n-4}$ in accordance with the following table:

TABLE 5

| MSB$_{n-4}$ | MSB$_{n-3}$ | Data Level Crossed | Slope Direction | Error sample selected to be output as Early/Late Signal |
|---|---|---|---|---|
| 0 | 1 | −1 + α | Rising | /$E_{1-\alpha}$ |
| 1 | 1 | 1 − α | Rising | /$E_{-1+\alpha}$ |

TABLE 5-continued

| $MSB_{n-4}$ | $MSB_{n-3}$ | Data Level Crossed | Slope Direction | Error sample selected to be output as Early/Late Signal |
|---|---|---|---|---|
| 1 | 0 | $1 - \alpha$ | Falling | $E_{1-\alpha}$ |
| 0 | 0 | $-1 + \alpha$ | Falling | $E_{-1+\alpha}$ |

Alternative logic arrangements may be used to select the source of the early/late select circuit 759 in alternative embodiments.

Returning to FIG. 31, the majority detectors 271 and 277, interpolator 273 and reference loop 275 operate generally as described in reference to FIG. 7 to generate the data clock signal 176 and edge clock signal 178. As described above, the update signals generated by majority detectors 271 and 277 need not be updated at the same rate or at the same time. Also, the data-state transition logic 701, early/late counter 704 and majority detector 271 may be omitted altogether in an alternative embodiment, and the timing information generated by the data-level crossing logic 711 alone used to update the phase of the data clock signal 176. The edge clock signal 178 need not be generated in such an embodiment, so that edge sampling circuitry may be omitted from the dual mode receive circuit 650 of FIG. 27.

Figure 34:
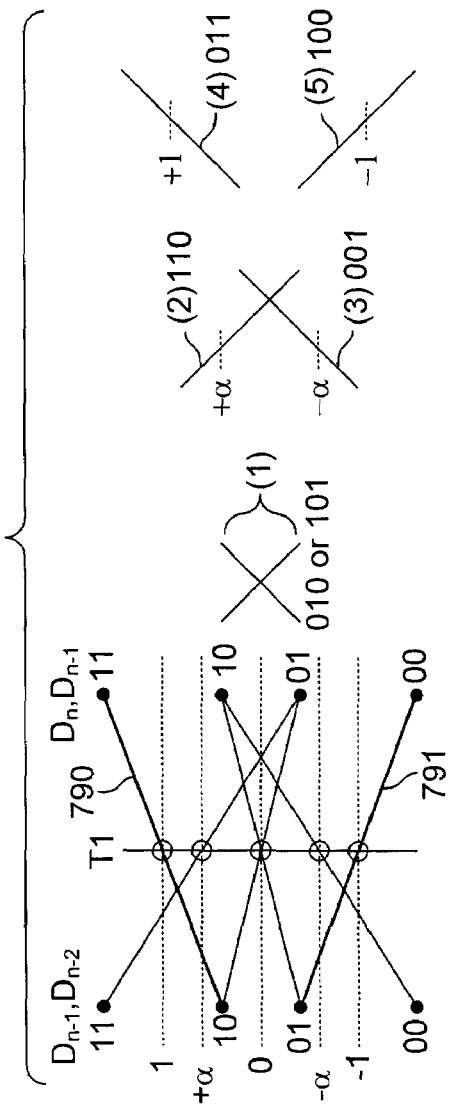
FIG. 34 illustrates additional data signal transitions that may be used for clock recovery when the dual mode receiver of FIG. 27 is operated in a partial response mode.

FIG. 34 illustrates the full set of transitions that may be detected when the dual mode receiver 650 of FIG. 27 is operated in the partial response mode. In particular, transitions 790 and 791 (i.e., transitions from 10 to 11 and from 01 to 00), designated type (4) and type (5) transitions, respectively, can be seen to cross the nominal +1 and −1 threshold levels (referred to herein as unity threshold levels), respectively, at the desired edge sampling point, T1. Note that, in these transitions, the input signal slews substantially faster than in the 01-to-10 and 10-to-01 transitions and therefore represent a potentially more accurate (and/or more jitter-free) source of clock phase information than the type (1), (2) and (3) data-state transitions. Accordingly, in one embodiment, additional edge sampling circuits are provided in the dual mode receiver of FIG. 27 (not shown), and corresponding logic is added to the data-state transition logic 701 of FIG. 31 to enable clock recovery based on type (4) and/or type (5) transitions. Alternatively, in one embodiment, the zero-threshold comparator 659 of FIG. 27 is re-allocated to a unity threshold comparator function after the ±α threshold levels are established (e.g., converge to the points 672 and 673 depicted in FIG. 29).

Figure 35:
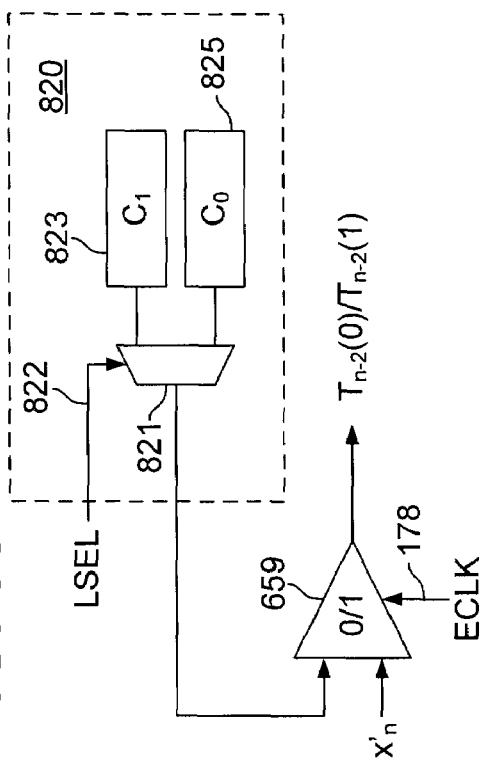
FIG. 35 illustrates an embodiment of a threshold select circuit.

FIG. 35 illustrates an embodiment of a threshold select circuit 820 that is used to select between control values $C_0$ and $C_1$ for the zero and unity threshold levels, respectively. Initially a threshold select signal 822 (LSEL) is supplied in a first state to multiplexer 821 (or other select circuit) to select the $C_0$ control value to be provided to edge sampling circuit 659, thereby enabling the 10-to-01 and 01-to-10 transitions to be used for clock recovery purposes as the ±α levels are adapted. After the ±α levels have reached convergence points (e.g., begin to dither), the threshold select signal 822 is switched to an alternate state to select the $C_1$ control value to be used for generation of edge samples. The $C_1$ control value may be generated by the adaptive module 653 of FIG. 27 using the techniques discussed above in reference to FIG. 22. The $C_0$ and/or $C_1$ control values may be buffered in registers 823 and 825 as shown in FIG. 35 (or other storage circuits), or provided directly to the multiplexer 821 from the adaptive module (e.g., element 653 of FIG. 27).

Referring again to the dual mode receiver 650 of FIG. 27, it should be noted that the receiver may alternatively be a dedicated 4-PAM receiver having the 4-PAM clock recovery circuitry described above (i.e., omitting the combinatorial circuitry and mode select circuitry used to enable the partial response mode). That is, the 4-PAM circuit may include data sampling circuits and error sampling circuits for capturing a sequence of 2-bit data samples and 2-bit error samples (or more bits per data sample and/or error sample in the case of M-PAM signaling, M>4), and clock recovery circuitry that captures transition samples at one or more of the 0, +α and −α threshold levels, and that selectively uses the transition samples, data samples and error samples to perform data-level clock recovery and, optionally, data-state transition clock recovery. Conversely, the circuitry used to enable the 4-PAM mode of operation may be omitted from the dual mode receiver 650 to provide a dedicated partial-response receiver with clock recovery circuitry that uses error samples and (optionally) transition samples obtained by comparing the incoming signal $x'_n$ to one or more of the 0, +α and −α data-level thresholds.

Receive Interface with Multiple DLC-Based Receive Circuits

Figure 36:
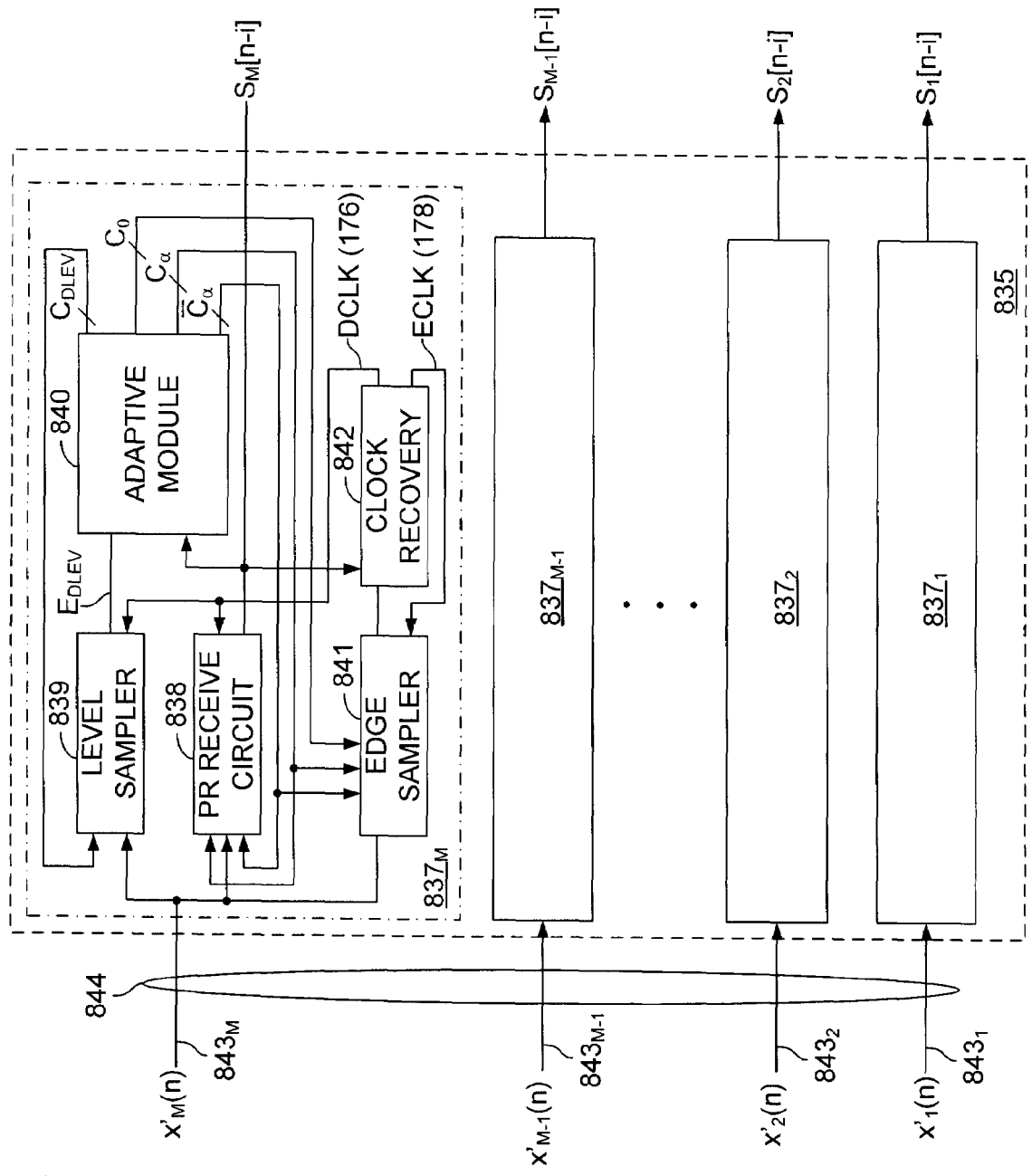
FIG. 36 illustrates an embodiment of an input circuit having multiple partial response receivers.

FIG. 36 illustrates an input circuit 835 that includes multiple partial response receivers $837_1$–$837_M$ according to an embodiment of the invention. Each of the partial response receivers $837_1$–$837_M$ is coupled to a respective one of signal lines $883_1$–$883_M$ to receive a corresponding one of data signals $x'_1$–$x'_M$. In one embodiment, each of the data signals $x'_1$–$x'_M$ is a serial stream of data values (e.g., data eyes) that is sampled within a corresponding one of partial response receivers $837_1$–$837_M$ to generate a corresponding one of sample values, $S_1$–$S_M$. The sample values $S_1$–$S_M$ are delayed relative to the symbols conveyed in the corresponding data signals $x'_1$–$x'_M$ by one or more symbol times, i, according to the latency introduced by the partial response receivers 837. Thus, during the symbol time in which data value $x'_M[n]$ is valid at the input to partial response receiver $837_M$, the partial response receiver outputs sample value $S_M[n-i]$. Partial response receivers $837_1$–$837_{M-1}$ similarly output respective sample values $S_1[n-i]$–$S_{M-1}[n-i]$ during the symbol times in which data values $x'_1[n]$–$x'_{M-1}[n]$ are valid.

In one embodiment, each of the signal lines $843_1$–$843_M$ forms a unidirectional or bidirectional point-to-point signaling link between a first IC device that includes input circuit 835 and a second IC device. In the case of a bi-directional link, the first IC device may additionally include transmit circuitry coupled to the signal lines 843, and the second IC device may include a counterpart input/output circuitry having an input circuit similar to input circuit 835. The first and second IC devices may be in separate IC packages coupled to a common substrate (e.g., circuit board) or coupled to different substrates (e.g., coupled to respective daughterboards with signal paths $843_1$–$843_M$ formed in part by signal traces on the daughterboards and on a backplane, or the first IC device coupled to a daughterboard and the second IC device coupled to a motherboard). Alternatively, the first and second IC devices may be included within the same IC package (e.g., a multi-chip module, chip-stack package, paper-thin package or combination of integrated circuit dice within a package). In another embodiment, each of the signal lines $843_1$–$843_M$ forms a unidirectional or bidirectional multi-drop signaling link coupled to three or more IC devices, with the IC devices or any subset thereof being disposed on the same or different substrates, and within the same or different IC packages.

In either the point-to-point or multi-drop embodiments, the signal lines $843_1$–$843_M$ may constitute a parallel signaling path 844 for transmission of multi-bit data values. For example, each of the sample values $S_1$–$S_M$ for a given symbol time (i.e., corresponding to data values $x'_1$–$x'_M$ recovered from path 844) may represent a unified digital value (in which $S_M$ is a most significant bit (MSB) and sample $S_1$ is a least significant bit (LSB), M being any integer value greater than one. Also, subsets of bits within the sample values $S_1$–$S_M$ may constitute respective unified digital values (e.g., $S_1$–$S_X$ being a first value ordered from LSB to MSB, $S_{X+1}$–$S_Y$ being a second data value ordered from LSB to MSB, and so forth to $S_{Z+1}$ to $S_M$ which constitute a last data value ordered from LSB to MSB). Further, any number of successively received samples (i.e., corresponding to a packetized transmission of values) may form a unified digital value. For example, $S_1[n-i]$–$S_M[n-i]$, $S_1[n-i-1]$–$S_M[n-i-1]$, ..., $S_1[n-i-Q]$–$S_M[n-i-Q]$ may form a unified digital value having a total of Q×M bits (Q being any integer value greater than one) in which one bit is an LSB and one bit is an MSB. Alternatively, a set of successively received samples may form multiple unified digitized values, as when bits of a first digitized value are generated in successive symbol times by partial response receivers $837_1$–$837_X$, bits of a second digitized value are generated in successive symbol times by partial response receivers $837_{X+1}$–$837_Y$, and so forth.

In the embodiment of FIG. 36, each partial response receiver 837 includes a partial response receive circuit 838, level sampler 839, adaptive module 840, edge sampler 841 and clock recovery circuit 842. The partial response receive circuit 838 may be a multi-mode receive circuit as described above (i.e., capable of being switched between a multi-level signaling mode and a partial-response mode), or may be dedicated to partial-response operation, or may be a binary receive circuit as discussed above in reference to FIG. 5. Also, the partial response receive circuit may operate on incoming binary or multi-level signals (e.g., 2-PAM, 4-PAM, 8-PAM, 10-PAM, etc.) having any data rate (e.g., single data rate, double data rate, quad data rate, octal data rate, decade data rate, etc.). Thus, the partial response receive circuit 838 may be implemented by any of the receive circuit embodiments described herein. Similarly, the level sampler 839 and adaptive module 840 may be implemented by any of the level sampler and adaptive module embodiments described herein, including adaptive module embodiments that adaptively generate transmit pre-emphasis tap weights and that include circuitry for controlling tap data source selection and tap weight determination within a receive-side equalizer. For example, though depicted as outputting a single error sample, $E_{DLEV}$, the level sampler 839 may output multiple error samples to the adaptive module 840 and clock recovery circuit 842, and the adaptive module 840 may output any number of control values to the level sampler 839, partial response receive circuit 838 and edge sampler 841 in addition to or instead of $C_{DLEV}$, $C_\alpha$, $/C_\alpha$ and $C_0$. Also, though depicted in FIG. 36 as recovering a data clock signal 176 (DCLK) and edge clock signal 178 (ECLK), the edge sampler 841 and clock data recovery circuit 842 may recover any number of clock signals as necessary to support multi-data rate embodiments. Further, the edge sampler 841 and clock recovery circuit 842 may recover phase information (i.e., for adjusting the phase of the recovered clock signals) from any or all data-state transitions and data-level crossings in the incoming data signals 843 as described above. The edge sampler 841 and data-state transition logic within the clock recovery circuit 842 may also be omitted in alternative embodiment, and data-level clock recovery used alone or in conjunction with other timing information to adjust the phase of the data clock signal 176. The edge clock signal may be omitted in such an embodiment, or The edge sampler 841 and clock recovery circuit 842 may be omitted from the partial response receiver 837 altogether (or in part) in an embodiment in which clock signals, strobe signals or other timing signals are provided by another source, such as an external or internal clock generator, or separate clock recovery circuit.

Figure 37:
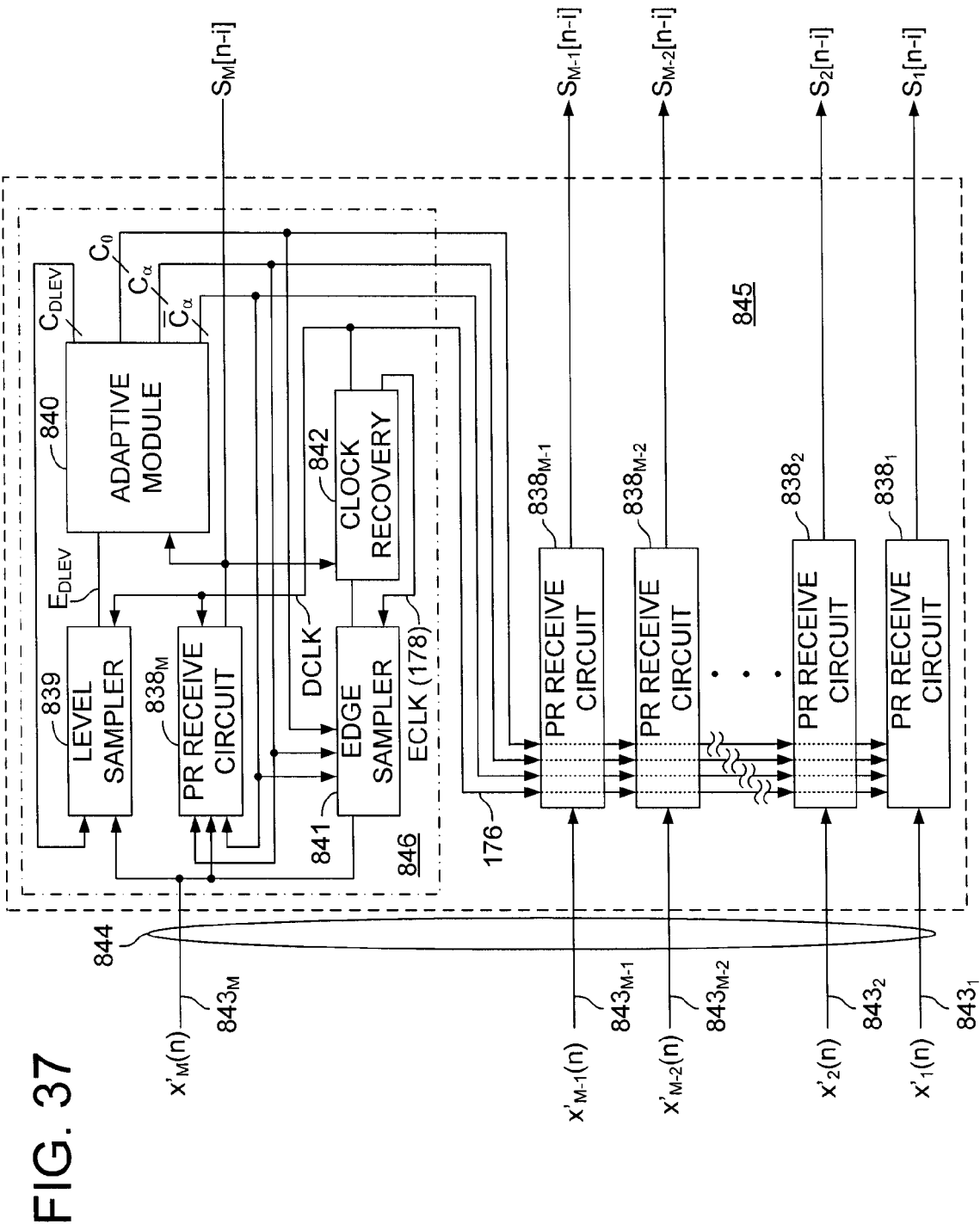
FIG. 37 illustrates an alternative embodiment of an input circuit having multiple partial response receivers.

FIG. 37 illustrates an input circuit 845 according to an alternative embodiment of the invention. The input circuit 845 is similar to the input circuit 835 of FIG. 36 (and may be implemented in all the alternative embodiments described in reference to FIG. 36), except that the circuitry used to generate partial response thresholds (or representative control values) and data clock signal 176 is shared among multiple partial response receive circuits $838_1$–$838_M$. That is, a single level sampler 839 and corresponding adaptive module 840 are provided within receive circuit 846 and used to generate control values $C_\alpha$, $/C_\alpha$ and $C_0$ (and additional or different threshold control values in multi-level signaling embodiments and embodiments that do not include clock recovery circuitry) that are supplied to each of the partial response receive circuits $838_1$–$838_M$, and a single edge sampler 841 and corresponding clock recovery circuit 842 are used to generate the data clock signal 176 that is supplied to each of the partial response receive circuits $838_1$–$838_M$. Multiple data clock signals may be generated and shared among the partial response receive circuits $838_1$–$838_M$ in multi-data rate embodiments, and the control thresholds may additionally or alternatively be used for multi-level signal reception, adaptive generation of transmit pre-emphasis tap weights and/or receive-side equalization tap weights and tap data source selection. By sharing the circuitry for generating control thresholds and/or the circuitry for generating data clock signals, the amount of circuitry within the input circuit 845 is substantially reduced relative to input circuit 835, reducing production and operational cost of the host integrated circuit device (i.e., due to reduced die area consumption, layout complexity, test and verification time, power consumption, etc.). Note that, in an embodiment in which the data clock signal 176 is provided by circuitry other than clock recovery circuit 842 (e.g., external clock source, internal clock generated), the edge sampler 841 and clock data recovery circuit 842 may be omitted. Alternatively, programmable selection of the clock source may be used to select either the recovered data clock (i.e., recovered by operation of the edge sampler 841 and clock data recovery circuit 842) or another clock source to provide a data clock signal to the partial response receive circuits $838_1$–$838_M$. As in the embodiment of FIG. 36, the signal lines $843_1$–$843_M$ may be used to deliver distinct serial transmissions, or transmission of related groups of bits (e.g., the M bits received during a given symbol time representing one or more multi-bit digital values) as, for example, in the case of a parallel bus or any other signaling system in which the threshold control values and/or timing control signals are expected to be substantially similar (e.g., substantially same thresholds and/or clock phases) across multiple signaling paths. Also, while a single level sampler 839 and corresponding adaptive module 840 are depicted in FIG. 37 as generating threshold control values $C_\alpha$, $/C_\alpha$ and $C_0$ for each of the partial response receive circuits $838_1$–$838_M$, in an alternative embodiment, multiple level sampler/adaptive module pairs may be used to generate threshold control values for respective subsets of the partial response receive circuits $838_1$–$838_M$. Respective edge sampler/clock recovery circuit pairs may similarly be used to generate data clock signals for corresponding subsets of partial response receive circuits $838_1$–$838_M$.

Still referring to FIG. 37, the partial response receive circuits $838_1$–$838_M$ may be implemented by any of the embodiments described herein including. Also, in embodiments in which a preamplifier or offset control circuit is used to adjust the effective threshold of a differential sampling circuit above or below a common mode (e.g., as described below in reference to FIGS. 38 and 40), such preamplifier or offset control circuit may be shared among multiple partial response receive circuits 838, thereby reducing the circuitry within the partial response receive circuits $838_1$–$838_M$ to that of a single sampling circuit. Respective preamplifiers (or offset control circuits) may also be shared among subsets of the partial response receive circuits $838_1$–$838_M$.

Differential Sampling Circuit

Figure 38:
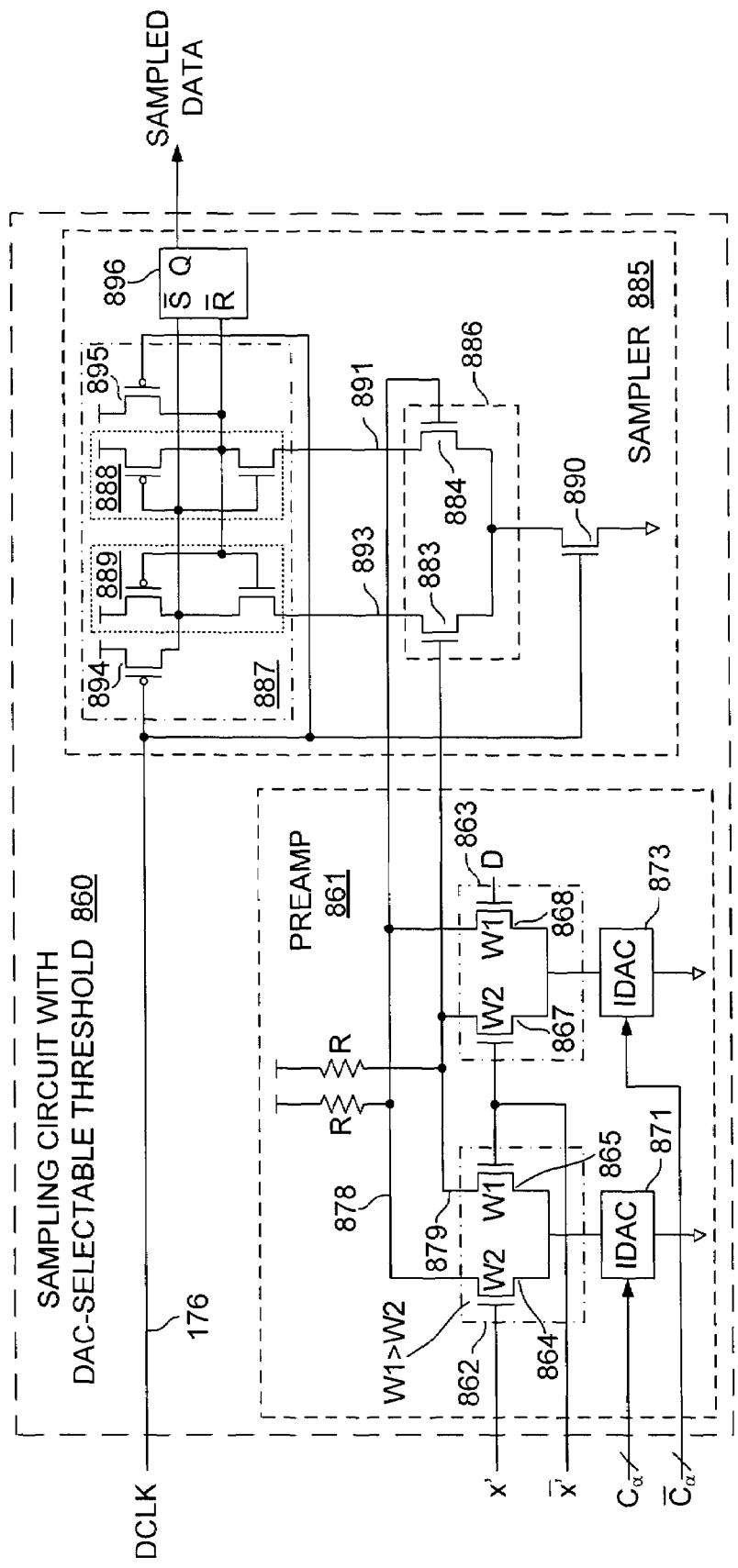
FIG. 38 illustrates an embodiment of a differential sampling circuit.

FIG. 38 illustrates an embodiment of a differential sampling circuit 860 that may be used to implement any of the various sampling circuits described above. The sampling circuit 860 includes a preamplifier 861 and a sampling sub-circuit 885. The preamplifier 861 includes a pair of differential amplifiers 862 and 863 each biased by a respective current DAC (IDAC) 871 and 873, and each having first and second output nodes 878 and 879 coupled to a supply voltage via a respective resistive element, R. The resistive elements may be implemented, for example, using diode-configured transistors, biased transistors, resistors, or any other active or passive circuitry for establishing a resistance. Transistors 865 and 864 within differential amplifier 862 have widths W1 and W2, respectively, with W1 being greater than W2. Transistors 868 and 867 within differential amplifier 863 also have respective widths W1 and W2. A differential input signal composed of signal components x' and /x' is coupled to each of the differential amplifiers 862, 863 such that x' is coupled to transistors 864 and 868 and /x' is coupled to transistors 865 and 867. By this arrangement, when $C_\alpha$ and $/C_\alpha$ are substantially equal (e.g., in an 8-bit control word, $C_\alpha$=128 and $/C_\alpha$=127), the differential amplifiers 862 and 863 are substantially balanced, operating in effect as a single differential amplifier having component transistors of width W1+W2. Thus, if x' is greater than /x', transistors 864 and 868 will collectively sink more current than transistors 865 and 867, thereby causing the voltage on output node 878 to be pulled down (i.e., via the resistive element, R, coupled to the output node 878) more than the voltage on output node 879.

When the preamplifier 861 is balanced (i.e., $C_\alpha$ substantially equal to $/C_\alpha$), the voltages on the preamplifier output nodes 878 and 879 are substantially equal when x' and /x' are at the common mode potential (i.e., as when x' and /x' cross one another in transition). Thus, the effective threshold of the preamplifier 861, and therefore the sampling circuit 860 as a whole, occurs at the common mode of x' and /x'. By contrast, when the preamplifier is imbalanced by increasing $C_\alpha$ relative to $/C_\alpha$, equal values of x' and /x' result in output node 879 being pulled lower than output node 878, due to the fact that transistor 865 is wider than transistor 864 (and therefore has a greater gain), and that the compensating (balancing) effect of differential amplifier 863 is diminished by the reduced control value $/C_\alpha$. Thus, increasing $C_\alpha$ relative to $/C_\alpha$ increases the effective threshold of the preamplifier above the common mode. By increasing $C_\alpha$ to the point at which the threshold between '0' and '1' signal levels is set to $\alpha$, a differential sampling circuit having a threshold level at $\alpha$ is achieved. By reversing the connections of the $C_\alpha$ and $/C_\alpha$ values to the current DACs of a counterpart sampling circuit (not shown), a differential sampling circuit having a threshold level at $-\alpha$ is achieved.

The sampling sub-circuit 885 includes a differential amplifier 886 formed by transistors 883 and 884, a sense amplifier 887 formed by back-to-back coupled inverters 888 and 889, and a storage circuit 896 formed by a set-reset flip-flop. The differential amplifier 886 includes control inputs coupled to the output nodes 878 and 879, respectively, of the preamplifier 861, and output nodes 891 and 893 coupled to source terminals of the inverters 888 and 889, respectively. A biasing transistor 890, switchably controlled by the data clock signal 176 (or other sample control signal), is coupled between the differential amplifier 886 and a ground reference (or other low voltage reference). The data clock signal 176 is additionally coupled to control inputs of positively-doped MOS (PMOS) transistors 894 and 895 which are coupled between a supply voltage (e.g., $V_{DD}$) and output nodes of the inverters 888 and 889. By this arrangement, when the data clock signal 176 is low, transistor 890 is switched off, and transistors 894 and 895 are switched on to pre-charge the output nodes of the inverters 888 and 889 to the supply voltage. The output nodes of the inverters 888 and 889 are coupled to active-low set and reset inputs, respectively, of the storage circuit 896, so that the content of the storage circuit 896 is maintained through the low half-cycle of the data clock signal 176. When the data clock signal 176 goes high, biasing transistor 890 is switched on and draws current through the two transistors 884 and 883 of the differential amplifier 886 in proportion to the voltages developed on the output nodes 878 and 879 of the preamplifier 861. Thus, if the voltage developed on node 879 is higher than the voltage on node 878, the current drawn by biasing transistor 890 will flow primarily through transistor 883. Conversely, if the voltage developed on node 878 is higher than the voltage on 879, the current drawn by biasing transistor will flow primarily through transistor 883. Transistors 894 and 895 are switched off in response to the high-going data clock signal 176, so that the pre-charged outputs of the inverters 888 and 889 are discharged by currents flowing through transistors 883 and 884. By this operation, if the incoming signal (x') exceeds the common mode voltage, ((x'+/x') divided by 2), by more than the +$\alpha$ threshold level (i.e., the incoming signal exceeds the +$\alpha$ threshold level), the current drawn by biasing transistor 890 will flow primarily through transistor 883. Consequently, the output node of inverter 889 will be discharged more rapidly than the output node of inverter 888, driving the output of inverter 889 low and driving the output of inverter 888 high (i.e., the PMOS transistor within inverter 888 is switched on and the NMOS transistor within inverter 888 is switched off). The low output of inverter 889 is applied to the active-low set input of the storage circuit 896, causing the storage circuit 896 to store a logic '1' sampled data value. By contrast, if the incoming signal level does not exceed the +$\alpha$ threshold level, the current drawn by biasing transistor 890 will flow primarily through transistor 884, thereby driving inverter 888 low (and driving inverter 889 high) to store a logic '0' sampled data value within storage circuit 896.

Figure 39:
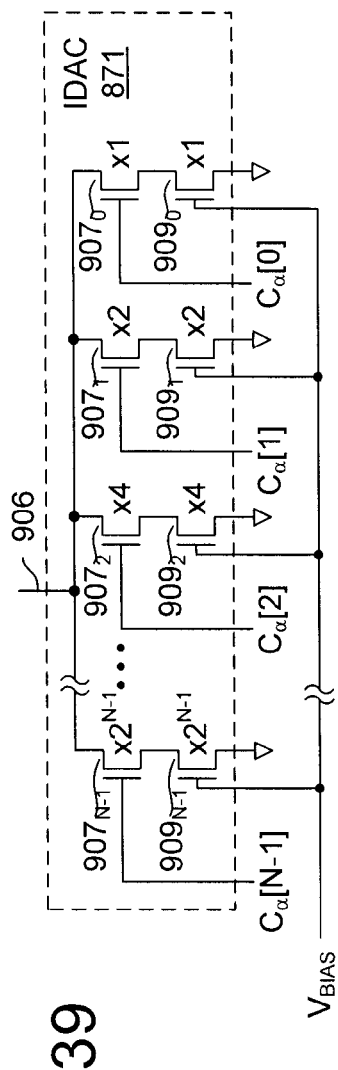
FIG. 39 illustrates an embodiment of a digital-to-analog converter (DAC) that may be used to implement the DACs within the differential sampling circuit of FIG. 38.

FIG. 39 illustrates an embodiment of the current DAC 871 of FIG. 38. The current DAC 871 includes control transistors $907_0$–$907_{N-1}$ and biasing transistors $909_0$–$909_{N-1}$. Each the control transistors $907_0$–$907_{N-1}$ is coupled in series (e.g., source to drain) with a corresponding one of the biasing transistors $909_0$–$909_{N-1}$ to form a transistor pair that is coupled between a reference voltage (ground in this example) and an output node 906 (i.e., the node to be connected to the source terminals of the transistors which form the differential amplifier 862 of FIG. 38). Gate terminals of the control transistors $907_0$–$907_{N-1}$ are coupled to receive respective component signals, $C_\alpha[0]$–$C_\alpha[N-1]$, of a multi-bit control value, $C_\alpha$ (or, control value /$C_\alpha$). Each of the control transistors $907_0$–$907_{N-1}$ has a binary weighted gain such that a current of $I_{REF} \times 2^i$ (where i represents the $i^{th}$ transistor in the positions 0, 1, 2, ..., N–1) flows through control transistor $907_i$ when the corresponding control signal component is high. Thus, if all the constituent bits of the control value $C_\alpha[N-1:0]$ are high, then $I_{REF}$ flows through control transistor $907_0$, $I_{REF} \times 2$ flows through transistor $907_1$, $I_{REF} \times 4$ flows through control transistor $907_2$, and so forth to control transistor $907_{N-1}$ which conducts $I_{REF} \times 2^{N-1}$. Accordingly, control transistors $907_0$–$907_{N-1}$ are designated x1, x2 ..., $x2^{N-1}$ transistors, respectively. By this arrangement, the control value $C_\alpha[N-1:0]$ may be set to any of $2^N$ values to select bias currents that range from 0 to $I_{REF} \times 2^{N-1}$ in increments of $I_{REF}$. The biasing transistors $909_0$–$909_{N-1}$ have gate terminals coupled to receive a bias voltage, VBIAS, that is adjusted as necessary (e.g., by a biasing circuit) to establish or maintain a desired $I_{REF}$.

In one embodiment, the relative gains (i.e., transconductance values) of the various transistors used to implement the current DAC 871 (and therefore drive strengths of the sub-drivers) are established by adjusting the width-length ratio (i.e., W/L) of individual control transistors 907 and/or biasing transistors 909. For example, the width-length ratio of the x2 control transistor $907_1$ is twice the width-length ratio of the x1 control transistor $907_0$, the width-length ratio of the x4 control transistor $907_2$ is twice the width-length ratio of the x2 control transistor $907_1$, and so forth. The biasing transistors 909 may have similar gain ratios relative to one another (e.g., x1, x2, x4, $x2^{N-1}$ as shown in FIG. 39). Other techniques for adjusting the relative gains of the control transistors 907 and biasing transistors 909 may be used in alternative embodiments. Also, weightings other than binary weightings may be used. For example, in one embodiment, each of the control transistors 907 has an equal gain to each of the other control transistors 907 such that the current drawn by the current DAC 871 is proportional to the number of logic '1' bits in the control value, $C_\alpha$.

Figure 40:
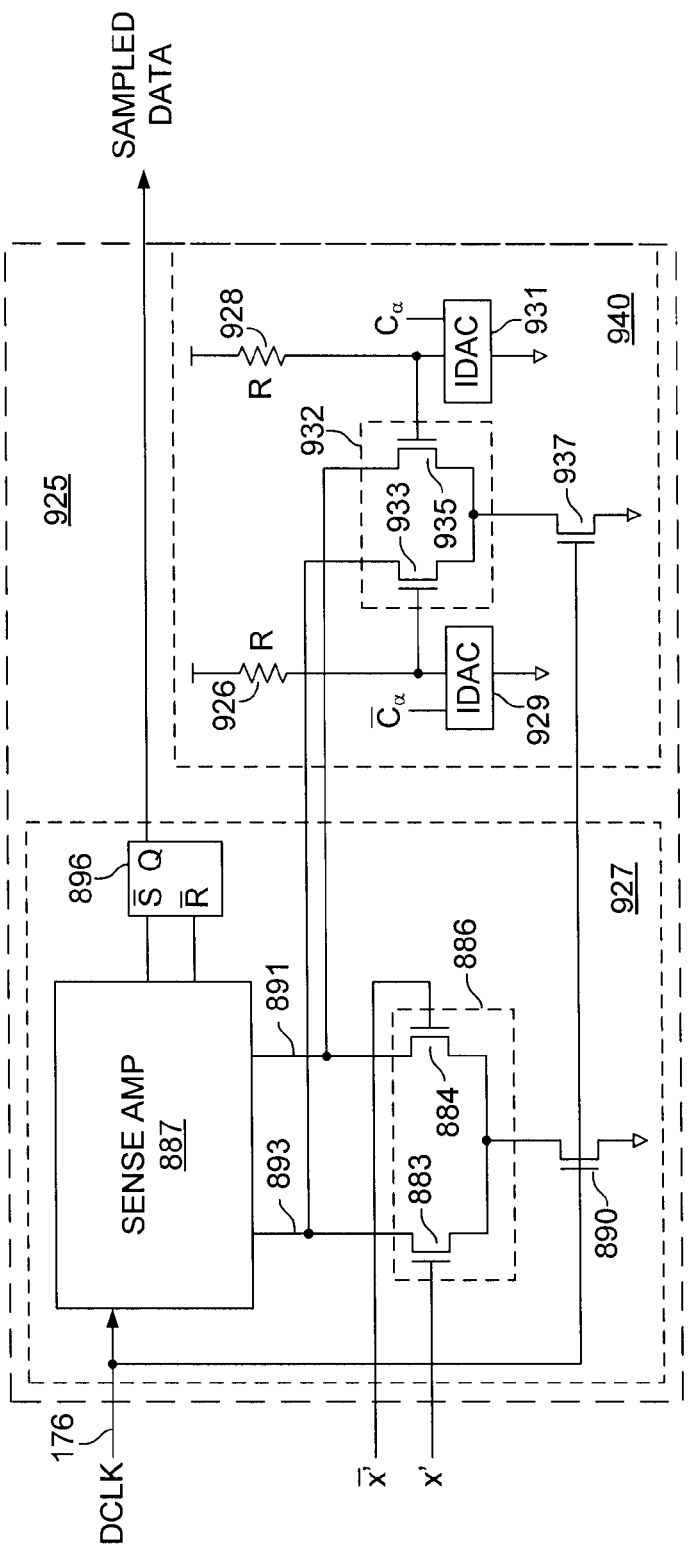
FIG. 40 illustrates an alternative embodiment of a differential sampling circuit.

FIG. 40 illustrates an alternative embodiment of a differential sampling circuit 925 that may be used to implement the various sampling circuits described above. The sampling circuit 925 includes a sampling sub-circuit 927 and an offset control circuit 940. The sampling sub-circuit 927 is implemented in generally the same manner as the sampling sub-circuit 885 of FIG. 38 (and includes differential amplifier 886, sense amplifier 887, biasing transistor 890, and storage circuit 896), except that the input signal lines carrying x' and /x' are coupled directly to the control terminals of transistors 883 and 884, respectively. The offset control circuit 940 includes a differential amplifier 932 biased by biasing transistor 937 and having output nodes coupled to nodes 891 and 893 of the sampling sub-circuit 927. Control terminals of the transistors 933 and 935 of the differential amplifier 932 are biased by respective voltage DACs (e.g., implemented by current DACs 929 and 931 coupled to respective resistive pull-up elements 926 and 928) controlled by $C_\alpha$ and /$C_\alpha$, respectively. By this arrangement, when the sample clock signal goes high the current through output node 893 of the sampling sub-circuit 927 is a sum of the currents drawn by transistor 883 of the sampling sub-circuit 927 and transistor 933 of the offset control circuit 940. Similarly, the current through node 891 of the sampling sub-circuit 927 is a sum of the currents drawn by transistor 884 of the sampling sub-circuit 927 and transistor 935 of the offset control circuit 940. As discussed above in reference to FIG. 38, when the current through node 891 exceeds the current through node 893, a logic '1' is stored within storage circuit 896 and, conversely, when the current through node 893 exceeds the current through node 891, a logic '0' is stored within storage circuit 896.

When the DAC control values $C_\alpha$ and /$C_\alpha$ are substantially the same, the sampling circuit 925 is balanced and the effective threshold occurs at the common mode of the x' and /x' signal levels. That is, if x' exceeds the common mode voltage, $V_{CM} = ((x'+/x')$ divided by 2), the current through node 893 exceeds the current through node 891, causing a logic '1' to be captured as the sampled data value. As $C_\alpha$ is increased and /$C_\alpha$ decreased, the effective threshold of the differential amplifier is increased such that x' must be higher than /x' by an amount necessary to overcome the additional current drawn by transistor 935 of the offset control circuit. Thus, by increasing $C_\alpha$ and decreasing /$C_\alpha$, the effective threshold of the sampling circuit may be set to the partial response level, α. That is, a logic '1' is output as the sampled data value if the difference between the x' exceeds the common mode voltage, $V_{CM}$ by more than α, and a logic '0' is output otherwise. A counterpart sampling circuit having a −α threshold may be provided by switching the $C_\alpha$ and /$C_\alpha$ inputs to the DACs 929 and 931.

Aspects of embodiments described herein are set forth for example and without limitation in the following numbered clauses:

1. An integrated circuit device comprising:
   a first sampling circuit to generate a sequence of data samples in response to transitions of a first clock signal, each data sample having either a first state or a second state according to whether an incoming signal exceeds a first threshold;
   a second sampling circuit to generate an error sample in response to one of the transitions of the first clock signal, the error sample having either a first state or a second state according to whether the incoming signal exceeds a second threshold; and
   a phase adjust circuit to adjust a phase of the first clock signal if the sequence of data samples matches a predetermined pattern and based, at least in part, on whether the error sample has the first state or the second state.
2. The integrated circuit device of clause 1 wherein the sequence of data samples comprises at least three data samples.
3. The integrated circuit device of clause 2 wherein the error sample is generated substantially simultaneously with one of the at least three data samples.
4. The integrated circuit device of clause 3 wherein the at least three data samples include first, second and third data samples generated one after another, and wherein the error sample is generated substantially simultaneously with the second data sample.
5. The integrated circuit device of clause 1 wherein each of the data samples is a single-bit value having either the first state or the second state.
6. The integrated circuit device of clause 1 wherein each of the data samples comprises at least two constituent bits.
7. The integrated circuit device of clause 1 wherein the incoming signal is a differential signal and wherein the first sampling circuit is a differential sampling circuit.
8. The integrated circuit device of clause 1 wherein the first clock signal comprises a plurality of component clock signals that are phase offset from one another to enable generation of two or more data samples of the sequence of data samples within the period of a first one of the component clock signals.
9. The integrated circuit device of clause 1 wherein the sequence of data samples matches the predetermined pattern if the sequence of data samples indicate that the input signal ascended from a level below the second threshold to a level above the second threshold, crossing the second threshold at a time nominally aligned with the one of the transitions of the first clock signal.

10. The integrated circuit device of clause 9 wherein phase adjust circuit is configured to generate a vote to retard the phase of the first clock signal if the state of the error sample indicates that the error sample was generated based on a level of the incoming signal that is below the second threshold.

11. The integrated circuit device of clause 9 wherein phase adjust circuit is configured to generate a vote to advance the phase of the first clock signal if the state of the error sample indicates that the error sample was generated based on a level of the incoming signal that is above the second threshold.

12. The integrated circuit device of clause 1 wherein the sequence of data samples matches the predetermined pattern if the sequence of data samples indicate that the input signal descended from a level above the second threshold to a level below the second threshold, crossing the second threshold at a time nominally aligned with the one of the transitions of the first clock signal.

13. The integrated circuit device of clause 12 wherein phase adjust circuit is configured to generate a vote to advance the phase of the first clock signal if the state of the error sample indicates that the error sample was generated based on a level of the incoming signal that is below the second threshold.

14. The integrated circuit device of clause 12 wherein phase adjust circuit is configured to generate a vote to retard the phase of the first clock signal if the state of the error sample indicates that the error sample was generated based on a level of the incoming signal that is above the second threshold.

15. The integrated circuit device of clause 1 wherein the phase adjust circuit comprises circuitry to generate a phase-advance indication if the error sample is in the first state and a phase-retard indication if the error sample is in the second state.

16. The integrated circuit device of clause 1 wherein the sequence of data samples matches the predetermined pattern if the sequence of data samples comprises a logic '1' data sample followed by a first logic '0' data sample followed by a second logic '0' data sample.

17. The integrated circuit device of clause 1 wherein the sequence of data samples matches the predetermined pattern if the sequence of data samples comprises a logic '0' data sample followed by a first logic '1' data sample followed by a second logic '1' data sample.

18. The integrated circuit device of clause 1 wherein each of the data samples comprises at least two bits that correspond to one of at least four possible signal levels, and wherein the sequence of data samples matches the predetermined pattern if at least three data samples in the sequence of data samples correspond to progressively lower signal levels of the at least four possible signal levels.

19. The integrated circuit device of clause 1 wherein each of the data samples comprises at least two bits that correspond to one of at least four possible signal levels, and wherein the sequence of data samples matches the predetermined pattern if at least three data samples in the sequence of data samples correspond to progressively higher signal levels of the at least four possible signal levels.

20. The integrated circuit device of clause 1 wherein the first sampling circuit comprises:

first and second component sampling circuits to generate first and second data samples, respectively, in response to each transition of the first clock signal; and a select circuit to select one of the first and second data samples to be included in the sequence of data samples.

21. The integrated circuit device of clause 20 wherein the select circuit is configured to select one of the first and second data samples based on a data sample previously selected to be included in the sequence of data samples.

22. The integrated circuit device of clause 20 wherein the first component sampling circuit is configured to generate the first data sample in either the first state or the second state according to whether the incoming signal exceeds an upper threshold and the second component sampling circuit is configured to generate the second data sample in either the first state or the second state according to whether the incoming signal exceeds a lower threshold, the first threshold being the upper threshold if the first data sample is selected to be included in the sequence of data samples, and the first threshold being the lower threshold if the second data sample is selected to be included in the sequence of data samples.

23. A method of operation within an integrated circuit device, the method comprising:

generating a sequence of data samples in response to transitions of a first clock signal, each of the data samples having either a first state or a second state according to whether an incoming signal exceeds a first threshold;

generating an error sample in response to one of the transitions of the first clock signal, the error sample having either the first state or the second state according to whether the incoming signal exceeds a second threshold; and adjusting a phase of the first clock signal if the sequence of data samples matches a predetermined pattern and based, at least in part, on whether the error sample has the first state or the second state.

24. The method of clause 23 wherein generating the sequence of data samples comprises generating a sequence of at least three data samples.

25. The method of clause 24 wherein adjusting a phase of the first clock signal if the sequence of data samples matches a predetermined pattern comprises determining whether the sequence of at least three data samples matches the predetermined pattern.

26. The method of clause 24 wherein generating the error sample comprises generating the error sample substantially simultaneously with one of the at least three data samples.

27. The method of clause 26 wherein generating the at least three data samples comprises generating first, second and third samples one after another, and wherein generating the error sample substantially simultaneously with one of the at least three data samples comprises generating the error sample substantially simultaneously with the second data sample.

28. The method of clause 23 wherein generating a sequence of data samples comprises generating a sequence of single-bit values each being in either the first state or the second state.

29. The method of clause 23 wherein generating a sequence of data samples comprises generating a sequence of multi-bit data samples, each of the multi-bit data samples including at least two constituent bits.

30. The method of clause 23 wherein the incoming signal is a differential signal having first and second component signals.

31. The method of clause 30 wherein generating the sequence of data samples comprises generating each data sample of the sequence of data samples in either the first state or the second state according to whether the first component signal exceeds the second component signal by more than the first threshold.

32. The method of clause 31 wherein the first threshold is substantially zero such that generating each data sample of the sequence of data samples comprises generating each data sample in the first state if the first component signal exceeds the second component signal, and generating each data sample in the second state if the second component signal exceeds the first component signal.

33. The method of clause 23 wherein the first clock signal comprises a plurality of component clock signals that are phase offset from one another, and wherein generating the sequence of data samples comprises generating the sequence of data samples in response to transitions of the component clock signals.

34. The method of clause 23 further comprising determining whether the sequence of data samples matches the predetermined pattern.

35. The method of clause 34 wherein determining whether the sequence of data samples matches the predetermined pattern comprises determining if the sequence of data samples indicate that the input signal ascended from a level below the second threshold to a level above the second threshold, crossing the second threshold at a time nominally aligned with the one of the transitions of the first clock signal.

36. The method of clause 35 wherein adjusting a phase of the first clock signal based, at least in part, on whether the error sample has the first state or the second state comprises generating a vote to retard the phase of the first clock signal if the state of the error sample indicates that the error sample was generated based on a level of the incoming signal that is below the second threshold.

37. The method of clause 35 wherein adjusting a phase of the first clock signal based, at least in part, on whether the error sample has the first state or the second state comprises generating a vote to advance the phase of the first clock signal if the state of the error sample indicates that the error sample was generated based on a level of the incoming signal that is above the second threshold.

38. The method of clause 34 wherein determining whether the sequence of data samples matches the predetermined pattern comprises determining if the sequence of data samples indicate that the input signal descended from a level above the second threshold to a level below the second threshold, crossing the second threshold at a time nominally aligned with the one of the transitions of the first clock signal.

39. The method of clause 38 wherein adjusting a phase of the first clock signal based, at least in part, on whether the error sample has the first state or the second state comprises generating a vote to advance the phase of the first clock signal if the state of the error sample indicates that the error sample was generated based on a level of the incoming signal that is below the second threshold.

40. The method of clause 38 wherein adjusting a phase of the first clock signal based, at least in part, on whether the error sample has the first state or the second state comprises generating a vote to retard the phase of the first clock signal if the state of the error sample indicates that the error sample was generated based on a level of the incoming signal that is above the second threshold.

42. The method of clause 34 wherein determining whether the sequence of data samples matches the predetermined pattern comprises determining whether the sequence of data samples comprises a logic '1' data sample followed by a first logic '0' data sample followed by a second logic '0' data sample.

43. The method of clause 34 wherein determining whether the sequence of data samples matches the predetermined pattern comprises determining whether the sequence of data samples comprises a logic '0' data sample followed by a first logic '1' data sample followed by a second logic '1' data sample.

44. The method of clause 34 wherein generating the sequence of data samples comprises generating a sequence of multi-bit data samples each having at least two constituent bits that correspond to one of at least four possible signal levels, and wherein determining whether the sequence of data samples matches the predetermined pattern comprises determining if at least three multi-bit data samples correspond to progressively lower signal levels of the at least four possible signal levels.

45. The method of clause 34 wherein generating the sequence of data samples comprises generating a sequence of multi-bit data samples each having at least two constituent bits that correspond to one of at least four possible signal levels, and wherein determining whether the sequence of data samples matches the predetermined pattern comprises determining if at least three multi-bit data samples correspond to progressively higher signal levels of the at least four possible signal levels.

46. The method of clause 23 wherein adjusting a phase of the first clock signal based, at least in part, on whether the error sample has the first state or the second state comprises generating a phase-advance indication if the error sample is in the first state and a phase-retard indication if the error sample is in the second state.

47. The method of clause 23 wherein generating each data sample of the sequence of data samples comprises:
   generating a first data sample having either the first state or the second state according to whether the incoming signal exceeds an upper threshold;
   generating a second data sample having either the first state or the second state according to whether the incoming signal exceeds a lower threshold; and
   selecting either the first data sample or the second data sample to be included in the sequence of data samples.

48. The method of clause 47 wherein selecting either the first data sample or the second data sample to be included in the sequence of data samples comprises selecting one of the first and second data samples based on a data sample previously selected to be included in the sequence of data samples.

49. The method of clause 47 wherein the first threshold is alternately the upper or lower threshold according to which of the first and second data samples is selected to be included in the sequence of data samples.

50. An integrated circuit device comprising:
   means for generating a sequence of data samples in response to transitions of a first clock signal, each of the data samples having either a first state or a second state according to whether an incoming signal exceeds a first threshold;
   means for generating an error sample in response to one of the transitions of the first clock signal, the error sample having either the first state or the second state according to whether the incoming signal exceeds a second threshold; and
   means for adjusting a phase of the first clock signal if the sequence of data samples matches a predetermined pattern and based, at least in part, on whether the error sample has the first state or the second state.

Section headings have been provided in this detailed description for convenience of reference only, and in no way define, limit, construe or describe the scope or extent of such sections. Also, while the invention has been described with reference to specific embodiments thereof, it will be evident that various modifications and changes may be made thereto without departing from the broader spirit and scope of the invention. Accordingly, the specification and drawings are to be regarded in an illustrative rather than a restrictive sense.

What is claimed is:

1. An integrated circuit device comprising:
    a first sampling circuit to generate a sequence of data samples in response to a first clock signal, each data sample in the sequence of data samples having one of at least two states according to whether an incoming signal exceeds a first threshold; and
    data-level crossing logic to determine whether the sequence of data samples matches a pattern that corresponds to a sloped input-signal crossing of the first threshold.

2. The integrated circuit device of claim 1 further comprising a second sampling circuit to generate a sequence of error samples in response to the first clock signal, each error sample in the sequence of error samples having one of at least two states according to whether the incoming signal exceeds a second threshold.

3. The integrated circuit device of claim 2 wherein the data-level crossing logic includes circuitry to generate, in response to a determination that the sequence of data samples matches the pattern, a first early/late signal that indicates whether a transition of the first clock signal occurred before or after the sloped-input-signal crossing of the first threshold based on at least one of the first clock signal, at least one of the error samples, or at least one of the data samples.

4. The integrated circuit device of claim 3 wherein the circuitry to generate the first early/late signal includes a first logic to generate the first early/late signal in either a first logic state or a second logic state according to whether at least one of the error samples is captured before or after the sloped input-signal crossing of the first threshold.

5. The integrated circuit device of claim 3 further comprising a first phase adjust circuit to adjust the phase of the first clock signal based, at least in part, on the first early/late signal.

6. The integrated circuit device of claim 5 wherein the first phase adjust circuit comprises a counter to update a count value in response to the first early/late signal.

7. The integrated circuit device of claim 6 wherein the first phase adjust circuit includes logic to generate a first phase-adjust signal based, at least in part, on the count value.

8. The integrated circuit device of claim 7 wherein the logic to generate the first phase-adjust signal comprises a majority-detect circuit to generate the first phase-adjust signal based, at least in part, on whether a majority of early/late signals, within a set of early/late signals that includes the first early/late signal, indicate that the first clock signal is transitioning early or late relative to sloped input-signal crossings of the first threshold.

9. The integrated circuit device of claim 7 wherein the first phase-adjust signal comprises multiple bits.

10. The integrated circuit device of claim 7 wherein the logic to generate the first phase-adjust signal comprises a first circuit to generate the first phase-adjust signal in one of at least two logic states according to whether the count value exceeds a predetermined count.

11. The integrated circuit device of claim 10 further comprising a second circuit to store the predetermined count, wherein the second circuit is a programmable storage circuit.

12. The integrated circuit device of claim 7 wherein the logic to generate the first phase-adjust signal comprises circuitry to update the first phase-adjust signal at a first update rate.

13. The integrated circuit device of claim 12 further comprising data-state transition logic to determine whether a second clock signal is transitioning early or late relative to at least a transition in the incoming signal.

14. The integrated circuit device of claim 13 wherein the second clock signal has a predetermined phase offset relative to the first clock signal.

15. The integrated circuit device of claim 14 wherein the predetermined phase offset is determined, at least in part, on the first phase-adjust signal.

16. The integrated circuit device of claim 13 further comprising a second phase adjust circuit to generate a second phase-adjust signal based, at least in part, on at least a zero-crossing of the incoming signal.

17. The integrated circuit device of claim 16 wherein the second phase adjust circuit comprises logic to update the second phase-adjust signal at a second update rate.

18. The integrated circuit device of claim 17 wherein the first update rate of the first phase-adjust signal and the second update rate of the second phase-adjust signal establish a desired update ratio.

19. The integrated circuit device of claim 18 further comprising a clock generation circuitry to generate the first clock signal and the second clock signal with a phase offset relative to each other based, at least in part, on the first phase-adjust signal and the second phase-adjust signal.

20. A method of operation within an integrated circuit device, the method comprising:
    generating a sequence of data samples in response to a first clock signal, each data sample in the sequence of data samples having one of at least two states according to whether an incoming signal exceeds a first threshold; and
    determining whether the sequence of data samples matches a pattern that corresponds to a sloped input-signal crossing of the first threshold.

21. The method of claim 20 further comprising generating a sequence of error samples in response to the first clock signal, each error sample in the sequence of error samples having one of at least two states according to whether the incoming signal exceeds a second threshold.

22. The method of claim 21 further comprising generating, in response to a determination that the sequence of data samples matches the pattern, a first early/late signal that indicates whether a transition of the first clock signal occurred before or after the sloped-input-signal crossing of the first threshold based on at least one of the first clock signal, at least one of the error samples or at least one of the data samples.

23. The method of claim 22 wherein generating the first early/late signal comprises generating the first early/late signal in either a first logic state or a second logic state according to whether at least one of the error samples is captured before or after the sloped input-signal crossing of the first threshold.

24. The method of claim 22 further comprising adjusting the phase of the first clock signal based, at least in part, on the first early/late signal.

25. The method of claim 24 wherein adjusting the phase of the first clock signal comprises generating a phase-adjust signal based, at least in part, on whether a majority of first early/late signals, within a set of first early/late signals that includes the first early/late signal, indicate that the first clock signal is transitioning early or late relative to sloped input-signal crossings of the first threshold.

26. An integrated circuit device comprising:
means for generating a sequence of data samples in response to a first clock signal, each data sample in the sequence of data samples having one of at least two states according to whether an incoming signal exceeds a first threshold; and
means for determining whether the sequence of data samples matches a pattern that corresponds to a sloped input-signal crossing of the first threshold.

* * * * *